(12) United States Patent
Ryabov et al.

(10) Patent No.: US 11,798,542 B1
(45) Date of Patent: Oct. 24, 2023

(54) SYSTEMS AND METHODS FOR INTEGRATING VOICE CONTROLS INTO APPLICATIONS

(71) Applicant: Alan AI, Inc., Sunnyvale, CA (US)

(72) Inventors: Andrey Ryabov, Sunnyvale, CA (US); Ramu V. Sunkara, Los Altos, CA (US)

(73) Assignee: Alan AI, Inc., Sunnyvale, CA (US)

( * ) Notice: Subject to any disclaimer, the term of this patent is extended or adjusted under 35 U.S.C. 154(b) by 294 days.

(21) Appl. No.: 17/214,735

(22) Filed: Mar. 26, 2021

Related U.S. Application Data

(63) Continuation of application No. 17/156,523, filed on Jan. 23, 2021, which is a continuation-in-part of application No. 16/752,522, filed on Jan. 24, 2020, now abandoned.

(60) Provisional application No. 62/965,737, filed on Jan. 24, 2020, provisional application No. 62/799,645, filed on Jan. 31, 2019.

(51) Int. Cl.
| | |
|---|---|
| *G10L 15/22* | (2006.01) |
| *G10L 15/197* | (2013.01) |
| *G10L 15/18* | (2013.01) |
| *G06F 3/04842* | (2022.01) |
| *G10L 15/30* | (2013.01) |
| *G06F 3/16* | (2006.01) |

(52) U.S. Cl.
CPC ........ *G10L 15/197* (2013.01); *G06F 3/04842* (2013.01); *G06F 3/167* (2013.01); *G10L 15/1815* (2013.01); *G10L 15/22* (2013.01); *G10L 15/30* (2013.01)

(58) Field of Classification Search
None
See application file for complete search history.

(56) References Cited

U.S. PATENT DOCUMENTS

| | | | | |
|---|---|---|---|---|
| 6,144,938 A | * | 11/2000 | Surace | H04M 3/4936 |
| | | | | 704/E13.004 |
| 6,185,535 B1 | | 2/2001 | Hedin et al. | |
| 6,757,362 B1 | * | 6/2004 | Cooper | H04M 3/527 |
| | | | | 379/88.16 |
| 7,035,791 B2 | | 4/2006 | Chazan et al. | |
| 8,165,886 B1 | * | 4/2012 | Gagnon | G10L 15/19 |
| | | | | 715/728 |

(Continued)

OTHER PUBLICATIONS

Cer et al., "Universal Sentence Encoder", URL: https://arxiv.org/pdf/1803.11175.pdf, Apr. 12, 2018, 7 pages.

(Continued)

*Primary Examiner* — Neeraj Sharma
(74) *Attorney, Agent, or Firm* — Greenberg Traurig, LLP

(57) ABSTRACT

The disclosed computer-implemented method may include receiving input voice data synchronous with a visual state of a user interface of the third-party application, generating multiple sentence alternatives for the received input voice data, identifying a best sentence of the multiple sentence alternatives, executing a dialog script for the third-party application using the best sentence, the dialog script generating a response to the received voice data comprising output voice data and a corresponding visual response, and providing the visual response and the output voice data to the third-party application, the third-party application playing the output voice data synchronous with updating the user interface based on the visual response. Various other methods, systems, and computer-readable media are also disclosed.

20 Claims, 22 Drawing Sheets

(56) References Cited

U.S. PATENT DOCUMENTS

| | | | |
|---|---|---|---|
| 9,043,213 B2 | 5/2015 | Chun | |
| 9,652,451 B2* | 5/2017 | Elder | G06F 16/24522 |
| 9,691,411 B2 | 6/2017 | Scherer et al. | |
| 10,629,186 B1 | 4/2020 | Slifka | |
| 10,657,961 B2* | 5/2020 | Cash | G06F 16/9537 |
| 2002/0065654 A1* | 5/2002 | Grant | G10L 15/193 |
| | | | 704/E15.044 |
| 2005/0033582 A1* | 2/2005 | Gadd | G10L 15/26 |
| | | | 704/E15.04 |
| 2007/0100618 A1 | 5/2007 | Lee et al. | |
| 2008/0004880 A1 | 1/2008 | Acero et al. | |
| 2012/0053929 A1 | 3/2012 | Hsia et al. | |
| 2013/0304758 A1* | 11/2013 | Gruber | G06F 16/248 |
| | | | 707/769 |
| 2013/0346066 A1 | 12/2013 | Deoras et al. | |
| 2015/0052084 A1 | 2/2015 | Kolluru et al. | |
| 2016/0154792 A1 | 6/2016 | Sarikaya et al. | |
| 2016/0188145 A1* | 6/2016 | Vida | B60K 35/00 |
| | | | 715/745 |
| 2016/0378080 A1* | 12/2016 | Uppala | G10L 15/22 |
| | | | 700/275 |
| 2017/0053646 A1 | 2/2017 | Watanabe et al. | |
| 2019/0295536 A1 | 9/2019 | Sapugay et al. | |
| 2021/0225357 A1 | 7/2021 | Zhao et al. | |

OTHER PUBLICATIONS

Amazon Alexa, "Alexa Skills Kit Official Site: Build Skills for Voice", URL: https://developer.amazon.com/en-US/alexa/alexa-skills-kit, retrieved on Sep. 3, 2020, pp. 1-5.

* cited by examiner

| The | quick | brown | fox | jumps | over | the | lazy | dog |
|---|---|---|---|---|---|---|---|---|
| O | P1 | P1 | P1 | O | O | O | P2 | P2 |
| 1604a | 1604b | 1604c | 1604d | 1604e | 1604f | 1604g | 1604h | 1604i |

```
1800 var COMPANIES = "Company1|Company2|Company3|Company4"
                                                        1806
1802
        var general = context(()=>{
1804      intent('What is (the|) ${S stage|status} of (the|) ${COMP ${COMPANIES}) (opportunity|)',
            p => {                                                                              1812
1808        callRESTApi(p, 'sfdc_status', {company: p.COMP.value}, (data)=>{
1810          p.play({data: data, command:"showSfState"});
              p.play(`The ${p.S} of the ${p.COMP} opportunity is ${data.status}`);
                                                              1816
1814        });
1818        p.then(opportunity, {company: p.COMP.value});
                                      1822
          });
                            1824
1820    var opportunity = context(()=>{
          follow("${V increase|change|decrease|update|set} (it|size|revenue|) (to|) ${NUMBER}",
                                                 1828
1826        p => {
1830          callRESTApi(p, 'sfdc_change_revenue',
                {company: p.company, amount: p.NUMBER}, (data)=>{    1834
1832            var data = JSON.parse(body.data);
                p.play({data: data, command:"showSfState"});
1836            p.play(api.past(`(Ok|) ${p.V} (it|) to $${p.NUMBER.number}`));
                                                                1838
              });
              //...
          });
            1840
```

FIG. 18

SYSTEMS AND METHODS FOR INTEGRATING VOICE CONTROLS INTO APPLICATIONS

CROSS REFERENCE TO RELATED APPLICATIONS

This application claims the benefit under 35 U.S.C. § 120 and is a continuation of U.S. application Ser. No. 17/156,523, filed 23 Jan. 2021, which claims the benefit under 35 U.S.C. § 119(e) to U.S. Provisional Application Ser. No. 62/965,737, filed 24 Jan. 2020, and claims the benefit under 35 U.S.C. § 120 and is a continuation-in-part of U.S. application Ser. No. 16/752,522, filed 24 Jan. 2020, which claims the benefit under 35 U.S.C. § 119(e) to U.S. Provisional Application Ser. No. 62/799,645, filed 31 Jan. 2019, the disclosures of each of which are incorporated, in their entirety, by this reference.

BACKGROUND

This application relates to voice controlled applications, and more particularly to integration of voice controls into existing third-party applications.

Voice control may allow for a device or an application to be controlled by a user by recognizing verbal commands spoken by the user and by performing operations in response to the received commands. By removing the need to manually operate interface devices such as buttons, dials, or touchscreens, a user may operate the device or application in a hands-free manner, allowing them to make use of the application even when their hands are full or needed for other tasks. For example, a user may use an application with implemented voice control for various operations, such as executing a query or playing a media file, while driving a vehicle or otherwise performing some other task where their hands are occupied.

However, many existing applications having useful functions may not be built with voice controls implemented. As such, a user wishing to use such an application may be restricted to controlling operation of the application manually.

SUMMARY

A voice support server may provide voice control functionality to a third-party application that may not natively support voice control functions. The voice control functionality may provide a conversational voice experience to the third-party application that preserves an existing user interface for the third-party application. The conversational voice experience may provide a new voice user experience that may be referred to as a multimodal experience. The multimodal experience may be provided to the user without the need to rewrite, redo, or otherwise modify the existing third-party application.

The voice support server may implement one or more domains. Each domain may be specific to a particular third-party application and may maintain a domain-specific language model (DLM) that reflects the functionality of the particular third-party application. The DLM for a domain may comprise a plurality of intent patterns that reflect different commands and their possible variations that may be issued by the user. The DLM may map each intent pattern to a corresponding action to be performed by the third-party application. In some embodiments, each intent pattern may be expanded based upon its available variations and the possible entities corresponding to the intent that are accessible to the third-party application. The expanded patterns may be used to generate corresponding semantic representations that may be used to compare a level of semantic similarity between different pieces of text.

In some embodiments, a voice control module may be installed as a plug-in on the third-party application. The voice control module may be configured to capture audio data corresponding to user voice commands. The voice control module may be configured to transmit the captured audio data to the voice support server. The voice support server may receive the audio data, may extract one or more user utterances from the audio data, and may transcribe the user utterance. The transcribed utterance may be transformed to form a semantic representation, which may be compared with those of the expanded patterns to identify an intent corresponding to the user utterance. The voice control module may then transmit instructions to the third-party application to perform the action corresponding to the identified intent.

Some embodiments may be directed to a method of providing voice control for an application. The method may include receiving, via a wireless network, audio data associated with a user of an application executing on a remote client device. The method may further comprise converting the received audio data into corresponding text and generating an utterance vector indicating semantic features of the corresponding text. The method may further comprise comparing the utterance vector to a plurality of intent vectors of a domain language model specific to the application to identify an intent vector matching the utterance vector, and transmitting instructions to the remote client device via the wireless network to cause the application to perform an action associated with the identified matching intent vector.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure. Embodiments of the disclosure may have other advantages and features which will be more readily apparent from the following detailed description and the appended claims, when taken in conjunction with the examples in the accompanying drawings, in which:

FIG. 16 is a table showing an example of encoding a sentence pattern to a pattern vector for the sentence.

FIG. 18 is an illustration of code for an example dialog script for use by a third-party application.

Figure 1:
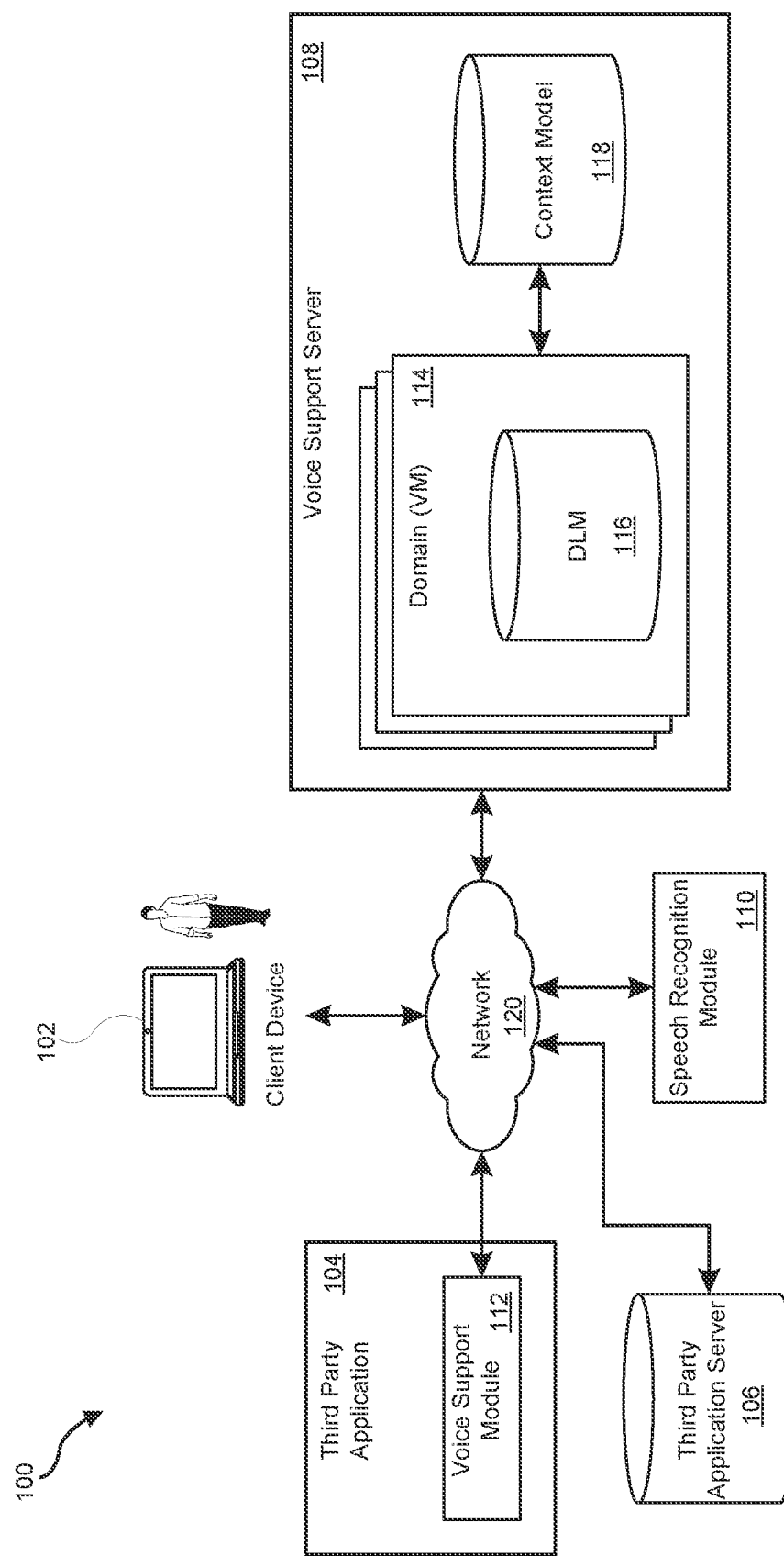
FIG. 1 illustrates a high-level block diagram of an exemplary computing environment for implementing voice controls on existing applications, in accordance with some embodiments.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to systems and methods for adding assistive voice control to third-party applications that include complex workflows, complex specific vocabulary and language associated with the third-party, and user interfaces specifically designed for use with the third-party application. A voice control application may add assistive voice control to a third-party application. The assistive voice control may understand and intelligently respond to voice commands of a user as they navigate through the third-party application using voice control. In addition, or in the alternative, the assistive voice control may understand and intelligently respond to user questions regarding general data structures of the third-party application. In addition, or in the alternative, the assistive voice control may understand and intelligently respond to one or more states of the user interface of the third-party application. The capability of the assistive voice control to provide an understanding of and an intelligent response to voice controls for the third-party application may dramatically simplify an experience of a user when interacting with an third-party application, and specifically a third-party application that may include the use of complex data structures.

A language model may model a probability distribution over strings of text. A "Domain Language Model" (DLM), as discussed herein, may enrich or add to a language model for an application by including additional attributes such as entities, intents, and handlers. These additional attributes may make a DLM dynamic. In some implementations, a DLM may change depending on a dialog state and/or visual state of the third-party application. For example, a DLM may be derived from a global language model of the English language but enriched for use with voice control for a third-party application.

As used herein, the term "automated speech recognition" (ASR) may refer to an automated process of transforming the raw sound of a voice of a user to a sequence or multiple sequences of words. Examples of ASR engines may include, but are not limited to, Google Cloud® Speech to Text, Microsoft Bing® Speech, or Kaldi ASR. In some implementations, an assistive voice control application may use intermediate results of the ASR engine along with a list of language alternatives to the voice transformation to run a search against the DLM to find the best matching language alternative. In some implementations, an assistive voice control application may use intermediate results of the ASR engine along with a list of language alternatives to the voice transformation to modify or correct the result of the ASR to what, most likely, the user has said. Providing such recognition hints that may depend on the state of the dialog or the user interface (e.g., the context of the user) of the third-party application may improve the quality of voice recognition for the third-party application.

As used herein, the term "natural language understanding" may refer to a process of understanding voice input made in the form of a sentence by matching a similar pattern of words based on the sense of sentence.

As used herein, the term "visual state" may refer to an object that may be set by an application developer on a client-side computing device by way of a software development kit (SDK) for an application interface (API) for the assistive voice control application. The visual state may be synchronized to a server-side computing device so that dialog scripts used for the user interface of the assistive voice control application have the same version as those on the client computing device. The object may be of a format that includes a map with string keys and values of any format. For example, a third-party application may be a navigation application. The navigation application may set a list of geographic locations currently displayed on a screen of a computing device executing the navigation application. In some implementations, an assistive voice control application when interfacing with the navigation application to provide assistive voice control may use the list of geographic locations as voice recognition hints to improve a quality of the voice recognition. In some implementations, the assistive voice control application may use the list of geographic locations to modify the DLM to contextually add some intents that may make sense only with the current state of the map. In some implementations, the assistive voice control application may use the list of geographic locations to change the behavior of existing intents.

As used herein, the term "dialog state" may refer to a stack of active dialog contexts as described further herein. In some implementations, a dialog state may define a subset of a language model for searching during a pattern searching phase. As used herein, the term "dialog context" may refer to one or more groups of declared intents and follows. Intents and follows may define phrase patterns and business logic that may be launched when a user says a matching phrase. For example, intents may be activated at any time, whereas follows may match only in active contexts. A dialog context may include a history of user requests. In addition, or in the alternative, a dialog context may define phrases that a user may potentially say next. In some implementations, a dialog context may be used to help in providing correct voice recognition hints.

As used herein, the term "dialog management" may refer to a process for the automatic and/or programmatic changing of a dialog state using one or more scripts associated with and for execution by the assistive voice control application. For example, an application developer may use JavaScript® to create the scripts. JavaScript® may provide the application developer with a tool to define the DLM, to execute the business logic, to manage dialog states, and/or to generate responses. The application developer may then store the scripts in a database of a server-side computing device.

As used herein, the term "language pattern" may refer to a pattern in a script that may be used to define a DLM. In some implementations, a script may include a plurality (more than one) language patterns. For example, a language pattern may include various text segments and parameter definitions (e.g., entity, strict, fuzzy, regular expression (regex)).

As used herein, the term "entity" may refer to a distinct unit or element that may be part of an organized array or set of individual elements or parts. For example, a voice command "directions to the airport" may have an intent for directions to an entity corresponding to, for example, a location (e.g., the airport). In this example, the location entity may also be another location (e.g., a hotel, a gym, grandma's house, etc.).

A script may include a language pattern that includes an entity parameter definition. For example, "Entity: '(what is/show/open) the $(T weather/temperature/forecast) for $(DATE) in $(LOC)." This language pattern that includes an entity parameter may be matched to the text "show what the weather will be on Monday in Sunnyvale". This language pattern may be used to define a DLM: "T→weather, DATE→Monday, LOC→Sunnyvale".

A script may include a language pattern that includes a fuzzy parameter definition. For example, a language pattern that may be included in a script may be: "Fuzzy: "(directions to|navigate to|route to) $(L˜ gym/groceries/home/work/office)." This language pattern that includes a fuzzy parameter may be matched to the text: "build me a route to shopping mall." This language pattern may be used to define a DLM: L→shopping mall A script may include a language pattern that includes a regex parameter definition. For example, a language pattern that may be included in a script may be: "RegEx: "(show/tell me) who is on $(U*e/engines\+\d{1,3})." This language pattern that includes a regex parameter may be matched to the text: "ok tell who's on E 79". This language pattern may be used to define a DLM: U→E 79.

As used herein, the term "voice response" may refer to an audible response (e.g., a voice or spoken response) provided by an assistive voice control application in response to a received voice request from a user. In some implementations, an assistive voice control application may generate a voice response based on business logic execution for a third-party application.

As used herein, the term "visual event" may refer to a visible response (e.g., a change in state of a user interface) provided by an assistive voice control application in response to a received voice request from a user. In some implementations, the assistive voice control application may provide both the visual event and the voice response in response to a received voice request from a user. In some implementations, a visual event may synchronize a voice response with a change to a user interface. For example, if the response is a list of items, the assistive voice control application may highlight the item provided in the voice response (e.g., the spoken word(s) for the item) in a list of the items displayed in a user interface to provide an improved user experience.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

FIG. 1 illustrates a high-level block diagram of an exemplary computing environment (e.g., example system 100) for implementing voice controls on existing applications, in accordance with some embodiments. FIG. 1 illustrates a client device 102, a third-party application 104, a third-party application server 106, a voice support server 108, and a speech recognition module 110, all of which may communicate with each other through a network 120.

The network 120 may exchange electronic data among the various entities listed above, and/or other entities, and may comprise any combination of local area and/or wide area networks, using both wired and/or wireless communication systems. In one embodiment, the network 120 may comprise the Internet and may use standard communications technologies and/or protocols. For example, the network 120 may include communication links using technologies such as Ethernet, 802.11, worldwide interoperability for microwave access (WiMAX™), 3G, 4G, code division multiple access (CDMA), digital subscriber line (DSL), etc. Examples of networking protocols used for communicating via the network 120 may include, but are not limited to, multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The client device 102 may correspond to any electronic device usable by a user to access and operate various applications (locally or over the network 120). For example, the client device 102 may be a smart phone, or a tablet, notebook, or desktop computer. The client device may include, and/or may be coupled to, a speaker and/or display using which the user may consume audio-visual content (e.g., query results, media content, video chats, etc.). In addition, the client device 102 may include a user interface (UI), such as physical and/or on-screen buttons, which the user may interact with to perform various functions with the client device. The client device 102 may further include an audio receiver (e.g., a microphone) able to capture audio data, such as speech by the user of the client device 102.

The third-party application 104 may correspond to any existing application that may be accessed by the user at the client device 102 and that may be used by the user for performing one or more functions. For example, in some embodiments, the third-party application 104 may, based upon one or more requests submitted by the user of the client device 102, display search results to the user, identify and play back a media file to the user, and the like. In some embodiments, the third-party application 104 may correspond to a web page (viewed by the client device 102 through a browser application) or a mobile application. The third-party application 104 may support interaction with the user of the client device 102 through one or more input mechanisms of the client device, such as a mouse, a keyboard, or a touchscreen, but may not natively support or recognize voice commands.

In some embodiments, the user at the client device 102 may access the third-party application 104 over the network 120, as is illustrated in FIG. 1. In other embodiments, at least a portion of the third-party application 104 may be stored and accessed locally on the client device 102. For example, the third-party application 104 may comprise a client application installed on the client device 102 that is accessible to the user. The user may, using the client application, submit one or more requests, which may be used by the third-party application 104 to perform various operations over the network 120, such as downloading a media file, connecting the user to a user at another client device, etc.

The third-party application server 106 may comprise at least one data store storing data utilized by the third-party. For example, in some embodiments, the third-party application server 106 may store content accessible to a third-party application 104, which in turn may be used to provide content to the user at the client device 102 utilizing the third-party application 104. The voice support server 108 may be remote from the client device 102 and may be configured to implement voice control functions for the third-party application 106.

As discussed above, the third-party application 104 may not natively support voice control functions. By implementing voice control functions for the third-party application, a user may use the third-party application 104 while performing other tasks or when their hands are otherwise occupied (e.g., while operating a vehicle). For example, in an embodiment, the user may be an emergency responder, and may use the third-party application 104 to search for directions to desired locations, report status on certain tasks, etc. By implementing voice control functions for the third-party application 104, the user may perform these functions while driving a vehicle or while concurrently performing other tasks, potentially increasing efficiency.

In some embodiments, the voice support server 108 may interface with the third-party application 104 through a voice support module 112 executing in association with the third-party application 104. The voice support module 112 may be distinct from the third-party application 104 and may correspond to a plug-in installed on the third-party application 104. The voice support module 112 may capture certain inputs to the client device 102 and/or certain inputs received by the third-party application 104. In addition, or in the alternative, the voice support module 112 may control one or more operations of the third-party application 104. In some embodiments where the third-party application 104 may be a web page, the voice support module 112 may comprise JavaScript® code that causes the plug-in to be downloaded to, and executed by, the client device 102 along with the web page. In some embodiments, where the third-party application 104 may correspond to a mobile application, the voice support module 112 may be integrated into the third-party application 104. In some embodiments, a voice support module (e.g., the voice support module 112) may be added to the third-party application 104 by a developer of the third-party application 104.

Figure 7:
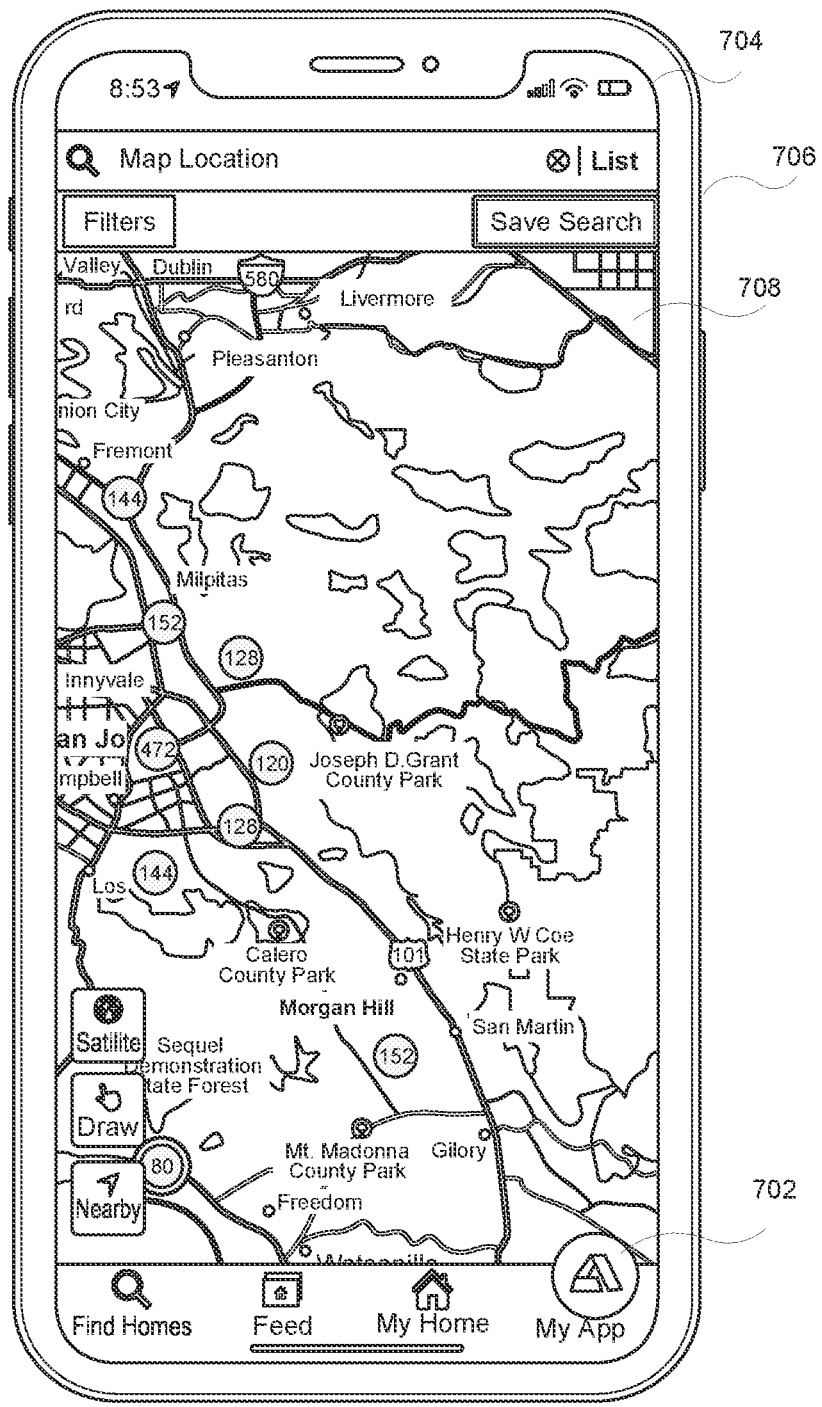
FIG. 7 is an illustration of an exemplary interactive interface element integrated into a third-party application.

FIG. 7 is an illustration of an exemplary interactive interface element (e.g., a button 702) integrated into a third-party application. In some implementations, referring to FIG. 1, a third-party application (e.g., the third-party application 104), having an installed voice support module (e.g., the voice support module 112), may display on a screen 704 of a client device 706 (e.g., the client device 706 may be the client device 102) a user interface (e.g., a graphical user interface (GUI) 708) corresponding to the third-party application (e.g., a map for a navigation application). The GUI 708 may include an interactive interface element that may be a button, icon, or the like (e.g., the button 702). The interactive interface element may correspond to the voice support module 112. For example, a user of the client device 706 may activate the interactive interface element. For example, the user may touch the button 702 when the screen 704 is a touchscreen. In another example, the user may select the button 702 by clicking on the button.

The user may activate the interactive interface element in order to turn on functionality of the voice support module 112. Turning on the functionality of the voice support module 112 may enable the user to make use of the voice support functions provided by the voice support module 112. For example, when the user of the client device 706 activates the interactive interface element (e.g., by touching the interactive interface element on a touchscreen), the voice support module 112 may instruct an audio receiver of the client device 102 to record audio data.

The voice support module 112 may capture audio data comprising at least one voice command from the user of the client device 102 (e.g., via a microphone of the client device 102), and may send the captured audio data to the voice support server 108. The voice support server 108 may analyze the received audio data, may extract the at least one voice command, and may determine an action corresponding to the voice command. The voice support server 108 may transmit to the voice support module 112 instructions indicating the corresponding action to be performed, whereupon the voice support module 112 may interface with the third-party application 104 to perform the identified action. For example, the voice support module 112 may access an Application Programming Interface (API) natively provided by the third-party application 104 in order to instruct the third-party application 104 to perform the identified action. In some embodiments, the voice support module 112 may translate the instructions received from the voice support server 108 into a format compatible with the API of the third-party application 104. As such, the user may be able to control operations of the third-party application 104 using voice commands, despite the third-party application 104 not implementing voice control functionality natively.

Different third-party applications 104 may have different types of functionality. As such, the types of voice commands a user may desire to perform on a first third-party application 104 may be different from those of a second, different third-party application. In order to accurately handle voice commands for each of a plurality of different applications, the voice support server 108 may maintain, for each different third-party application 104, a domain 114 corresponding to the third-party application 104. Each domain may be implemented as a virtual machine (VM).

Each domain 114 may maintain a domain language model (DLM) 116 that is specific to (associated with) the particular third-party application 104 corresponding to the domain 114. The DLM 116 may be a model that reflects the specific types of commands that are associated with a third-party application. Because different third-party applications may be capable of performing different types of actions, each DLM 116 may be customized for its specific domain 114. In some embodiments, a developer associated with the third-party application 104 may define the DLM 116 for the third-party application 104 by defining the types of commands that may be processed by the third party application 104. As such, the scope of the language that received voice commands may be matched to may be restricted to a particular domain, allowing for improved speech recognition in comparison to general speech recognition. For example, when the user speaks a voice command, possible actions that the audio data corresponding to the voice commands may be matched to may be limited to that of the particular third-party application 104. This may allow for the voice support server 108 to better handle variations in speech (e.g., due to accents or speech impediments).

The DLM 116 may comprise a plurality of patterns corresponding to different variations of user intents that may be used to perform actions on the third-party application 104. The plurality of patterns may reflect the natural variations that may be used by human users to convey the same intent. For example, a user wishing to perform a query using the third-party application 104, such as finding records from a certain date, may say "find records from $date", "search from records on $date', "retrieve all records from $date", and/or other variations, where $date is a variable that may correspond to a particular date spoken by the user.

As used herein, an "intent" may refer to a type of command that may be spoken by the user of the third-party application 104 that corresponds to a particular type of action that may be performed by the third-party application 104. In some embodiments, the developer for the third-party application 104 may define patterns corresponding to intents (e.g., hereinafter also referred to as "intent patterns") that correspond to actions able to be performed by the third-party application 104.

In addition, or in the alternative, the DLM 116 may comprise action data associated with each of the plurality of patterns describing the corresponding action to the intent pattern. The action data may comprise instructions that may be transmitted from the voice support server 108 to the third-party application 104 (e.g., via the voice support module 112) to cause the third-party application 104 to perform the action corresponding to the pattern. In some embodiments, one or more of the intents may further be associated with a context. For example, in some third-party applications, certain actions may only be performed when the third-party application 104 has a certain context (e.g., the user has accessed a particular page of the third-party application 104). As such, the context associated with the intent indicates under which contexts of the third-party application 104 that actions associated with the intent may be performed.

Each domain 114 may receive audio data corresponding to voice commands spoken by the user at the client device 102 to the third-party application 104 (e.g., as captured via an audio device of the client device 102) through the voice support module 112. The domain 114 may process the received audio data to identify individual commands from the user, hereinafter referred to as "user utterances", and transcribe the identified user utterances such that the user utterances may be matched with intent patterns defined in the DLM 116. In some embodiments, the transcription of audio data corresponding to the identified user utterances may be performed by the speech recognition module 110. The speech recognition module 110 may correspond to a commercially available speech to text transcription service, such as Google Cloud® Speech-to-Text. In other embodiments, the speech recognition module 110 may be implemented by the voice support server 108.

In some embodiments, in order to match a transcribed user utterance to an intent of the DLM 116, the domain 114 may use a context embedding model 118 to compare the transcribed user utterance with a plurality of intent patterns of the DLM 116. The context embedding model 118 may be configured to receive textual data, and to convert the textual data into a semantic representation (e.g., a semantic vector) usable for determining a level of semantic similarity between different pieces of text. By comparing the transcribed user utterances to the intent patterns of the DLM 116 based upon semantic similarity instead of direct textual similarity, the transcribed user utterance may be more accurately and efficiently matched to an intent pattern, even if the intent patterns of the DLM 116 may not cover all semantic variations of a given intent. In some embodiments, the voice support server 108 may maintain the context embedding model 118 to be generally applicable across multiple domains, allowing for the same context embedding model 118 to be shared by a plurality of domains 114.

Figure 2:
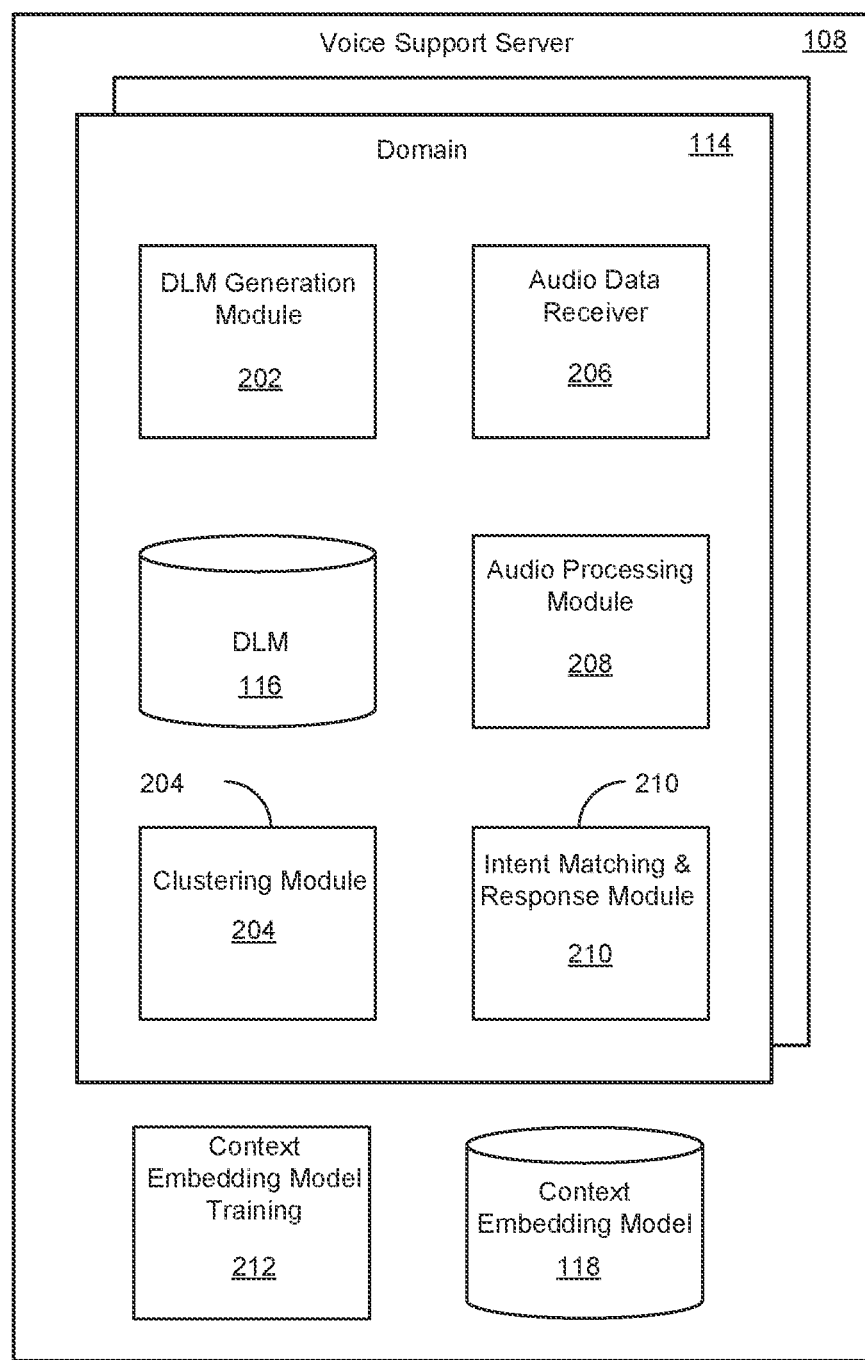
FIG. 2 illustrates a high-level block diagram of an exemplary voice support server, in accordance with some embodiments.

FIG. 2 illustrates a high-level block diagram of the voice support server 108, in accordance with some embodiments. As discussed above with reference to FIG. 1, the voice support server 108 may maintain at least one domain 114. Each domain may correspond to one or more third-party applications. For example, the domain 114 may correspond to the third-party application 104.

A domain may include a DLM generation module, a generated DLM, a clustering module, an audio data receiver, an audio processing module, and an intent matching/response module. For example, the domain 114 may comprise a DLM generation module 202, a generated DLM 116, a clustering module 204, an audio data receiver 206, an audio processing module 208, and an intent matching/response module 210. The voice support server 108 may further maintain one or more components outside the domain 114, which may be accessible by multiple domains. These one or more components may include a context embedding model training module 212 and a context embedding model 118.

The DLM generation module 202 may generate the DLM 116 for the domain 114, so that received user utterances may be mapped to intents corresponding to actions to be performed by the third-party application 104. In some embodiments, the DLM generation module 202 may receive a plurality of intent patterns. Each intent pattern may describe an intent and an action to be performed corresponding to the intent. In addition, an intent pattern may also specify a type of entity that may be acted upon by the intent. For example, a voice command "directions to the airport" may be recognized by an intent pattern as having an intent corresponding to "directions," and an entity corresponding to a location ("the airport"). As a result, the intent pattern may correspond to an action to cause the third-party application 104 to query and display to the user directions to a desired location (e.g., the airport). In some embodiments, the patterns may be written using JavaScript® code, XML code, etc.

In some embodiments, the intent patterns may be submitted to the DLM generation module 202 by a developer of the third-party application 104, based upon the particular actions that may be performed by the third-party application 104. For example, different intent patterns may correspond to intents to query for certain search terms, access particular folders or files, play back a media file, etc.

An intent pattern may comprise one or more variables representing a class of named entities. In some embodiments, a variable may be marked with a particular character (e.g., "&'"). For example, a pattern may correspond to "directions to &location" or "play &song", where &location and &song are variables that represent particular classes of entities (e.g., locations and songs, respectively) that serve as the subject of the intent. The developer may define, as part of the DLM 116, how each variable maps to a class of entities accessible to the third-party application 104 and may define instructions on how to retrieve entities of the class from the third-party application server 106.

In some embodiments, an entity may correspond to an object having one or more attributes. The entity may be marked within a pattern by a particular character (e.g., "$"). For example, the entity $hotel_california may be a song (e.g., belonging to the class of entities corresponding to &song), having attributes comprising at least a name (e.g., "Hotel California") and a reference to audio data corresponding to the song that is maintained by the third-party application 104 (e.g., stored in the third-party application server 106). In some embodiments, an entity may correspond to a search term, and as such may not directly correspond to an object maintained by the third-party application 104. In some embodiments, an entity may correspond to an object assessable by the third-party application 104 but not directly managed by the third-party application 104 (e.g., content hosted by a different application but that is accessible to the third-party application 104).

In some embodiments, a pattern may reflect multiple ways for expressing a particular intent. For example, if a user wishes to use the third-party application 104 to play an audio file (e.g., a song), this intent may be expressed by a command to "play" the audio file or to "listen to" the audio file. In addition, an intent pattern may include words before or after the entity. For example, using the above example of playing an audio file, the user may express the intent with the command "play $song song" or "play $song track", where $song corresponds to language indicating the particular audio file to be played (e.g., a title of the audio file). The pattern may thus be defined to account for these different options for expressing the intent.

In some embodiments, a pattern may contain more than one entity. For example, a particular pattern may specify a first entity corresponding to a query term, and a second entity correspond to a filter condition for the query term (e.g., "search for $query_term that $filter_term").

The DLM generation module 202 generates the DLM 116 using the received patterns. In some embodiments, the DLM generation module 202 expands each pattern to form the DLM 116. Expanding a pattern may comprise separating each pattern into each of its possible variations. In addition, where a pattern comprises a variable corresponding to a class of entities (e.g., &song or &location, as discussed above), the DLM generation module 202 may expand the pattern by accessing the third-party application server 106 of the third-party application 104 to retrieve data indicating possible entities that correspond to the class of entities indicated by the variable, such as a list of songs that can be played by the third-party application 104, a list of locations that can be searched for, etc. In some embodiments, the DLM generation module 202 uses an API of the third-party application server 106 to retrieve the data indicating the entities corresponding to the variable. In some embodiments, the DLM generation module 202 further retrieves information from the third-party application server 106 needed by the voice support server 108 to cause the third-party application 104 to perform an action corresponding to the entity (e.g., cause the third-party application 104 to play a requested song, search fora requested location, etc.).

The DLM generation module 202 may use the retrieved data indicating possible entities of the class indicated by a variable within a pattern to expand the pattern. For example, for a pattern corresponding to "(Play|Listen To) &song (" "|track)" and the retrieved data indicates that the possible song entities are "$wonderwall" and "$hotel-california," the pattern may be expanded into a set of expanded patterns comprising "play $wonderwall", "listen to $wonderwall," "play $wonderwall track," "listen to $wonderwall track", "play $hotel-california,", "play $hotel-california track," "listen to $hotel-california," and "listen to $hotelcalifornia track.". As such, the expanded set of patterns may cover all combinations of phrasing variations and individual entities of the class of entities indicated in the original un-expanded intent pattern 302.

The DLM 116 may comprise the entire corpus of expanded patterns defined by the DLM generation module 202. In some embodiments, the entities within each pattern (e.g., $wonderwall) may be replaced with corresponding text strings (e.g., "Wonderwall"), corresponding to how the entity would be verbalized by the user. For example, the entity $wonderwall may refer to an object corresponding to a song and having the title "Wonderwall." In some embodiments, additional variations of how the entity may be verbalized (e.g., "Wonderwall by Oasis") may also be used to generate additional expanded patterns. In some embodiments, where an entity corresponds to a search term and not to an entity accessible to third-party application 104, the expanded patterns may comprise an indication of the presence of the search term (e.g., a placeholder), instead of specific text corresponding to an expected user verbalization.

Each expanded pattern may be associated with a corresponding action to be performed by the third-party application 104. How the different actions map to intent patterns may be specified by a developer of the third-party application 104 when defining the intent patterns. In some embodiments, a pattern may be associated with a set of instructions that can be transmitted from the voice support server 108 to the third-party application 104, in order to cause the third-party application 104 to perform the corresponding action at the client device 102. When an intent pattern is expanded, the action associated with the intent pattern may be expanded such that each expanded pattern is associated with an action that references the resolved variable (e.g., the specific $song entity) of the expanded pattern. For example, the pattern "(Play|Listen To) &song (" "|track)" referred to above may be associated with an action to cause the third-party application to retrieve and play an audio file corresponding to the entity indicated by &song. The expanded patterns of the pattern include "play $wonderwall", which is associated with the action to retrieve and play the audio file corresponding to $wonderwall, while "listen to $hotelcalifornia" is associated with the action to retrieve and play the audio file corresponding to $hotel-california.

In order to effectively match transcriptions of received user utterances with intents corresponding to the patterns of the DLM 116, each expanded pattern of the DLM 116 may be converted into a semantic representation, such as a semantic vector. In some embodiments, the DLM generation module 202 may transmit each of the expanded patterns to the context embedding model 118, which converts the received patterns into corresponding semantic vectors.

The context embedding model 118 may be a neural network model generated and trained using the context embedding model training module 212. The context embedding model training module 212 may receive a known corpus of textual data (e.g., sentences) and train the neural network to map textual data to semantic vectors using the known corpus. Each semantic vector may comprise one or more contextual embeddings, which may indicate semantic features of the sentence corresponding to the semantic vector. In some embodiments, the context embedding model 118 may convert received text to vectors using a word2vec algorithm.

As discussed above, the context embedding model 118 may have general applicability and may be shared by multiple domains 114. In other embodiments, different context embedding models 118 may be trained on more specialized corpuses of data (e.g., language relating to a particular field), such that the resulting models may be more specialized for particular types of third-party applications.

In addition, in some embodiments, different context embedding models 118 may be used that produce semantic vectors having different degrees of precision. For example, the context embedding model 118 may include a first model that maps received text to a first type of semantic vector, and a second model that maps received text to a second type of semantic vector, wherein the second type of semantic vector may be more precise than the first type of semantic vector (e.g., contains a larger number of dimensions reflecting a larger number of embeddings). However, it may be more expensive (e.g., require a greater amount of computation) to determine a level of similarity between vectors of the second type in comparison to vectors of the first type. In some embodiments, clustering of the expanded intent patterns of the DLM 116 may be performed using the first type of semantic vector.

By converting the expanding patterns of the DLM 116 corresponding to different intents into vectors, the patterns may be more easily compared to vectors corresponding to the received user utterances. Because the comparison may be based upon semantic and contextual similarity, and not just textual similarity, a user utterance may be able to be matched with an intent pattern, even if the user utterance does not exactly match the pattern (e.g., contains different words with similar meanings, extra words, etc.). In some embodiments, two vectors corresponding to an intent pattern and a user utterance may be compared by calculating a distance between the vectors, wherein a smaller distance indicates that the pattern and the utterance may be more semantically similar in comparison to a larger distance. In some embodiments, the calculated distances may be Euclidean distances. In other embodiments, different vectors may be compared using cosine similarity.

The clustering module 204 may be configured to receive the vectors corresponding to each of the patterns of the DLM 116 and may be configured to cluster the received vectors into a plurality of clusters based upon a level of similarity between the vectors. For example, the vectors may be clustered such that vectors having at least a threshold amount of similarity to each other are placed within the same cluster. Similarity between vectors may be measured based upon the distance between the vectors. By clustering the vectors corresponding to the patterns of the DLM 116, received vectors corresponding to user utterances may be more easily matched with the vectors of the DLM 116. For example, a received user utterance vector may be first matched with a cluster that is closest to the received vectors, whereupon a closest vector of the identified cluster may then be found. This may potentially reduce an amount of processing needed to match the user utterance to an intent, as a smaller number of vectors of the DLM 116 are evaluated. In some embodiments, the clustering module 204 may cluster the vectors using K-means clustering.

Once the domain 114 has generated the DLM 116, generated vectors corresponding to the patterns of the DLM 116, and (optionally) clustered the resulting vectors, the domain 114 may be equipped to begin receiving audio data corresponding to commands from the user to the third-party application 104.

The audio data receiver 206 may be configured to receive audio data that may include one or more voice commands from a user. In some embodiments, the audio data receiver 206 may receive the audio data over the network 120 from the voice support module 112 installed on the third-party application 104. The voice support module 112 may capture audio data received through a microphone or other audio device of the client device 102, and may transmit the captured audio data to the voice support server 108, where the captured audio data is received by the audio data receiver 206 of the domain 114 corresponding to the third-party application 104. The captured audio data may comprise at least one statement spoken by the user. In some embodiments, the audio data receiver 206 may also receive additional metadata, such as context information indicating a context or state of the third-party application 104 when the audio data is received. For example, where the third-party application 104 has multiple pages or interfaces that can be navigated between by the user, the context information may indicate which page or interface of the application the user is viewing at the time the audio data is received.

The audio processing module 208 may be configured to identify voice data within the received audio data, and to transcribe the identified voice data. In some embodiments, the audio processing module 208 may analyze the audio data (e.g., audio data 308 as shown with reference to FIG. 3) and may perform voice recognition to determine if any of the audio data corresponds to words spoken by a human user. The analyzing of the audio data and the performing of the voice recognition may be done to eliminate audio data that might have been captured by accident (e.g., due to the user's microphone recording audio data corresponding to background noise, instead of speech by the user). In some embodiments, the audio processing module 208 may also recognize an identity of the user through voice recognition.

In some embodiments, by determining an identity of the user, the audio data may be able to be more accurately transcribed (e.g., through use of a transcription model tailored to particular users or particular types of users).

The audio processing module 208 may further analyze the portion of the audio data corresponding to verbal speech and may divide the portion of the audio data into one or more user utterances corresponding to individual sentences or commands within the analyzed audio data. Typically, when a user issues one or more voice commands, each voice command may be in the form of a separate sentence. Thus, by identifying individual sentences within the received audio data, the audio processing module 208 may be able to separate portions of the audio data into user utterances corresponding to different commands, allowing for each command to be processed individually. In some embodiments, the audio processing module 208 may separate the audio data into different sentences by recognizing pauses within the audio data as divisions between sentences.

The audio processing module 208 may further transcribe each of the determined user utterances, converting the audio data corresponding to each segment to text. In some embodiments, the audio processing module 208 may transcribe each sentence by transmitting the user utterances to a separate speech recognition module (e.g., the speech recognition module 110 illustrated in FIG. 1). The speech recognition module 110 may be maintained by a third-party. For example, the speech recognition module may correspond to Google Cloud® Speech-to-Text service. The speech recognition module may analyze the received user utterance data and may generate at least one textual transcription of the user utterances.

In some embodiments, the audio processing module 208 (e.g., using the speech recognition module 110) may generate a plurality of transcriptions for each user utterance. Each transcription may correspond to a different possible interpretation of the user utterance and may be associated with a confidence value indicating the likelihood that the interpretation is correct. In some embodiments, each of the candidate transcriptions may be processed (e.g., used to perform intent matching). In other embodiments, the transcription having the highest confidence value may be used, while other candidate transcriptions may be discarded.

The intent matching & response module 210 may receive the user utterance transcriptions and may match the transcriptions to at least one intent pattern of the DLM 116. For example, the intent matching & response module 210 may submit the user utterance transcriptions to the context embedding model 118, which may return vectors corresponding to each utterance transcription. The vectors may then be matched with vectors corresponding to intents of the DLM 116, whereupon an intent vector that is closest to an utterance vector may be selected.

In some embodiments, for each utterance vector, a cluster of intent vectors closest to the utterance vector may be identified (e.g., based upon a distance between the utterance vector and a centroid of the cluster). An intent vector of the cluster that is closest to the utterance vector may then be determined and designated as a matching intent vector for the user utterance. In embodiments where the context embedding model 118 comprises first and second models for generating first and second types of vectors (as discussed above), a user utterance transcription may first be processed by the first model to generate an utterance vector of the first type, which is used to determine a closest matching cluster. The user utterance transcription may then be processed using the second model to generate an utterance vector of the second type, which may be compared with the individual vectors of the second type corresponding to the expanded intent patterns of the identified cluster. Because the second type of vector may be more precise than the first type of vector, this may allow for a more accurate match to be determined, while reducing an amount of comparisons that need to be performed using the second type pf vector.

In embodiments where the audio processing module 208 returns multiple possible transcriptions corresponding to a particular utterance, the intent matching & response module 210 may determine a vector corresponding to each transcription, and may compare each of the vectors to those of the intent patterns of the DLM 116. In some embodiments, the intent matching & response module 210 may identify the intent vector that is closest to any of the vectorized utterance transcriptions as the intent corresponding to the utterance. For example, the intent matching & response module 210 may determine that the distance between the vector for candidate transcription "Play 'Wonderwall'" to its closest intent vector (e.g., corresponding to the expanded intent pattern "Play 'Wonderwall'") is less than that of the distances between the remaining candidate transcriptions and their respective closest intent vectors. As such, the candidate transcription "Play 'Wonderwall'" and the expanded intent pattern "Play 'Wonderwall'" may be determined to reflect the user's true intent. In some embodiments, the intent corresponding to the utterance may be determined based upon a function between distance to the vector of the closest utterance transcription and a confidence value associated with the closest utterance transcription. In embodiments where the intent vector corresponds to a pattern having a placeholder corresponding to a search term, the intent matching & response module 210 may further determine the search term using the matched transcription.

The intent matching & response module 210, upon identifying an intent vector closest to the user utterance, may identify the action to be performed by the third-party application 104 associated with the identified intent. The intent matching & response module 210 may transmit to the third-party application 104 (e.g., through the voice support module 112 installed on the third-party application 104) instructions for performing the determined action. The instructions may comprise an indication of the type of action to be performed (e.g., a query search, playback of a media file, etc.) and one or more entities the action is to be performed on (e.g., a query term, a filter condition, a title of the file to be retrieved or played back, etc.).

In some embodiments, one or more aspects of the action to be performed by the third-party application 104 may be based upon the wording of the user utterance. As discussed above, the intent corresponding to the action may have a number of variations, corresponding to different ways the user may be able to verbalize the intent. For example, the user may be able to say "query", "search for", retrieve", and or other variations in order to convey an intent to query for a search term. In some embodiments, when the third-party application 104 performs an action, the third-party application 104 may display an indication of the action that is being performed, such as textual indication (e.g., "now searching . . . " text indicating that the action is being performed), an audio indication, and/or the like. The language of the indication may mirror that used by the user. As such, if the user used the language "search for . . . ," the displayed indication may read "now searching for . . . " On the other hand, if the user used the language "retrieve," the displayed indication may read "now retrieving . . . " The instructions transmitted by the intent matching & response module 210 to the third-party application 104 may include at least a portion of the language of the transcription of the user utterance, allowing the third-party application 104 to generate an indication that mirrors the wording used in the utterance.

In some embodiments, the available intents and actions that a user utterance may be matched with may be based upon a current context of the third-party application 104. For example, in some embodiments, a user may access different contexts within the third-party application 104 (e.g., navigate between pages corresponding to directories and sub-directories, different user interfaces (UIs) for performing different functions), each of which may be associated with particular actions or link to other contexts of the application. In addition, in some embodiments, a particular context of the third-party application 104 may limit the entities an action may be performed on.

The user may give voice commands to the third-party application 104 to perform actions, where the actions able to be performed are limited by the current context of the third-party application 104. As such, when matching a vector of a user utterance, the intent matching & response module 210 may determine a current context of the third-party application 104 (e.g., based on metadata received in conjunction with the audio data associated with the user utterance), and may restrict the corpus of intent vectors of the DLM 116 that the utterance vector is compared against to a subset of intent vectors associated with the current context. For example, a particular context may be associated with only a subset of intent patterns corresponding to different types of actions that may be performed. In some embodiments, the corpus of entities that may be subject to an available action may be restricted based upon a current context of the application (e.g., the list of audio files that may be the subject of a "play audio" intent may be restricted to a subset of audio files corresponding to the current context, instead of all audio files able to be played using the application). By limiting the corpus of patterns that the user utterance may be matched against based on the current context of the application, a more accurate match may be able to be achieved.

Figure 3:
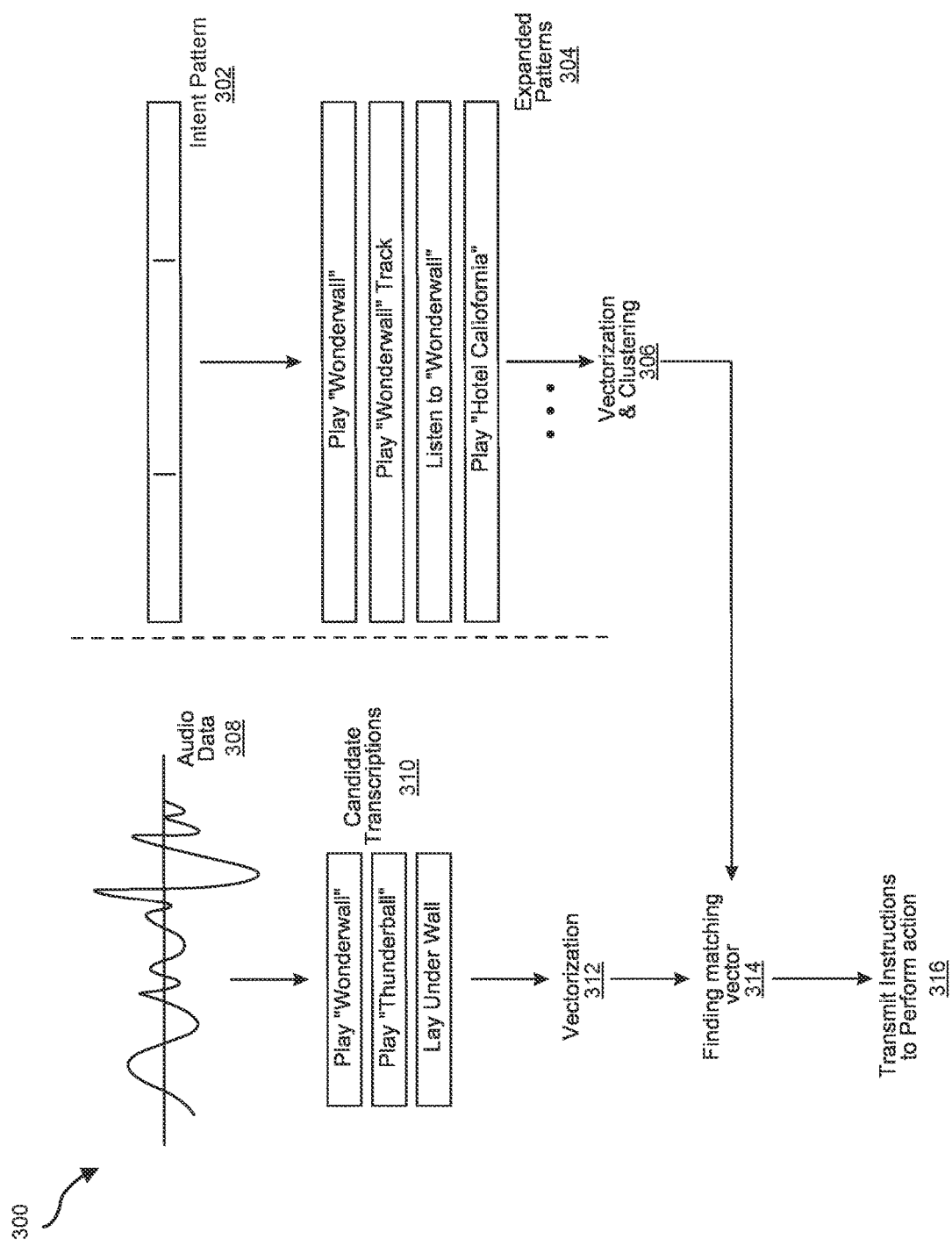
FIG. 3 illustrates an example of a process of implementing voice support for an application, in accordance with some embodiments.

FIG. 3 illustrates an example of a process 300 of implementing voice support for an application, in accordance with some embodiments. The process illustrated in FIG. 3 may be implemented in whole or in part using the voice support server 108 illustrated in FIG. 1, such as by a particular domain 114 corresponding to a particular third-party application 104.

In order to configure a DLM for the domain 114 corresponding to the third-party application 104, a user (e.g., a developer of the third-party application 104) may define one or more intent patterns. Each intent pattern may reflect one or more variations corresponding to how a user of the third-party application may be expected to verbalize the intent corresponding to the intent pattern. For example, FIG. 3 illustrates an intent pattern 302 expressed as "(Play|Listen To) &song ("|track)', indicating multiple variations corresponding to possible user utterances that may match with the intent of the pattern. The intent pattern 302 may include at least one variable (e.g., &song) indicating a class of entities that may be the subject of the intent pattern (e.g., $song entities).

Each intent pattern may be associated with an action to be performed by the third-party application 104. The associated action may be performed on a specified entity of the class indicated by a variable within the intent pattern 302 (e.g., &song). For example the intent pattern 302 may be associated with a set of instructions for accessing the third-party application 104 and causing the third-party application 104 to play back an audio file (e.g., a particular $song entity of the &song class).

The defined intent pattern 302 may be expanded to form a set of one or more expanded patterns 304. Each of the expanded patterns 304 may correspond to a particular combination of one or more variations indicated by the intent pattern 302. In addition, the expanded patterns 304 may correspond to particular entities of the class of entities indicated by variables within the intent pattern 302 (e.g., based upon data retrieved from the third-party application server 106). For example, for the pattern 302 illustrated in FIG. 3 ("(Play|Listen To) &song ("|track'), if the corpus of song entities comprises "$wonderwall" and "$hotel-california," the pattern may be expanded into a set of expanded patterns 304 comprising "play $wonderwall", "listen to $wonderwall," "play $wonderwall track," and "play $hotel-california," as well as "listen to $wonderwall track", "play $hotel-california track," "listen to $hotel-california," and "listen to $hotel-california track" (not shown in FIG. 3). As such, the set of expanded patterns 304 may correspond to each distinct combination of variations and entities indicated by the intent pattern 302. The set of expanded patterns 304 corresponding to the corpus of defined intent patterns 302 may form the DLM for the domain.

Next, the expanded patterns 304 may undergo vectorization and clustering 306. The vectorization and clustering 306 may comprise using the context embedding model 118 to generate, for each of the expanded patterns 304, an intent vector representing the semantic features of the expanded pattern 304. The generated intent vectors may then be clustered (e.g., using the clustering module 204) into one or more clusters based upon a level of similarity between the vectors (e.g., based upon distance between the vectors), in order to facilitate matching with utterance vectors.

When a user uses the third-party application 104, the voice support module 112 installed on the third-party application 104 may be used to capture audio data from the user. For example, the audio data 308 illustrated in FIG. 3 may comprise at least one statement spoken by the user. In some embodiments, the audio data receiver 206 may further receive additional information (e.g., metadata), such as context information corresponding to a context of the third-party application 104 when the audio data 308 as received.

The audio data 308 may be processed to generate at least one transcription corresponding to at least a portion of the audio data 308. For example, the audio data 308 may be analyzed to identify a user utterance, from which one or more candidate transcriptions 310 may be determined. Each of the candidate transcriptions 310 may include wording that is similar in terms of audio, but not necessarily in semantic meaning. For example, as illustrated in FIG. 3, the candidate transcriptions "Play 'Wonderwall'" and "Lay under wall" may sound similar from an auditory standpoint but are semantically unrelated. In some embodiments, each candidate transcription 310 may be associated with a confidence value.

The candidate transcriptions 310 may undergo vectorization 312, in which one or more of the candidate transcriptions 310 may be processed using the context embedding model 118 to generate a corresponding utterance vector representing one or more semantic features of the transcription. In some embodiments, vectorization 312 may be performed on all of the candidate transcriptions 310. In other embodiments, vectorization 312 may be performed on only a portion of the candidate transcriptions 310 (e.g., transcriptions associated with at least a threshold confidence value).

Vector matching 314 may be performed between the utterance vectors corresponding to the candidate transcriptions 310 and the intent vectors of the DLM of the domain, in order to identify an expanded pattern 304 that is the best semantic match for a transcription of the candidate transcriptions 310. In some embodiments, the body of intent vectors compared against the utterance vectors may be limited based upon a context of the third-party application associated with the utterance vectors.

In some embodiments, each utterance vector may be matched with a cluster of intent vectors that is closest to the utterance vector. An intent vector of the identified cluster that is closest to the utterance vector may then be selected as the best semantic match for the utterance vector. In some embodiments, the expanded pattern 304 may be selected as a pattern corresponding to the intent vector closest to any of the utterance vectors corresponding to the candidate transcriptions 310. For instance, in the example illustrated in FIG. 3, the intent vector corresponding to the expanded pattern "Play 'Wonderwall'" may be matched with the utterance vector of the candidate transcription "Play 'Wonderwall'" as the most semantically similar intent vector. As such, the expanded pattern "Play '"Wonderwall'" may be selected as corresponding to the intent of the received user utterance.

Responsive to a particular expanded pattern 304 being determined as a best semantic match, the action associated with the expanded pattern 304 may be identified (e.g., to play back an audio file corresponding to the entity "Wonderwall" indicated by the expanded pattern). The voice support server may transmit instructions 316 to the third-party application 104 (e.g., via the voice support module 112) to perform the action associated with the identified expanded pattern 304.

Process Flow

Figure 4:
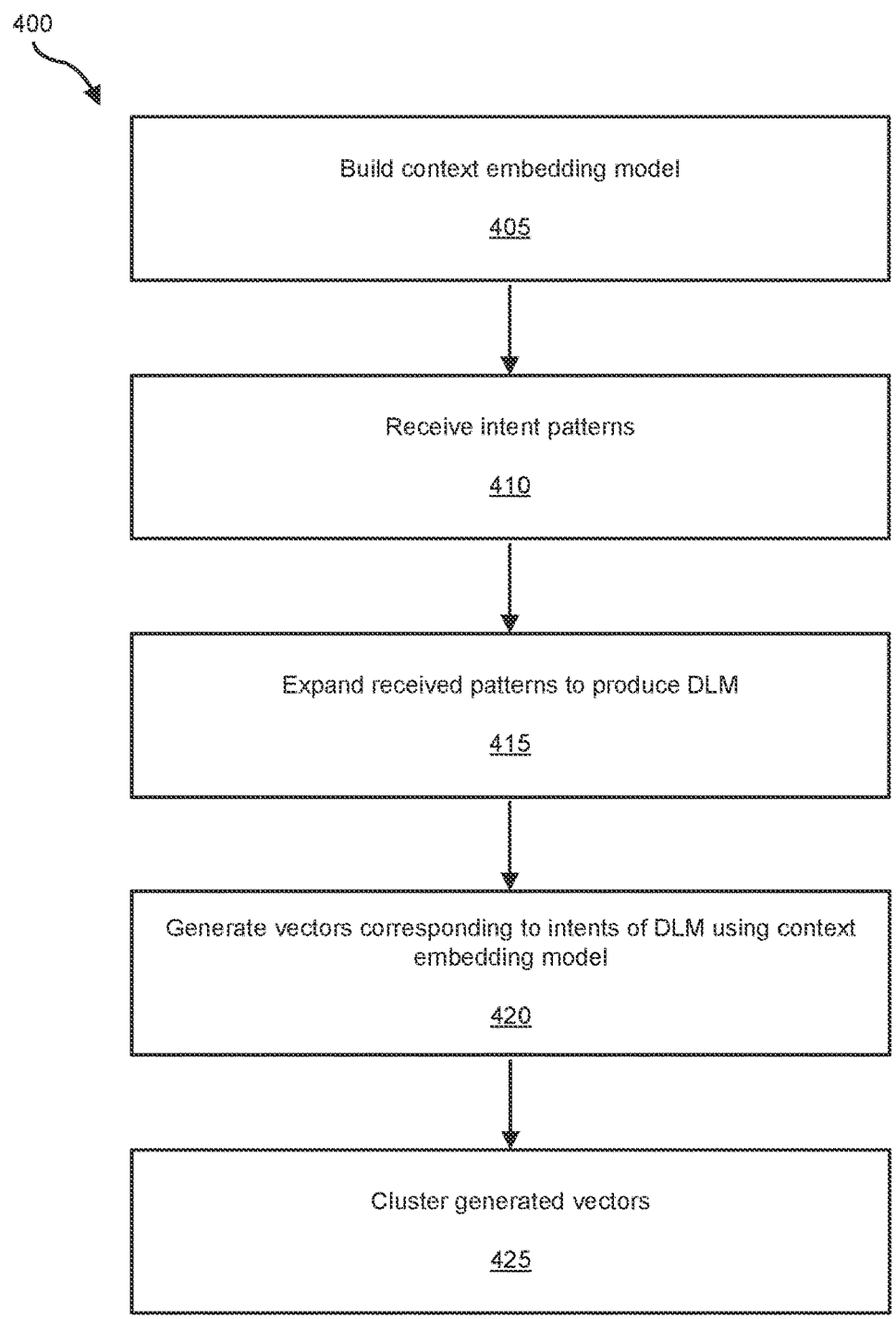
FIG. 4 is a flowchart of an exemplary process for establishing a Domain Language Model (DLM) for a domain for implementing voice controls for a third-party application, in accordance with some embodiments.

FIG. 4 is a flowchart of an exemplary process 400 for establishing a DLM for a domain for implementing voice controls for a third-party application, in accordance with some embodiments. Different embodiments of the process may include different and/or additional steps or may perform the steps in different orders. While this description describes the steps of the process performed by the various modules of the voice support server 108, steps of the process may be performed by other entities in other embodiments.

The voice support server 108 may build a context embedding model (step 405). The context embedding model may be a neural network model trained using a corpus of language data (e.g., sentences) that converts received pieces of text into semantic representations (e.g., vectors). Each vector may comprise one or more embeddings indicating semantic features of the corresponding text. Distances between different vectors corresponding to different pieces of text may be calculated, wherein the distance may indicate a level of semantic similarity between the text.

The DLM generation module 202 of a domain 114 of the voice support server 108 may receive a plurality of intent patterns corresponding to a third-party application (step 410). The intent patterns may be received from a developer of the third-party application. Each intent pattern has an associated action that may be performed by the third-party application. The intent pattern may also indicate at least one entity or entity type that the action is related to. An intent pattern may comprise one or more variations, which correspond to different types of vocabulary that a user of the third-party application may use to communicate their intent.

The DLM generation module 202 may expand the received intent patterns to form a DLM (step 415). In some embodiments, each of the intent patterns may be expanded such that each of the defined variations within the pattern may correspond to a different expanded pattern. In addition, the DLM generation module 202 may, for an entity type defined in an intent pattern, access a server of the third-party application to retrieve a listing of available entities for the entity type. The intent pattern may be expanded using the listing of available entities, such that each expanded pattern may correspond to a particular entity of the listing of available entities. For example, if the intent pattern corresponds to an action to be performed on a file maintained by the third-party application, the DLM generation module 202 may retrieve from the third-party application a list of files that the action may be performed on. The DLM generation module 202 may expand the intent pattern using the received list (e.g., such that each file on the list will correspond to at least one expanded pattern). A particular intent pattern may thus be expanded into a set of expanded patterns that reflect different combinations of variations and entities of the listing of available entities. The DLM may comprise a collection of all expanded patterns corresponding to the intent patterns for a particular third-party application.

The DLM generation module 202 may further transmit the expanded intent patterns of the DLM to the trained context embedding model (step 420), which may generate intent vectors corresponding to each expanded intent pattern.

The clustering module 204 may receive the generated intent vectors and may cluster the vectors into a plurality of clusters (e.g., using K-means clustering) (step 425). As discussed above, by clustering the intent vectors, vectors corresponding to received user utterances may be more efficiently matched to a closest intent vector.

Figure 5:
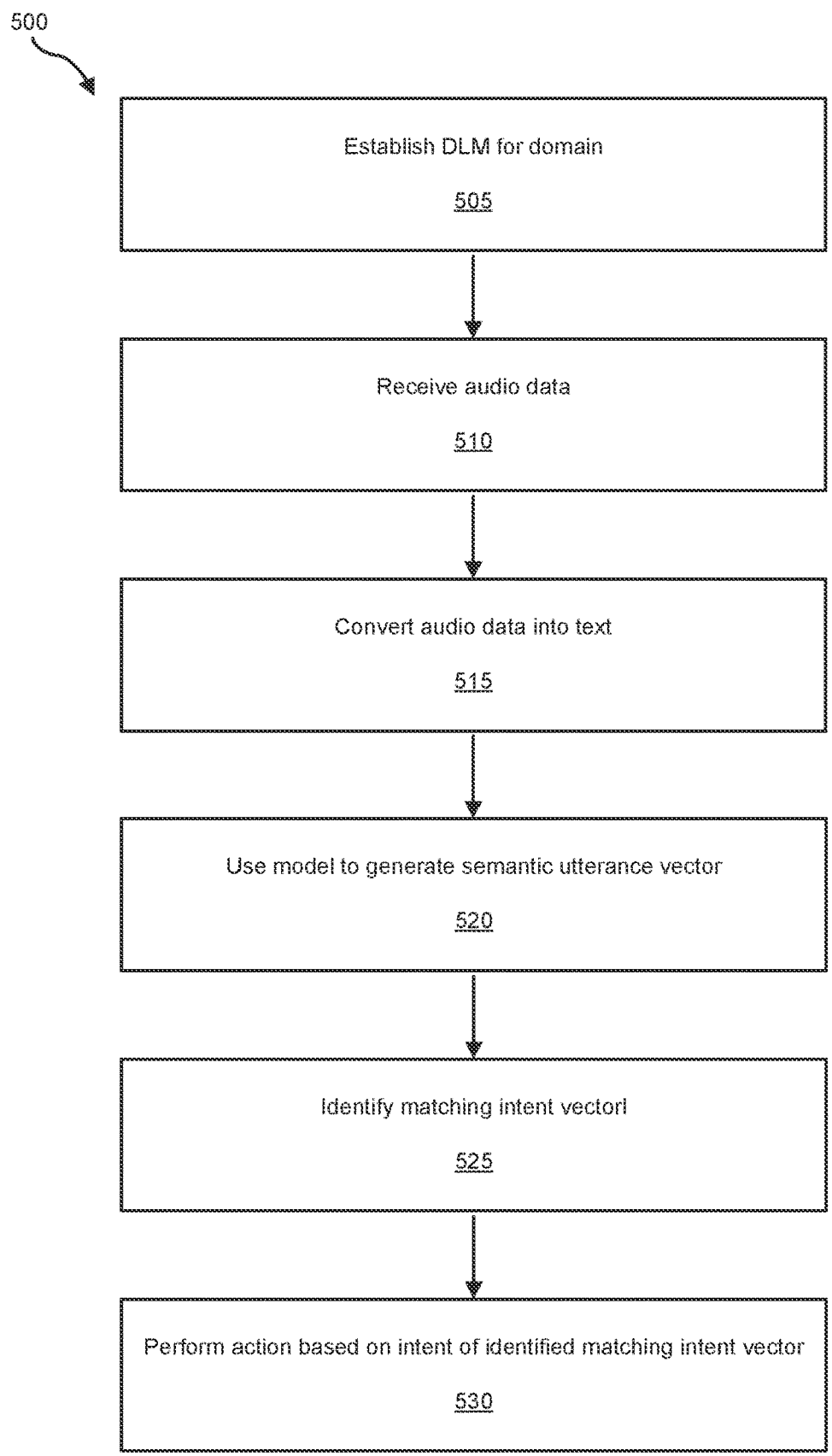
FIG. 5 is a flowchart of an exemplary process for processing received voice commands for controlling a third-party application, in accordance with some embodiments.

FIG. 5 is a flowchart of an exemplary process 500 for processing received voice commands for controlling a third-party application, in accordance with some embodiments. The voice support server 108 may establish a domain corresponding to the particular third-party application, the domain having a DLM that is specific to the third-party application (step 505). In some embodiments, the domain may be implemented as a virtual machine.

The domain for the third-party application may receive audio data associated with a user of the third-party application (step 510), which may correspond to one or more spoken statements.

The domain may convert the received audio data into corresponding text (step 515). In some embodiments, the audio data may be segmented into one or more user utterances (e.g., based upon pauses in the audio data), each utterance corresponding to a sentence spoken by the user. The determined user utterances may be processed by a speech recognition module 110 to produce at least one textual transcription for each utterance, where the text transcription describes the words in the utterances.

The domain may use a context embedding model to generate a semantic utterance vector corresponding to a textual transcript of a user utterance (step 520). The domain may compare the utterance vector to a plurality of intent vectors in the DLM for the domain. The domain may identify at least one matching intent vector (step 525). In some embodiments, the matching intent vector may be the vector the one that is closest (i.e., most similar) to the utterance vector. In some embodiments, the domain, for a particular utterance vector, may first identify a cluster of intent vectors that is closest to the utterance vector (e.g., based upon a centroid of the cluster). The domain may then identify a particular intent vector of the identified cluster as closest to the utterance vector. In some embodiments, identifying a closest cluster may be performed using a first type of vector, while identifying a closest intent vector of the cluster may be performed using a second type of vector that is more precise than the first type of vector. In some embodiments, the domain may determine a context associated with the semantic utterance vector (e.g., based upon metadata received in conjunction with the audio data), and may limit the corpus of intent vectors in the DLM that the utterance vector is compared against based upon the determined context.

The domain may cause the third-party application to perform an action associated with the intent corresponding to the identified intent vector (step 530). For example, the domain may transmit instructions to the voice support module 112 associated with the third-party application 104 indicating the action to be performed and an entity the action is to be performed on. In addition, in some embodiments, the instructions may comprise an indication of the text of the user utterance, allowing for the third-party application to display text to the user that reflects the text used by the user when controlling the third-party application. If the domain does not identify an intent vector as matching the utterance vector, the domain may cause the third-party application to display an error message indicating that no match was found, to ignore the received audio data without performing another action, and/or to perform another action.

As such, a voice support server may provide voice control functionality to a third-party application that may not natively support voice control. By installing a voice control module (e.g., as a plug-in) on the third-party application, audio data can be collected and analyzed to determine an intent of the user, whereupon the third-party application can be instructed to perform an action corresponding to the determined intent.

Because the voice support server may implement a separate domain customized for each third-party application, user utterances from received audio data may be compared to a limited language set reflecting intents corresponding to specific actions performable by the third-party application, and not to a general body of language, allowing for improved recognition of user commands. For example, a user utterance may be more easily matched to a particular intent pattern (such as "play $song") since the universe of possible intents/actions (e.g., "play") is constrained to those actually supported by the domain of the third-party application, and the universe of possible entities (e.g., $song) is restricted to entities accessible by the third-party of application. As such, intent matching may be performed even if the user is not able to articulate an intent with perfect clarity (e.g., due to an accent, speech impediment, etc.). In addition, in some embodiments, a current context of the application may be used to further narrow the universe of possible intents and entities that can be matched to, potentially further improving match accuracy.

Other Embodiments

Figure 6:
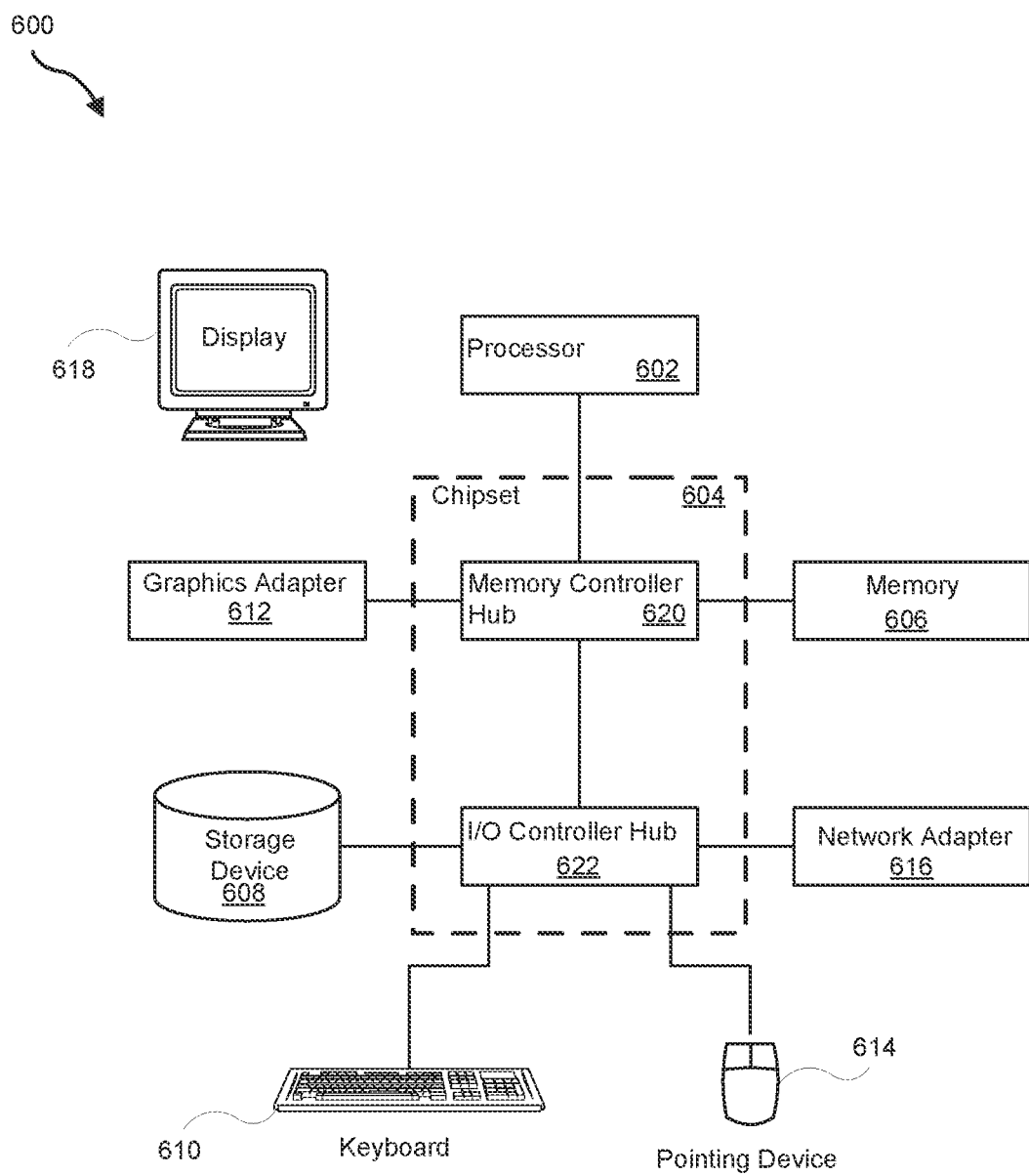
FIG. 6 is a high-level block diagram of an exemplary computer system that may be used to implement one or more portions of the voice support server, in accordance with some embodiments.

The entities shown in preceding figures are implemented using one or more computers. FIG. 6 is a high-level block diagram of an exemplary computer system 600 that may be used to implement one or more portions of the voice support server 108, in accordance with some embodiments. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 may be any non-transitory computer-readable storage medium, such as a hard drive, compact disk read-only memory (CD-ROM), DVD, or a solid-state memory device. The memory 606 may hold instructions and data used by the processor 602. The pointing device 614 may be a mouse, track ball, or other type of pointing device, and may be used in combination with the keyboard 610 to input data into the computer system 600. The graphics adapter 612 may displays image and other information on the display 618. The network adapter 616 may couple the computer system 600 to a network (not shown).

The computer system 600 may have different and/or other components than those shown in FIG. 6. In addition, the computer system 600 may lack certain illustrated components. For example, the computer acting as the voice support server 108 may be formed of multiple blade servers linked together into one or more distributed systems and lack components such as keyboards and displays. Moreover, the storage device 608 may be local and/or remote from the computer system 600 (such as embodied within a storage area network (SAN)).

The computer system 600 may be adapted to execute computer program modules for providing functionality described herein. As used herein, the term "module" refers to computer program logic utilized to provide the specified functionality. Thus, a module may be implemented in hardware, firmware, and/or software. In one embodiment, program modules may be stored on the storage device 608, loaded into the memory 606, and executed by the processor 602.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

Figure 8:
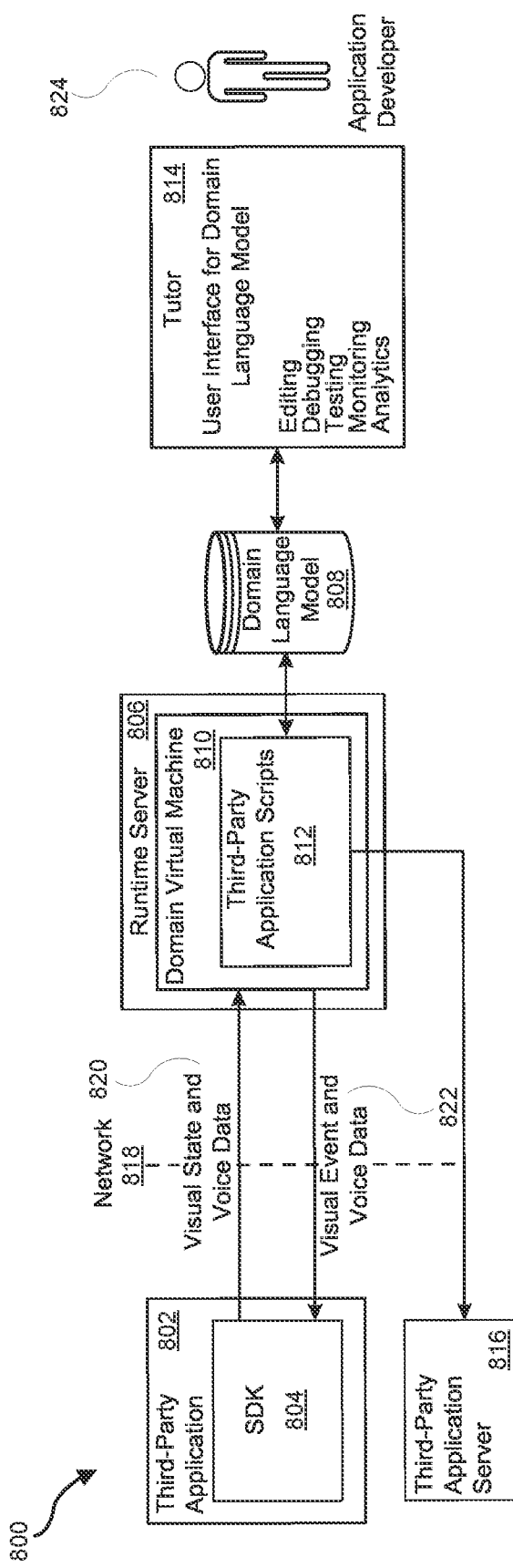
FIG. 8 is a block diagram of an exemplary system 800 for providing assistive voice control to a third-party application.

FIG. 8 is a block diagram of an exemplary system 800 for providing assistive voice control to a third-party application. The system 800 may include a third-party application 802. A software development kit (SDK) 804 may be used to integrate assistive voice control into the third-party application 802. In some implementations, the third-party application 802 may be a web site for the third-party. For example, the SDK 804 may run in multiple operating systems and/or frameworks that execute the third-party application 802. The operating systems and/or frameworks may include, but are not limited to, iOS® Framework, Android® Library, and/or a JavaScript® library for a web client (e.g., a web client that may execute the third-party application on a web site). The SDK 804 may provide a multimodal experience to a user of the third-party application without changing how a user may interact with the existing third-party application but adding to the interaction by providing a conversational voice user experience.

A runtime server may interface with one or more domain language models stored in a DLM database. For example, the runtime server 806 may interface with one or more domain language models stored in a DLM database 808. In some implementations, one or more of third-party application scripts 812 executing on a domain virtual machine 810 may create a domain language model and then store the domain language model in the DLM database 808.

A runtime server may interface with third-party applications, and specifically with client SDK libraries, by way of a network. For example, the runtime server 806 and specifically the domain virtual machine 810 may interface with the SDK 804 by way of a network 818. The SDK 804 may provide a visual state and/or voice data and/or a visual state synchronized with voice data (e.g., visual state and voice data 820) of the third-party application 802 to the domain virtual machine 810. In addition, or in the alternative, the SDK 804 may receive one or more visual events and/or voice data and/or a visual event synchronized with voice data (e.g., visual event and voice data 822) for incorporation into the third-party application 802 from the domain virtual machine 810. In some implementations, the runtime server 806 and specifically the domain virtual machine 810 may include appropriate protocols to keep the visual state and visual event content for the third-party application 802 in sync with visual content data included on the runtime server 806, allowing for the synchronization of the visual state and voice data (e.g., visual state and voice data 820) and the visual event and voice data (e.g., visual event and voice data 822) with the runtime server 806 for incorporation into the third-party application 802.

An interactive application may provide an application developer with one or more tools for managing the analytics for domain language models. For example, a tutor 814 may provide an application developer 824 with a user interface for managing the analytics for the domain language models stored in the DLM database 808. The tutor 814 may be an application that may execute on a computing device of the application developer 824. The tutor 814 may provide the application developer 824 with a graphical user interface (GUI) that allows the application developer 824 to define the logic of dialog flows and business logic in the third-party application 802. In addition, or in the alternative, the GUI may allow the application developer 824 to create, edit, debug, test, and/or monitor domain language models included in the DLM database 808.

The creation and/or editing of the domain language models by an application developer may allow the application developer to define the logic of dialogs flows and the business logic in a third-party application. For example, the application developer 824 using the tutor 814 may also manage, test, and debug assistive voice control voice and visual experiences in the third-party application 802. In addition, or the alternative, the application developer 824 using the tutor 814 may also gather and analyze behaviors of a use.

A runtime server may execute one or more client business logic handler scripts in a domain virtual machine. The runtime server 806 may execute one or more client business logic handler scripts (e.g., third-party application scripts 812) in a domain virtual machine 810. The third-party application scripts 812 may define one or more of a domain language model, dialog state management, business logic execution, or voice and/or visual response generation.

Third-party application scripts may use an application programming interface (API) of a third-party application server. For example, the third-party application scripts 812 may use an application programming interface (API) of a third-party application server 816 to obtain information and data for use in generating domain language models for storage in a DLM database 808. In addition, or in the alternative, the third-party application scripts 812 may use an application programming interface (API) of a third-party application server 816 to obtain information and data for use in generating voice and/or visual responses to received voice and/or other types of requests from a user as received by a user interface of the third-party application 802.

Figure 9:
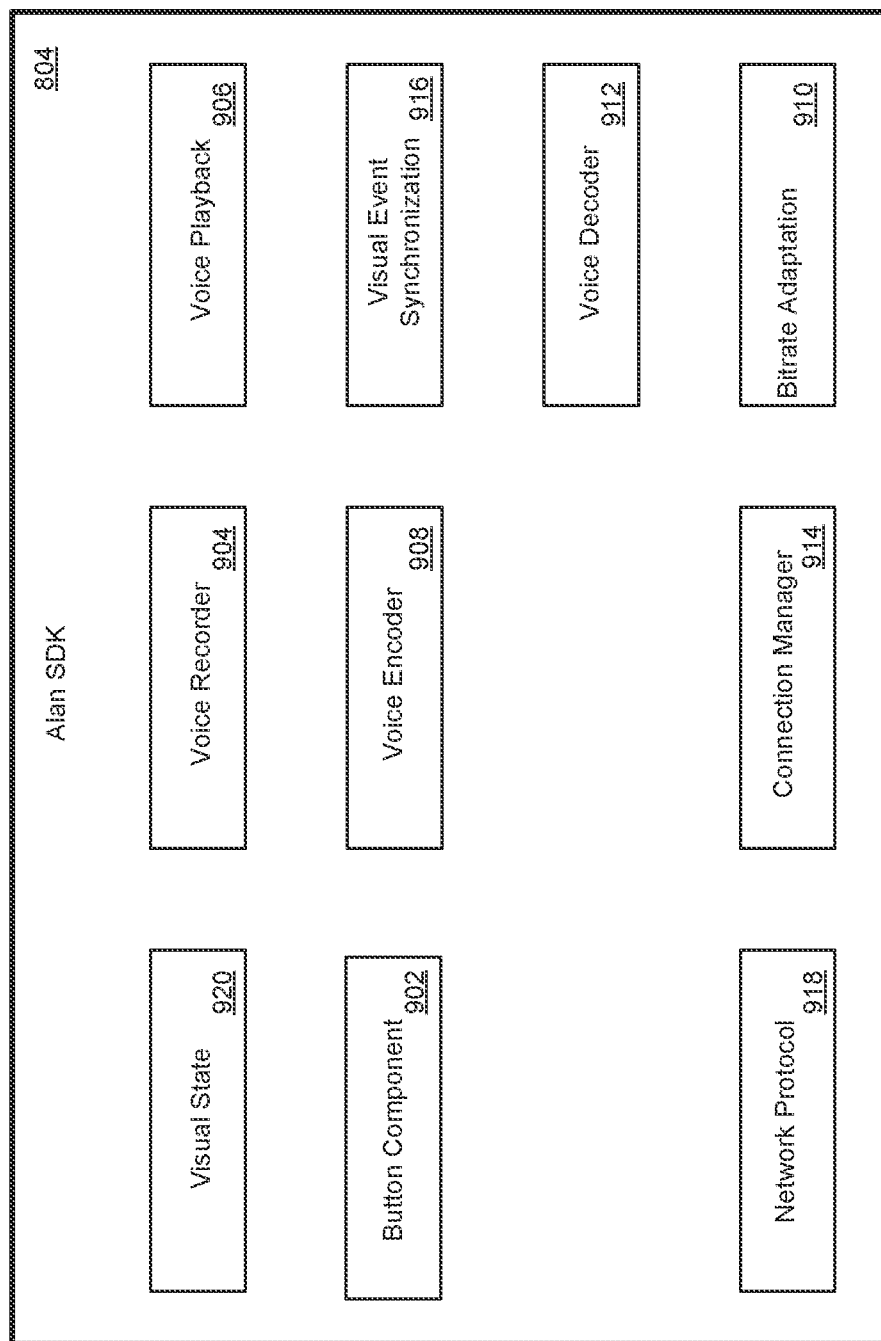
FIG. 9 is an illustration of an exemplary software development kit (SDK) for an exemplary system for providing assistive voice control to a third-party application.

FIG. 9 is an illustration of an exemplary software development kit (SDK) (e.g., the SDK 804 referring to FIG. 8) for an exemplary system (e.g., the exemplary system 800) for providing assistive voice control to a third-party application. For example, referring to FIG. 8, the application developer 824 may use the software development kit (SDK) 804 to integrate assistive voice control into the third-party application (e.g., the third-party application 802).

A button component may be used to integrate an assistive voice control application into a third-party application. The button component may be an interactive interface element included in a GUI of the third-party application that when activated by a user of the third-party application initiates the assistive voice control application. The integration of the button component into the assistive voice control application may involve the use of a minimal amount of code (e.g., a few lines of code, less than ten lines of code). An example of a button component integrated into a third-party application is shown with reference to FIG. 7. A button component may be the button 702.

A button component may be positioned in a GUI of a third-party application on top of or over GUI elements of the third-party application (e.g., floating or hovering over the GUI elements of the third-party application). Referring to FIG. 7, a button component 902 may be an interactive interface element (e.g., the button 702). The button component 902 may be positioned in a GUI on top of or over GUI elements of the third-party application (e.g., floating over the GUI elements of the navigation application as shown in FIG. 7). In some implementations, the button component 902 may be a floating button. As such, a user may select (click on or touch) and drag the button component 902 to any position in the GUI of the third-party application without changing the GUI. Once positioned, the user may select the button component 902 by touching or clicking on the button component 902. Selection of the button component 902 may activate, initiate, or turn ON the assistive voice control application. In some implementations, in addition or in the alternative, a user may speak a "wake-word" to invoke, activate, initiate, or turn ON the assistive voice control application.

Once activated, the assistive voice control application may listen to the voice of the user and identify voice user commands. In some implementations, the assistive voice control application may deactivate, stop, or turn OFF if there no voice user commands are identified for a period of time equal to or greater than a threshold amount of time (e.g., no user voice commands for five or more minutes).

In some implementations, a long press on the button component 902 may open a QR code. An application developer may scan the QR code with a computing device to connect to a debugging application. An application developer may then view all voice requests and visual states for the third-party application and all voice and visual events provided as a response to the requests in a GUI for the debugging application. In addition, or in the alternative, an application developer may then view information about dialog states and visual states of the third-party application in the GUI for the debugging application.

The SDK 804 may include a voice recorder module 904 that may capture audio frames. The SDK 804 may include a voice playback module 906 that may play audio frames. The SDK 804 may include a voice decoder module 912 that may decode audio packets received from the runtime server (e.g., the runtime server 806). Referring also to FIG. 8, the SDK 804 may include a voice encoder module 908 that may encode the audio into a format negotiated with a runtime server (e.g., the runtime server 806) and at bitrate set by a bitrate adaptation module 910. The bitrate adaptation module 910 may constantly monitor a quality of a connection between the runtime server 806 and the third-party application 802 and modify a voice encoding bitrate of the voice encoder module 908 accordingly. A connection manager module 914 may maintain a connection of the third-party application 802 to a specific process of the runtime server 806.

The SDK 804 may include a visual event synchronization module 916. Dialog scripts may interface with the visual event synchronization module 916 to synchronize a visual event with a voice response. For example, referring to FIG. 8, the third-party application scripts 812 may use an application programming interface (API) of the third-party application server 816 to obtain information and data for use in generating voice and/or visual responses that may then be provided to the user interface of the third-party application 802. The third-party application scripts 812 may use the obtained information and data to synchronize the voice response with a visual response that may then be provided to the SDK 804 for integration into the user interface of the third-party application 802.

The SDK 804 may include a network protocol module 918. Referring to FIG. 8, the network protocol module 918 may implement a network protocol for communicating by way of the network with the third-party application 802 and specifically the SDK 804. For example, the network protocol module 918 may implement a proprietary protocol that interfaces with a WebSocket protocol. Combining a proprietary protocol with the WebSocket protocol may enable bidirectional real-time voice and object transfers between the runtime server 806 and the third-party application 802.

The SDK 804 may include a visual state module 920. For example, a visual state may be an object (e.g., in a JavaScript® Object Notation (JSON FILE®) format) that describes a current state and content of user interface elements currently being presented (displayed) in the GUI for the third-party application. The visual object may be associated (synchronized) with voice user commands or input. The visual state module 920 may determine a visual state for the third-party application and may associate the visual state with current voice user commands or input. Referring to FIG. 8, the visual state module 920 may synchronize the visual state with runtime server 806 so that the third-party application scripts 812 used for interfacing with (e.g., generating, updating) the user interface of the third-party application 802 are in sync with what is currently being presented (displayed) in the GUI for the third-party application 802.

Figure 10:
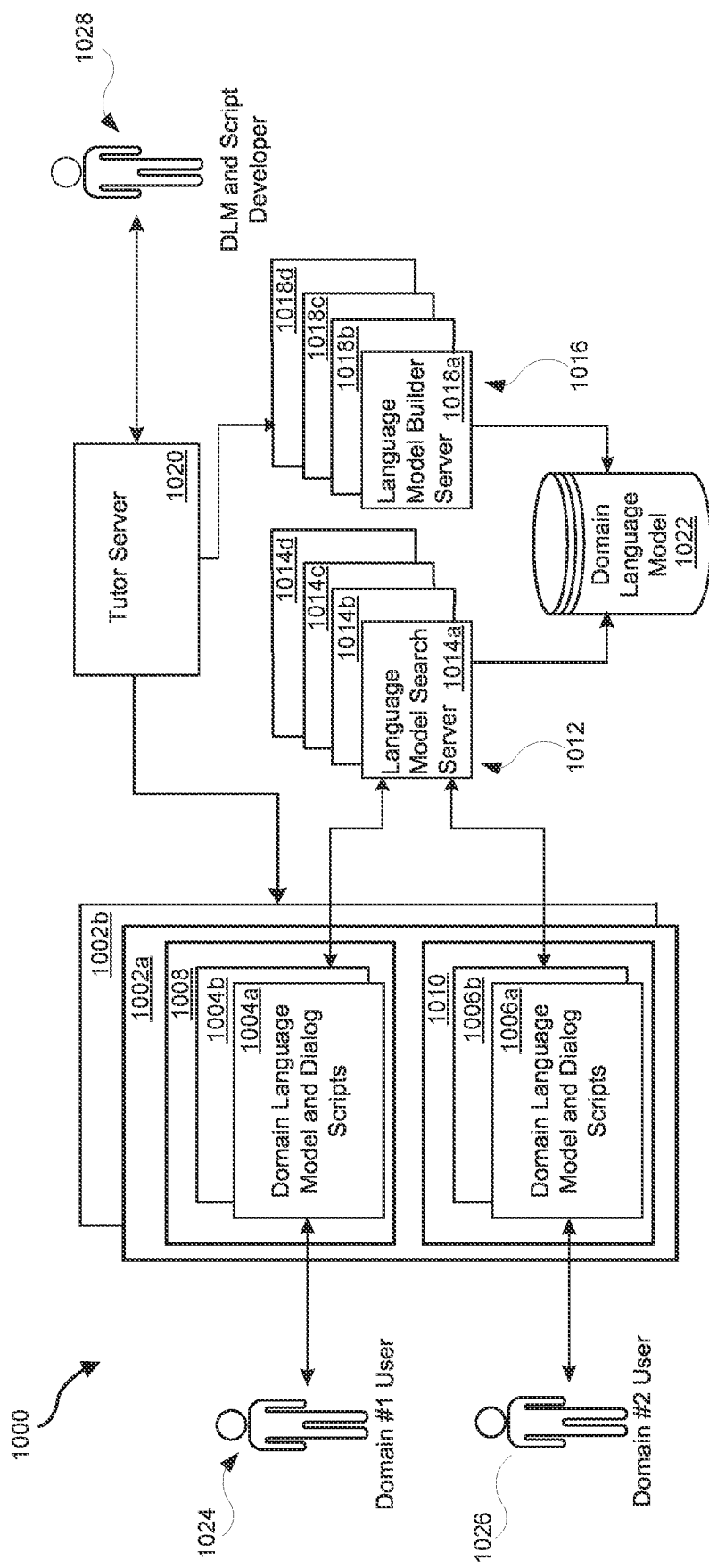
FIG. 10 is an illustration of an exemplary server system for including in a system for providing assistive voice control to a third-party application.

FIG. 10 is an illustration of an exemplary server system 1000 for including in a system (e.g., the exemplary system 800 as shown in FIG. 8) for providing assistive voice control to a third-party application. The server system 1000 may include one or more runtime servers (e.g., runtime servers 1002*a-b*). In some implementations, a Kubernetes© cluster using autoscaling may manage the runtime servers 1002*a-b* to ensure that enough computing resources are available. Referring to FIG. 8, the server system 1000 may manage domain language models (e.g., domain language models stored in the DLM database 808), domain language model and dialog scripts (e.g., third-party application scripts 812), and/or the orchestrating of one or more virtual machines (e.g., domain virtual machine 810) that may execute the domain scripts.

A runtime server may oversee and manage the operation of one or more virtual machines (e.g., virtual machine (VM) 1008 and virtual machine (VM) 1010). Each virtual machine may run one or more domain language model and dialog scripts. For example, the VM 1008 may run domain language model and dialog scripts 1004*a-b*. The VM 1010 may run domain language model and dialog scripts 1006*a-b*. Though the example server system 1000 shows two virtual machines, VM 1008 and VM 1010, in some implementations, a server system for including in a system that provides assistive voice control to a third-party application may include less than two virtual machines (e.g., one virtual machine). In some implementations, a server system for including in a system that provides assistive voice control to a third-party application may include more than two virtual machines (e.g., three or more virtual machines). Though the example server system 1000 shows a virtual machine running two domain language model and dialog scripts (e.g., VM 1008 running domain language model and dialog scripts 1004*a-b* and VM 1010 running domain language model and dialog scripts 1006*a-b*), in some implementations a virtual machine may run (execute) less than two domain language model and dialog scripts (e.g., one domain language model and dialog script). In some implementations, a virtual machine may run (execute) more than two domain language model and dialog scripts (e.g., three or more domain language model and dialog scripts). Though the example server system 1000 shows two runtime servers 1002*a-b*, in some implementations a server system may include less than two runtime servers (e.g., one runtime server). In some implementations, a server system may include more than two runtime servers (e.g., three or more runtime server). In addition, each runtime server may include one or more virtual machines that each may include one or more domain language model and dialog scripts.

One or more language model search servers may run search and/or patterns in one or more language models in parallel. When running the searches and patterns, the language model search servers may interface with the domain language model and dialog scripts included in one or more virtual machines on one or more runtime servers and a domain language model database. For example, a language model search server cluster 1012 may include one or more language model search servers (e.g., language model search servers 1014*a-d*). The language model search servers 1014*a-d* may interface with the VM 1008 and the VM 1010 on the runtime server 1002*a*. The language model search servers 1014*a-d* may interface with a domain language model (DLM) database 1022. The DLM database 1022 may store language models. For example, the DLM database 1022 may be the DLM database 808 as shown in FIG. 8.

One or more language model builder servers may be responsible for building computationally intensive language models. The one or more language model builder servers may store these language models in a domain language model database. The domain language model database may provide the one or more language model search servers with one or more language models for use by the one or more language model search servers for running search and/or patterns in parallel. For example, a language model builder server cluster 1016 may include one or more language model builder servers (e.g., language model builder servers 1018*a-d*). The language model builder servers 1018*a-d* may interface with the DLM database 1022. The language model builder servers 1018*a-d* may build language models that may be store in the DLM database 1022 for access by the language model search servers 1014*a-d*. In some implementations, the DLM database 1022 may also cache intermediate results of language model builds by the language model builder servers 1018*a-d*.

The language model search servers 1014*a-d* may run search and/or patterns against the domain language models stored in the DLM database 1022 based on the domain language model and dialog scripts 1004*a-b* and/or the domain language model and dialog scripts 1006*a-b*. The runtime server 1002*a* may use the outcome of these pattern searches when providing assistive voice control to a third-party application. For example, a first domain user 1024 may be running a third-party application on a computing device of the first domain user. The computing device of the first domain user may interface with the runtime server 1002*a* by way of, for example, a network. For example, a second domain user 1026 may be running a third-party application on a computing device of the second domain user. The computing device of the second domain user may interface with the runtime server 1002*a* by way of, for example, a network. Such examples are shown, for example, with reference to FIG. 8.

A tutor server may interface with one or more language model builder servers and/or one or more runtime servers. A computing device of a domain language model (DLM) and script developer may interface with the tutor server. For example, a DLM and script developer 1028 may use a computing device to interface with a tutor server 1020. The DLM and script developer 1028 may interface with a tutor application executing on the tutor server. The tutor server 1020 may be the tutor 814 as shown in FIG. 8.

For example, the tutor application may provide the DLM and script developer 1028 with a graphical user interface (GUI) for use in building and managing the analytics for the domain language models stored in the DLM database 1022. The DLM and script developer 1028, using the GUI of the tutor application, may create, edit, debug, test, and/or monitor domain language models included in the DLM database 1022. In addition, or in the alternative, the tutor application may provide the DLM and script developer 1028 with a GUI for use in defining the logic of dialog flows and business logic in the third-party application 802.

One or more networks may provide the interface between the servers and/or database(s) shown in FIG. 10. For example, the language model search server cluster 1012 may interface with the runtime server 1002*a* by way of a first network when accessing the VM 1008 and the VM 1010. For example, the tutor server 1020 may interface with the language model builder server cluster 1016 by way of a second network. For example, the tutor server 1020 may interface with the runtime servers 1002*a-b* by way of a third network. For example, the language model search server cluster 1012 may interface with the DLM database 1022 by way of a fourth network. For example, the language model builder server cluster 1016 may interface with the DLM database 1022 by way of a fifth network. In some implementations, the fourth network and the fifth network may be the same network. In some implementations, the first network, the second network, the third network, the fourth network, and the fifth network may be the same network. In some implementations, the first network, the second network, the third network, the fourth network, and the fifth network may be different networks.

Figure 11:
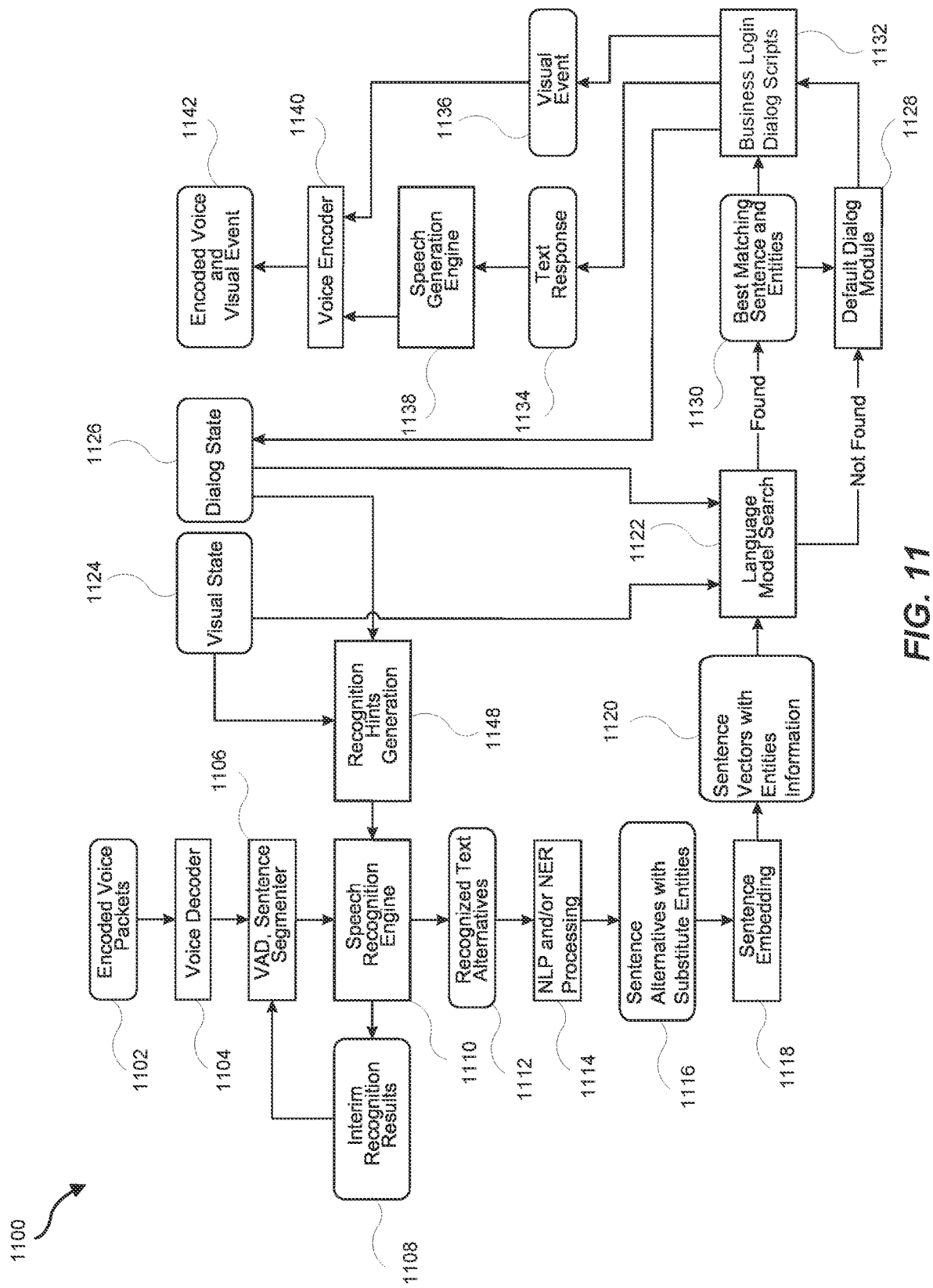
FIG. 11 is a block diagram of an exemplary request process for generating a voice response and visual signals that change a state of a user interface for a third-party application based on received raw encoded voice data and visual state data for the third-party application.

FIG. 11 is a block diagram of an exemplary request process 1100 for generating a voice response and visual signals that change a state of a user interface for a third-party application based on received raw encoded voice data and visual state data for the third-party application. The steps and blocks of the process shown in FIG. 11 may be performed by any suitable computer-executable code and/or computing system, including the system(s) illustrated in FIGS. 1 and 8-10. In one example, the steps of the process shown in FIG. 11 may represent an algorithm whose structure includes and/or is represented by multiple sub-steps, examples of which will be provided in greater detail below.

As illustrated in FIG. 11, at step 1102 one or more of the systems described herein may receive one or more encoded voice packets. For example, a computing device executing a third-party application may capture spoken words of a user. The computing device may encode the spoken words into one or more voice packets.

The systems described herein may perform step 1102 in a variety of ways. In one example, the voice support module 112 of the third-party application 104 may capture audio data comprising at least one voice command from the user of the client device 102 (e.g., via a microphone of the client device 102). The voice support module 112 may capture the audio data as one or more encoded voice packets. In another example, the voice recorder 904 of the SDK 804 may record the spoken words of the user of the computing device that is executing the third-party application 802. The voice encoder 908 may encode the spoken words of the user into one or more voice packets.

At step 1104 one or more of the systems described herein may provide the encoded voice packets to a voice decoder. For example, the voice decoder may decode the one or more encoded voice packets (or frames) into one or more raw voice frames.

The systems described herein may perform step 1104 in a variety of ways. In one example, the voice encoder 908 may provide the encoded voice packets to the voice decoder 912. The voice decoder 912 may decode the one or more encoded voice packets (or frames) into one or more raw voice frames.

At step 1106 one or more of the systems described herein may provide the decoded one or more raw voice frames to a voice activity detector (VAD) or sentence segmenter that may perform sentence segmentation. For example, a voice activity detector may mark a raw voice frame as speech. A sentence segmenter may maintain a queue with enough voice frames such that the voice frames in the queue may be classified as a phrase.

The systems described herein may perform step 1106 in a variety of ways. In one example, the audio processing module 208 may include a sentence segmenter for identifying individual sentences within received audio data. For example, the audio processing module 208 may recognize pauses within the audio data as divisions between sentences.

At step 1148 one or more of the systems described herein may receive a visual state (block 1124) and a dialog state (1126) of a third-party application and generate one or more speech recognition hints for use by a speech recognition engine (in step 1110). For example, a visual state may be an object (e.g., in a JavaScript® Object Notation (JSON FILE®) format) that describes a current state and content of user interface elements currently being presented (displayed) in a GUI for a third-party application. A dialog state may be a stack of active dialog contexts for the third-party application.

The systems described herein may perform step 1148 in a variety of ways. In one example, the visual state module 920 may determine a visual state for the third-party application and may associate the visual state with current voice user commands or input. Referring to FIG. 8, the visual state module 920 may synchronize the and the visual state and the dialog state with the runtime server 806 so that the third-party application scripts 812 used for interfacing with (e.g., generating, updating) the user interface of the third-party application 802 are in sync with what is currently being presented (displayed) in the GUI for the third-party application 802

At step 1110 one or more of the systems described herein may receive the identified individual sentences from a voice activity detector (VAD) or sentence segmenter. For example, a speech recognition engine may be an automated speech recognition (ASR) engine that may perform an automated process of transforming the one or more received raw voice frames to a sequence or multiple sequences of words.

The systems described herein may perform step 1110 in a variety of ways. In one example, the speech recognition module 110 may include an ASR engine. The speech recognition module 110 may analyze the received user utterance data and may generate at least one textual transcription of the user utterances. The one or more raw voice frames may be provided to the speech recognition module 110 one at a time or multiply. Providing multiple raw voice frames to the speech recognition module 110 may allow the speech recognition module 110 to generate more alternatives for the textual transcript of the user utterances.

The speech recognition engine may generate recognized text alternatives for user utterances. For example, a speech recognition engine may provide an ordered list of recognized text alternatives for one or more raw voice frames at block 1112. In one example, the result of the iterative process of voice activity detection and sentence segmentation in step 1106, speech recognition in step 1110, interim recognition results in block 1108 which may be generated by the speech recognition in step 1110 and then fed back into the voice activity detection and sentence segmentation at step 1106 may result in a list of sentence alternatives ordered by confidence (e.g., recognized text alternative for one or more raw voice frames). In some implementations, the ordered list of recognized text alternatives may include twenty alternatives. In some implementations, the ordered list of recognized text alternatives may include less than twenty alternatives (e.g., fifteen alternatives, ten alternatives, five alternatives). In some implementations, the ordered list of recognized text alternatives may include more than twenty alternatives (e.g., twenty-five alternatives).

At step 1114, one or more of the systems described herein may receive the list of recognized text alternatives for use in generating one or more entity hypotheses for each text alternative. A runtime server may use natural language processing (NLP) and/or named-entity recognition (NER) to generate entity hypotheses. For example, the recognized text of "send email to Michael" may generate the following five example hypotheses:

"send email to Michael"
"send email to $(NAME)", {NAME=Michael}
"send $(NP) to Michael" {NP=email}
"send $(NP) to $(NAME)" {NP=email, NAME=Michael}
"send $(NP) to $(NP)" {NP=[email, Michael]}
where NP=Noun Phrase The systems described herein may perform step 1114 in a variety of ways. In one example, a virtual machine (e.g., the Domain (VM) 114, the VM 1008, the VM 1010) included in a server (e.g., voice support server 108, runtime server 1002a) may receive the list of recognized text alternatives from the speech recognition module 110. The virtual machine (e.g., the Domain (VM) 114, the VM 1008, the VM 1010) may use domain language model and dialog scripts (e.g., domain language model and dialog scripts 1004a-b, domain language model and dialog scripts 1006a-b) to generate one or more entity hypotheses for each text alternative. For example, generating the alternative substitute entities for each identified sentence alternative may include a virtual machine (e.g., the VM 1008) grouping the sentence alternatives into multiple batches and providing each batch to the language model search server cluster 1012. The language model search servers 1014a-d may process the generating of the alternative substitute entities for each identified sentence alternative in parallel significantly speeding up the process of generating the alternative substitute entities as sentence alternative with substitute entities in block 1116. In some implementations, one or more of the systems described herein may expand a total number of entity hypotheses to include multiple entity hypotheses for each sentence alternative. For example, there may be five hypotheses for each identified sentence alternative. Assuming a list of twenty sentence alternatives, there may be one hundred alternative substitute entities.

At step 1118, one or more of the systems described herein may receive each sentence alternative and may perform sentence embedding by converting each sentence alternative. For example, an embedding module may convert each sentence alternative by converting a semantic of each sentence alternative to a vector representation.

The systems described herein may perform step 1118 in a variety of ways. In one example, in order to effectively match each sentence alternative with intents corresponding to the patterns of the DLM 116, each expanded pattern of the DLM 116 may be converted into a semantic representation, such as a semantic vector. In some embodiments, the DLM generation module 202 may transmit each of the expanded patterns to the context embedding model 118, which converts the received patterns into corresponding semantic vectors (e.g., the sentence vectors with entities information in block 1120).

At step 1122, one or more of the systems described herein may receive sentence vectors with entity information, a visual state of the third-party application at the time of the user utterance of the raw encoded voice data associated with the sentence alternative (block 1124), and a dialog state of the third-party application at the time of the user utterance of the raw encoded voice data associated with the sentence alternative (block 1126). For example, a language model search server may receive the semantic vectors along with the visual state and the dialog state of the third-party application from a runtime server.

The systems described herein may perform step 1122 in a variety of ways. In one example, the language model search server cluster 1012 may receive the sentence vectors with entities information. The language model search server cluster 1012 may run each sentence vector representative of a sentence alternative against the language models included in the DLM database 1022 to determine probabilities of pattern matching of the sentence alternative to language models given a dialog state and visual state of the third-party application at the time of the user utterance of the raw encoded voice data associated with the sentence alternative. For example, the runtime server 1002a, and specifically the domain language model and dialog scripts 1004a-b, may provide the visual state and the dialog state of the third-party application to the language model search server cluster 1012.

At step 1128, one or more of the systems described herein may determine that there are no pattern matchings of the sentence alternative to language models. In this situation, a language model search server may generate a general answer (a general sentence) using, for example, a seq2seq model pretrained on a Cornell Movie-Dialog corpus dataset.

The general sentence may be provided to business logic and dialog scripts for the third-party application (step 1132).

The systems described herein may perform step 1128 in a variety of ways. In one example, a language model search server (e.g., the language model search server 1014a) may receive the sentence vectors with entities information. The language model search server (e.g., the language model search server 1014a) may run each sentence vector representative of a sentence alternative against the language models included in the DLM database 1022. The language model search server (e.g., the language model search server 1014a) may determine that there is no match of a sentence vector for a sentence alternative to a language model included in the DLM database 1022. The language model search server (e.g., the language model search server 1014a) may generate a general answer (a general sentence) for matching with the sentence alternative.

At step 1122, one or more of the systems described herein may determine that there are one or more pattern matchings of the sentence alternative to language models. In this situation, the best matching sentences and entities to the sentence alternative at block 1130 may be provided to business logic and dialog scripts for the third-party application (step 1132).

The systems described herein may perform step 1122 in a variety of ways. In one example, a language model search server (e.g., the language model search server 1014a) may receive the sentence vectors with entities information. The language model search server (e.g., the language model search server 1014a) may run each sentence vector representative of a sentence alternative against the language models included in the DLM database 1022. The language model search server (e.g., the language model search server 1014a) may determine that there is at least one match of a sentence vector for a sentence alternative to a language model included in the DLM database 1022. The language model search server (e.g., the language model search server 1014a) may provide the best matching sentence and entities at block 1130 to business logic and dialog scripts for the third-party application (step 1132).

At step 1132, one or more of the systems described herein may run or execute a business logic dialog script using the provided sentence and entities. The execution of the dialog script may produce a text response (block 1134) and a corresponding visual response (block 1136) and may update a dialog state (block 1126) of the third-party application.

The systems described herein may perform step 1132 in a variety of ways. In one example, the VM 1008 may run or execute one or more of the domain language model and dialog scripts 1004a-b to produce the visual event and voice data 822. The VM 1008 may provide the visual event and voice data 822 to the SDK 804 for producing or generating a text response and a corresponding visual response for the third-party application. The SDK 804 may also update a dialog state of the third-party application.

At step 1138, one or more of the systems described herein may receive a text response and covert the text to speech. For example, a speech generation engine may convert a text response to speech.

The systems described herein may perform step 1138 in a variety of ways. In one example, the VM 1008 may include a speech generation engine that converts the text response in block 1134 to voice data.

At step 1140, one or more of the systems described herein may encode the voice data and synchronize the voice data with the visual event (block 1136) to generate an encoded voice and visual event (block 1142). For example, a voice encoder may encode the voice data generated by a speech generation engine. Third-party application scripts (domain language model and dialog scripts) may use an application programming interface (API) of a third-party application server to obtain information and data for use in generating and synchronizing a voice response with a visual response.

The systems described herein may perform step 1140 in a variety of ways. In one example, the SDK 804 may include a visual event synchronization module 916. Dialog scripts may interface with the visual event synchronization module 916 to synchronize a visual event with a voice response. For example, the third-party application scripts 812 may use an API of the third-party application server 816 to obtain information and data for use in synchronizing the encoded voice data (e.g., a voice response) with the visual event (block 1136) (e.g., a visual response). The visual event and voice data 822 (e.g., the encoded voice data synchronized with the visual event in block 1142) may be provided to the SDK 804 for integration into the user interface of the third-party application 802.

For example, referring to FIG. 8, the domain virtual machine 810 may provide data for the visual event and voice data 822 to the SDK 804, using an onCommand( ) handler for each response, for playing and processing by the third-party application 802. The onCommand( ) handler may update user interface elements of the user interface for the third-party application 802. The SDK 804 may implement a Play Queue asynchronous service that plays the voice and calls the appropriate onCommand( ) handler to update the user interface for the third-party application 802 based on the visual event. Because the visual context may be available on the runtime server 806, the application developer 824 may access the visual context data to determine one or more appropriate functions to be formed by the SDK 804 as the SDK 804 processes the commands in the current visual context for the third-party application 802.

Example 14 is example code that includes commands that may be processed by the SDK 804.

Example 14

```
intent ("(my |) (first |) (name) (is |) $(F*.*)", p=>{p.play
({cmd: "setFirstname", value: p.F});
    p.play("got it");});
```

Referring to the code in Example 14, the runtime server 806 may recognize spoken input as a first name (e.g., "Jane"). The spoken input may be the voice content of the received visual state and voice data 820. In response, the runtime server 806 may provide visual event and voice data 822 that invokes the form field first name to be filled with text "Jane" and a voice content to be "got it."

In some implementations, a setVisualState( ) function included in the SDK 804 may be used to provide the runtime server 806 with available options for the processing of the intent function that may include parameters for use by the intent function. The setVisualState( ) function may provide the runtime server 806 with visual context data and information for use in dynamically processing the third-party application scripts 812.

Example 15 is example code that uses the setVisualState( ) function.

Example 15

```
//sent by SDK to the runtime server//
    setVisualState({options:          "muscle
pain~1|headacke~2|cough~3"});
    //example of a third-party application runtime script//
    intent("I have $(I~ V:options) $(I~|) $(I~|)", p=>{p.play
({cmd: "selectOptions"; value: p.l_});
    p.play('You selected the following options: ${p.l_.map
(i→i.value).join(' ')}');});
```

The code in Example 15 may invoke the setVisualState function to send possible options for selecting in a current user interface of the third-party application 802 (a current visual state of the third-party application 802 as in the visual state and voice data 820) to the third-party application scripts 812. The runtime server 806 may use the information and data provided by the setVisualState function to parametrize the intent function. For example, when the user responds with the spoken words ("I have muscle pain and cough") these spoken words provided as the voice data in the visual state and voice data 820, the runtime server 806, and specifically the domain virtual machine 810 running the third-party application scripts 812, may provide the visual event and voice data 822 as appropriate values to the SDK 804 for selection in the UI if the third-party application 802.

The SDK 804 may use the same set of functions with a plurality of different operating system platforms, frameworks, and/or libraries that may include, but are not limited to, iOS®, Android®, Ionic®, React.js, or Flutter®. The plurality of different operating system platforms, frameworks, and/or libraries may run or execute platform-agnostic computer-readable instructions that may include, but are not limited to, a set of functions.

For example, the set of functions may include but are not limited to:

onCommand(Function commandHandler). This function may set a callback function to handle commands received from a third-party application script. An SDK may invoke this callback function to update user interface elements in a UI for the third-party application.

setVisualState(JSON state). This function may send a visual state and any additional data to filter intents or to help understand the third-party application script understand what a user may be viewing in a current UI of the third-party application.

playText(String text). This function may play a text string as voice using, for example, a speech to text service.

playCommand(JSON obj). This function may invoke the commandHandler function included in the SDK 804.

callProjectApi(String functionName, JSON parameters, Function callback). This function may call the function "functionName" in the third-party application script 812.

The system 800 for providing assistive voice control to a third-party application as shown in FIG. 8 may provide a user with a real-time multimodal experience. The system may provide such an experience based on the streaming of the visual and voice elements from the third-party application 802 to the runtime server 806 (e.g., visual state and voice data 820 are streamed in sync from the third-party application 802 to the runtime server 806), the parallelization of the language model search as described with reference to FIGS. 10, 12, and 13 that ensures any delays by the runtime server 806 to provide the visual event and voice data 822 to the SDK 804 are minimal, and the streaming of the visual and voice elements from the runtime server 806 to the SDK 804 (e.g., visual event and voice data 822 are streamed from the runtime server 806 to the third-party application 802). The streaming between the SDK 804 and the runtime server 806 along with the parallelization of the language model search may provide a user of the third-party application 802 with a responsive, real-time experience.

Figure 19:
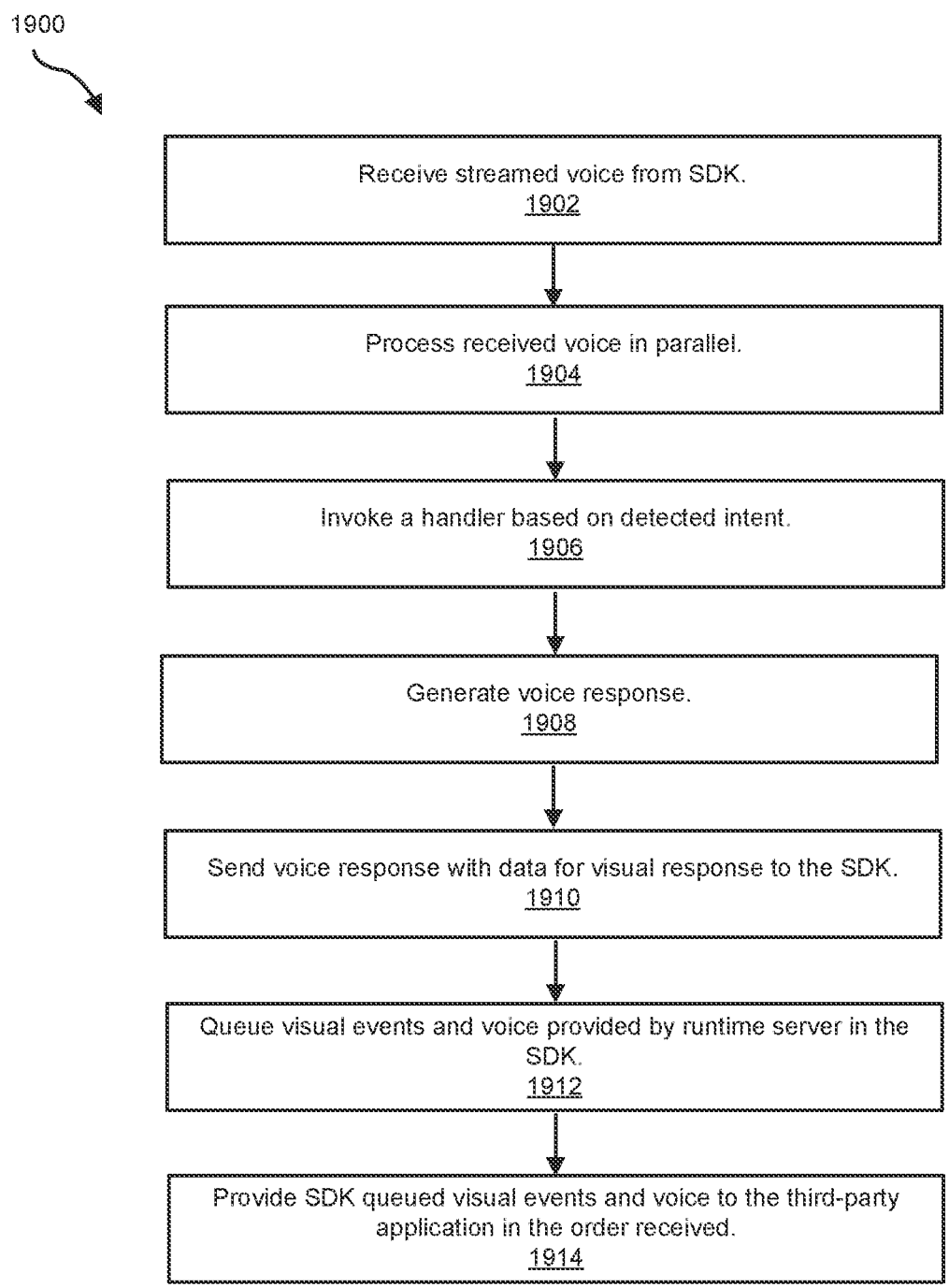
FIG. 19 is a diagram of example steps a system for providing assistive voice control to a third-party application may implement to provide a user with a real-time multimodal experience.

FIG. 19 is a diagram of example steps 1900 a system for providing assistive voice control to a third-party application may implement to provide a user with a real-time multimodal experience. The steps shown in FIG. 19 may be performed by any suitable computer-executable code and/or computing system, including the systems illustrated in FIGS. 1, 8, 10, and 13. In one example, each of the steps shown in FIG. 19 may represent an algorithm whose structure includes and/or is represented by multiple sub-steps, examples of which will be provided in greater detail below.

At step 1902, a runtime server may receive voice streamed from an SDK while a user, interfacing with a third-party application, is speaking. For example, the runtime server 806 may receive the visual state and voice data 820 as streamed in sync from the SDK 804 as a user interacts with a user interface of the third-party application 802. At step 1904, the runtime server may process the received voice in parallel to enable intent and entity detection in real-time as shown, for example, in FIG. 13. At step 1906, after intent is detected, the runtime server may invoke a handler (e.g., a JavaScript handler) in the third-party application scripts (e.g., the third-party application scripts 812). At step 1908, the handler invoked by the runtime server may generate a voice response. At step 1910, the runtime server may send (stream) the voice response using text-to-speech conversion along with the data for visual response to the SDK. The runtime server may build the audio and visual elements in a pipeline manner for streaming to the SDK. For example, the runtime server 806 sends (streams) the visual event and voice data 822 to the SDK 804. At step 1912, the visual events and voice received by the SDK are queued by the SDK in the order received from the runtime server. At step 1914, the SDK may provide the queued visual events and voice to the third-party application in the order received, synchronizing the audio and visual responses in the user interface of the third-party application providing synchronized voice response along with the relevant visual events.

To generate a language model, referring to FIG. 10, DLM and script developers (e.g., the DLM and script developer 1028) may provide a training set of sentence samples with marked up entities for each intent to the tutor server 1020 for use by the language model builder server cluster 1016 for generating a language model for storage in the domain language model database 1022. In some implementations, a larger training set may result in a higher quality language model. For example, the tutor server 1020 may provide a language that simplifies a definition of a training set of sentence samples. The syntax of the language may be based on alternatives and variables. For example, the alternatives may be separated using a character '|'. The language model generated based on a training set of sample sentences using the language captures the semantic of the patterns in the sentence samples while not necessarily capturing exact word use in the training set of sample sentences.

For example, an alternative syntax of the language in an example sentence (e.g., Example Sentence Pattern (1)) may be the following:

"(Hi|Hello) how are you (doing|)" Example Sentence Pattern (1) where (Hello|Hi) may define a first word in the example sentence to be "Hi" or "Hello," and (doing|) may define a last word in the example sentence to be either "doing" or empty " ".

The above example sentence pattern (1) may generate a language model that may match the following sentence samples:

"Hi how are you" Sentence Sample (1.1)
"Hi how are you doing" Sentence Sample (1.2)
"Hello how are you" Sentence Sample (1.3)
"Hello how are you doing" Sentence Sample (1.4)

A predefined set of general entities may include, but are not limited to: NUMBER (e.g., twenty-three, 2050), ORDINAL (e.g., second, 11th), NAME (e.g., Michael, Anne), LOC (e.g., a location such as 1290 Reamwood Ave, Sunnyvale), TIME (e.g., 5:30 pm, midnight), and DATE (e.g., tomorrow, January 2$^{nd}$)

For example, an alternative syntax of the language in an example sentence (e.g., Example Sentence Pattern (2)) utilizing one or more of the general entities may be the following:

"(Create|Schedule) a meeting with $(NAME) on $(DATE) at $(TIME) in $(LOC)"
Example Sentence Pattern (2)

The language model may include the following samples (e.g., language model samples):

"Create a meeting with $(NAME) on $(DATE) at $(TIME) in $(LOC)"
Language Model Sample (2.1)

"Schedule a meeting with $(NAME) on $(DATE) at $(TIME) in $(LOC)"
Language Model Sample (2.2)

For example, an alternative syntax of the language in an example sentence (e.g., Example Sentence Pattern (3)) utilizing one or more user entities may be the following:

"Build route to $(T home|parking lot|office|gym)"
Example Sentence Pattern (3)

The above example sentence pattern (3) may generate a language model that that may match the following sentence samples:

"Build route to home" Sentence Sample (3.1)
"Build route to parking lot" Sentence Sample (3.2)
The variable T may store the entity.

For example, an alternative syntax of the language in an example sentence (e.g., Example Sentence Pattern (4)) utilizing one or more user entities may be the following:

"Take $(F apple_|orange_)" Example Sentence Pattern (4)

An underscore "_" after a value may indicate that the entity should be pluralized. For example, the above example sentence pattern (4) may generate a language model that that may match the following sentence samples:

"Take apple" Sentence Sample (4.1)
"Take apples" Sentence Sample (4.2)
"Take orange" Sentence Sample (4.3)
"Take oranges" Sentence Sample (4.4)

For example, an alternative syntax of the language in an example sentence (e.g., Example Sentence Pattern (5)) utilizing one or more user fuzzy entities may be the following:

"Buy $(V~ iPad|iPhone|Android|Samsung)" Example Sentence Pattern (5)

The above example sentence pattern (5) may generate a language model that that may match the following sentence samples:

"Buy iPad" Sentence Sample (5.1)
"Buy Android" Sentence Sample (5.2)
"Buy Galaxy Note" Sentence Sample (5.3)

The "~" after the variable "V" may indicate fuzzy matching. Fuzzy matching may match "Galaxy Note" in the above example because "Galaxy Note" may be considered semantically similar to the other values listed in the pattern even though "Galaxy Note" was not specifically listed in the pattern. In some cases, fuzzy entities may have one or more labels for finding what pattern actually matched. For example, an alternative syntax of the language in an example sentence (e.g., Example Sentence Pattern (6)) utilizing one or more user fuzzy entities may be the following:

"Buy $(V~ . . . |Android~2|Samsung~3)" Example Sentence Pattern (6)

In the above example sentence pattern (6), V="Galaxy Note" and V.label=3. By using this label, it can easily be determined that "Galaxy Note" may match the pattern "Samsung".

Regular expressions may use application specific jargon that may not be enumerated or expressed using general entities. For example, an alternative syntax of the language in an example sentence (e.g., Example Sentence Pattern (7)) utilizing regular expressions may be the following:

"Find a (smartphone|phone) with $(M*\d+\s*(G|Gb|Gigabyte(s)?))"
Example Sentence Pattern (7)

The above example sentence pattern (7) may generate a language model that that may match the following sentence samples:

"Find phones with 64 G of memory" Sentence Sample (7.1)
"Find a phone with 12 Gb" Sentence Sample (7.2)
"Find a 24 Gigabytes phone" Sentence Sample (7.3)

The variable M may be followed by a "*" to indicate a regular expression, that may be "64 G", "12 Gb", "24 Gigabytes", etc.

For example, an alternative syntax of the language in an example sentence (e.g., Example Sentence Pattern (8)) utilizing regular expressions may be the following:

"Who is on $(U*(E|Engine)\s*\d{1,2})" Example Sentence Pattern (8)

The above example sentence pattern (8) may generate a language model that that may match the following sentence samples:

"Who is on E57" Sentence Sample (8.1)
"Who is on Engine 59" Sentence Sample (8.2)

A noun phrase may be a phrase that includes at least one noun (or indefinite pronoun) and/or a phrase that functions the same grammatically as a noun. For example, an alternative syntax of the language in an example sentence (e.g., Example Sentence Pattern (9)) utilizing noun phrases (e.g., variable NP) may be the following:

"Create $(NP) list" Example Sentence Pattern (9)

The above example sentence pattern (9) may generate a language model that that may match the following sentence sample:

"Please create groceries list" Sentence Sample (9.1)
where the noun pattern, NP="groceries."

The above example sentence pattern (9) may generate a language model that that may match the following sentence sample:

"Please create groceries list" Sentence Sample (9.1)
where the noun pattern, NP="groceries."

For example, an alternative syntax of the language in an example sentence (e.g., Example Sentence Pattern (10)) utilizing a simple noun phrase entity may be the following:

"Open $(NP)" Example Sentence Pattern (10)
will match: "open a bank account" NP="bank account"

The above example sentence pattern (10) may generate a language model that that may match the following sentence sample:

"Open a bank account" Sentence Sample (10.1)
where the noun pattern, NP="bank account."

For example, an alternative syntax of the language in an example sentence (e.g., Example Sentence Pattern (11)) utilizing a noun phrase entity with nouns restricted to those specified in a list included in the sentence may be the following:

"Find the (nearest|closet|) $(NP fire|injury) (incident_)"
Example Sentence Pattern (11)

The above example sentence pattern (11) maygenerate a language model that that may match the following sentence samples:
"find the nearest vegetation fire incident" Sentence Sample (11.1)
where the noun pattern, NP="vegetationfire."
"find severe injury incidents" Sentence Sample (11.2)
where the noun pattern, NP="severe injury."

For example, an alternative syntax of the language in an example sentence (e.g., Example Sentence Pattern (12)) utilizing a noun phrase entity that includes one or more nouns belonging to a class according to a WordNet® synonym classification may be the following:
"Would you like some $(NP^ food)" Example Sentence Pattern (12)

The above example sentence pattern (12) may generate a language model that that may match the following sentence sample:
"Would you like some fresh baked bread" Sentence Sample (12.1)
where the noun pattern, NP="fresh baked bread"

Language model patterns may be grouped to intents and may specify dialog scripts along with dialog and business logic. In some implementations, user defined entity lists, such as fuzzy and regular, may not be limited in size and may be generated any time by a script. For example, a pattern (13) may include:
let songs=['Hotel California', 'Get Over It', 'Good Day In Hell', 'Heartache Tonight', . . . ];
let songsList=songs.join('|');
intent("(play|put on) $(S~ ${songsList}) (by Eagles|)."

The pattern (13) may generate a language model that that may match the following sentence samples:
"play California Hotel" Sentence Sample (13.1)
"put on get over by eagles" Sentence Sample (13.2)

For example, titles of a song may not match exactly (e.g., as shown in sentence sample (13.2)) but the language model may still be able to recognize and match to the original song name.

Referring to FIGS. 8-10, a language model stored in a domain language model database (e.g., the domain language model database 808, the domain language model database 1022) may be a probability distribution over a sequence of words. In the system 800, a probability distribution may be conditioned on a current dialog state and a current visual state of a third-party application (e.g., the third-party application 802). In addition, or in the alternative, business logic scripts may dynamically change a probability distribution. In some implementations, a language model may utilize a nearest neighbors' approach.

Dialog Scripts (e.g., third-party application scripts 812, domain language and dialog scripts 1004a-b, domain language and dialog scripts 1006a-b) may define a set of intent patterns and conditions on a dialog state and a visual state. Pattern alternatives may be extended to sample strings with marked up entities. As described with reference to FIG. 11, sentence embedding may convert a semantic of a string to a vector. Sentence embedding may encode sentences into embedding vectors that specifically target transfer learning to natural language processing (NLP) tasks where each word may carry additional information about the entity it belongs to.

A sentence encoder may be trained in a supervised manner on a large dataset. A probability of a sentence belonging to the language model, and therefore matching a pattern, may be defined by a proximity of the sentence embedding vector to one or more vectors describing the pattern semantic and by a distance from other patterns.

A language model represented by a set of vectors with entity information may be very large (e.g., on the order of hundreds of thousands of vectors). To speed-up a search in this very large set of vectors, each vector may be assigned to at least one and up to 16 of 128 predefined clusters. A predefined cluster may be trained on a large dataset using a k-means clustering algorithm.

A language model (a domain language model) may be defined in dialog scripts and may be created in real-time as the dialog scripts are being executed. In addition, or in the alternative, a language model may be modified based on user interactions or a business logic execution. Therefore, the computationally intensive building of the language model may occur in real-time. Referring to FIGS. 8 and 10, in order to build language models in real-time, a server system (e.g., the server system 1000) for including in a system for providing assistive voice control to a third-party application (e.g., the exemplary system 800) may build (generate or create) language models by incrementally using a cache and parallelization to speed up the process.

Figure 12:
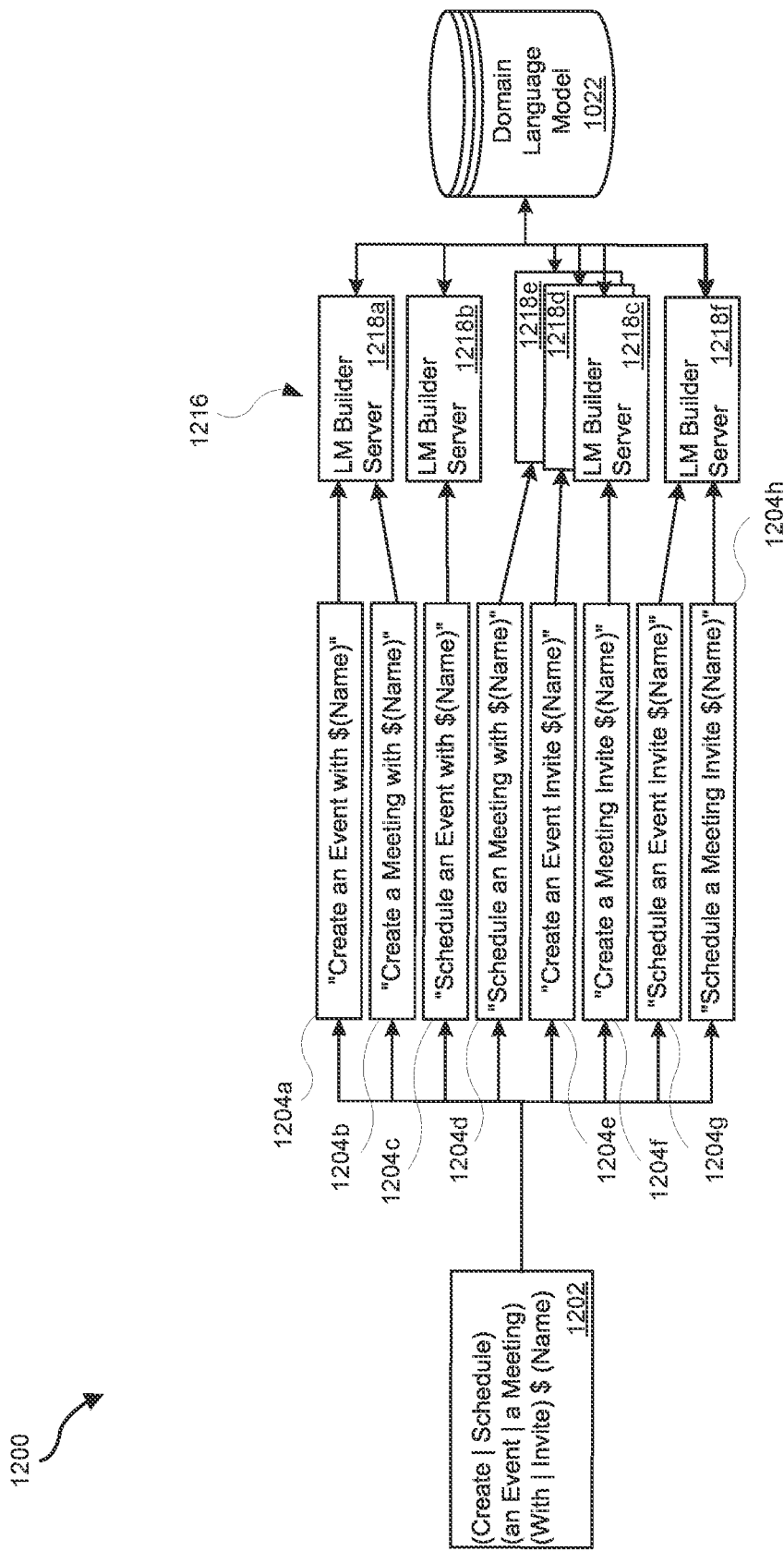
FIG. 12 is an illustration of an exemplary process for building language models by incrementally using a cache and parallelization.

FIG. 12 is an illustration of an exemplary process 1200 for building language models by incrementally using a cache and parallelization. In the exemplary process 1200, a sentence pattern 1202 may include alternatives separated using a character 'I', and entity parameter definitions preceded by a '$' character. The sentence pattern 1202 may generate one or more pattern vectors (e.g., pattern vectors 1204a-h). Each pattern vector 1204a-h may be input to a language model build server 1218 a-f included in a language model build server cluster 1216. Each language model build server 1218 a-f may access the domain language model database 1022, which may include a cache of intermediate results of language model builds by the language model builder servers 1218a-f. Each language model build server 1218 a-f may process the generating of alternative substitute entities for each pattern vector 1204a-h in parallel significantly speeding up the process of generating the alternative substitute entities.

Figure 13:
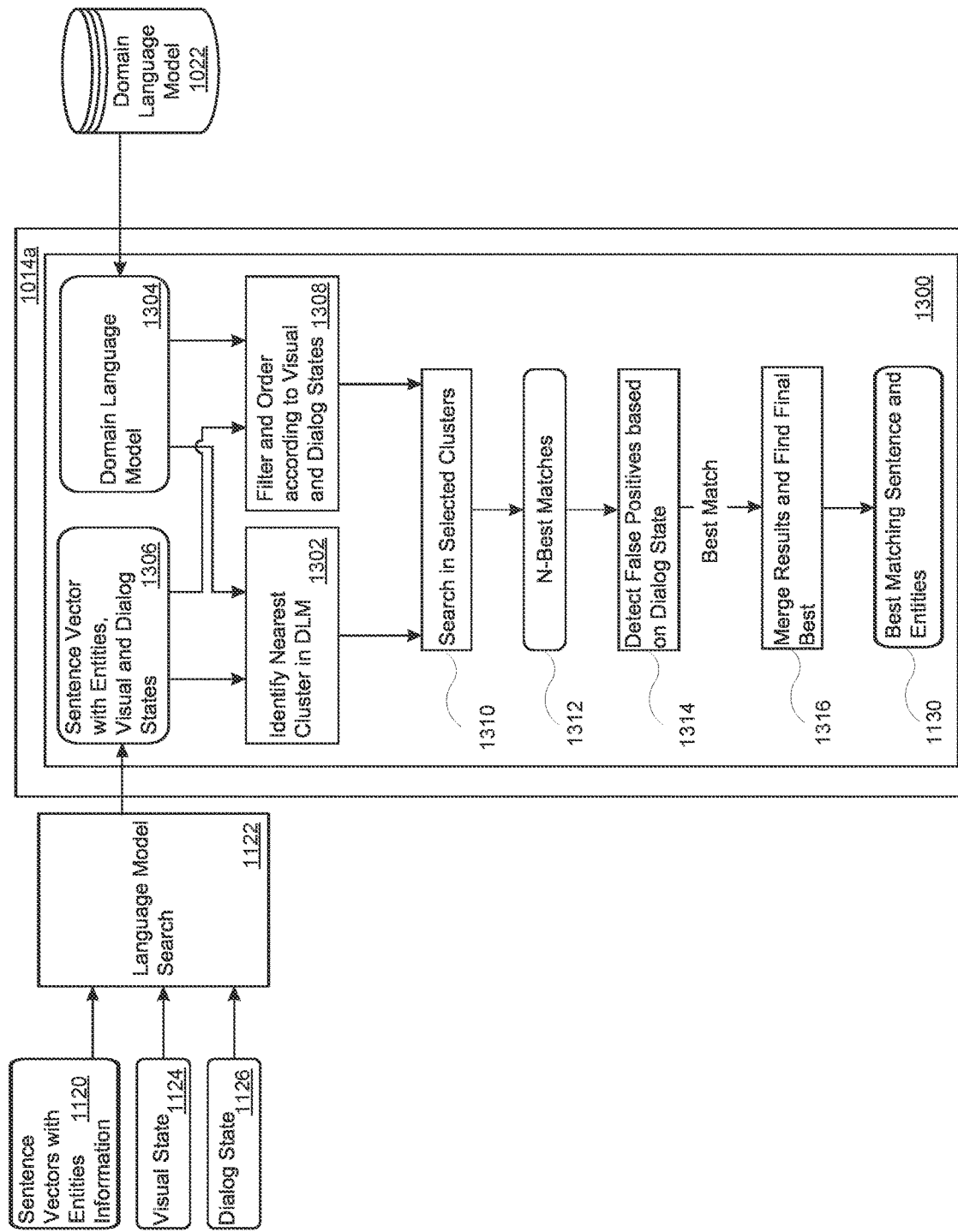
FIG. 13 is an illustration of an exemplary process for performing a language model search as executed by a language model search server.

FIG. 13 is an illustration of an exemplary process 1300 for performing a language model search as executed by a language model search server. For example, referring to FIGS. 10 and 11, a language model search server (e.g., the language model search server 1014a) may perform the process 1300. Step 1122 may perform the process 1300. Each of a plurality of language model search servers included on one or more language model search server clusters may perform a process similar to the process 1300 in parallel (parallelization) significantly speeding up the language model search process.

In some implementations, referring to FIG. 8, a runtime server (e.g., the runtime server 806) may maintain a domain-specific language model (DLM) that reflects the functionality of a third-party application. The language model for a domain may comprise a plurality of intent patterns that reflect different commands and their possible variations that may be issued by the user. The DLM may map each intent pattern to a corresponding action to be performed by the third-party application. A spoken language understanding of voice commands input to the third-party application may be based on the language model for the domain associated with the third-party application.

Referring to FIGS. 8 and 11, speech recognition using spoken language understanding may be used to generate the sentence vectors with entities information at block 1120 based on the spoken words of the user (e.g., voice data received by the third-party application 802). The process 1300 may use sentence vectors with entities, visual, and dialog states at block 1306 that includes the sentence vectors with entities information at block 1120 along with the current visual state of the third-party application (e.g., visual state at block 1124) and the current dialog state of the third-party application (e.g., dialog state at block 1126) to identify a best matching pattern in a DLM.

As illustrated in FIG. 13, at step 1302 one or more of the systems described herein may identify a nearest cluster in a domain language model. For example, an application executing on the language model search server 1014*a* may identify a nearest server cluster for a domain language model 1304 included in the domain language model database 1022.

The systems described herein may perform step 1302 in a variety of ways. In one example, referring to FIG. 11, a speech recognition engine at step 1110 may generate a list of sentence alternatives. In some implementations, the sentence alternatives may be listed in a descending order of confidence (e.g., higher confidence sentence alternatives are at the top of the list). For example, a size of the list may be, on average, about 10-20 items.

Each sentence alternative may be processed at step 1114 where a runtime server may use natural language processing (NLP) and/or named-entity recognition (NER) to generate entity hypotheses. For example, NLP may tokenize each sentence alternative and then process each tokenized sentence by marking tokens as belonging to an entity class with a probability. All sentences that include marked-up entities may be added to the original set of sentences.

For example, the sentence "Show weather for today in Sunnyvale" once processed at step 1114 may yield "Show weather for today in Sunnyvale," the original sentence and the following set of sentences with substituted entities:

"Show weather for $(DATE) in Sunnyvale"—the original sentence with a date "DATE" entity substituted for "today"

"Show weather for today in $(LOC)"—the original sentence with a location "LOC" entity substituted for "Sunnyvale"

"Show weather for $(DATE) in $(LOC)"—the original sentence with both a date entity and a location entity The set of sentences with substituted entities at block 1116 may be provided to a sentence embedding module for sentence embedding at step 1118. For example, a sentence embedding module may vectorize the set of sentences with substituted entities resulting in the sentence vectors with entities information at block 1120.

Because the resulting set of vectors may be quite large (e.g., on the order of about 50 to 100 items) to speed-up the processing, the sentence vectors with entities information at block 1120 may be split into multiple batches at step 1302, with further processing performed by a cluster of servers in parallel as shown, for example, in FIG. 12.

Referring to step 1302, each of the sentence vectors with entities information received from block 1120 may be assigned to a closest predefined identified server cluster to narrow down a potential scope of a search of a DLM for a best match. The domain language model 1304 may be a large collection of vectors with entity and pattern related metadata.

At step 1308, one or more of the systems described herein may limit the potential set of pattern vectors eligible for matching with the domain language model 1304 by filtering and/or ordering the potential set of pattern vectors based on the dialog state in block 1126 and the visual state in block 1124 of the third-party application at the time the voice data was received.

At step 1310, one or more of the systems described herein may perform a search of the DLM in the selected server clusters. For example, the search may result in a limited set of language models that provide N-best matches (e.g., N-best vectors) at step 1312. In performing the search, vector proximity may be defined by cosine similarity. However, simply choosing a pattern vector with a minimal distance may not provide a reliable solution because geometric distance may not be representative of a best match, which may lead to false positive matching.

At step 1314, one or more of the systems described herein may detect, for each sentence alternative, false positives based on a dialog state. For example, to filter out false positives, the N-best vectors may also have statistically significant differences from vectors belonging to other patterns. This statistical difference may be determined by normalizing the geometric distances using a softmax function along with a pretrained logistic regression model.

At step 1316, one or more of the systems described herein may merge all results and determine a best pattern match for a sentence alternative that is provided as a best matching sentence and entities in block 1130.

A language of an assistive voice control application may be based on both spoken language understanding (SLU) and Natural Language Understanding (NLU). The language may include multiple versions of an identified single input sentence. For example, an automated speech recognition (ASR) engine may receive raw voice data. The ASR may produce one or more text alternatives for the received raw data. In many cases, the text produced by the ASR may not be completely accurate and the output text for a spoken sentence may include one or more errors. A SLU engine may detect the presence of the erroneous text output based on contextual information for the third-party application when the voice data was received, such as a visual state and/or a dialog state of the third-party application.

For example, in some situations, a user may speak to and provide voice input to a third-party application using informal language (e.g., using many acronyms, not using proper grammar). In these situations, a SLU engine may not use computational linguistic based parsing techniques that may be otherwise used by a NLU engine for text based applications. The use of a probabilistic approach to spoken language understanding as described herein may address the use of informal language by a user interacting with a voice enabled third-party application.

For example, a probabilistic approach to spoken language understanding may include receiving a list of text alternatives for voice data from an automated speech recognition engine (e.g., see example sentence pattern (1) above). For each text alternative (each example sentence pattern), find example sentences that include all possible combinations of entities (e.g., see sentence samples (1.1) to (1.4) above). All text alternatives with all entities may be transformed to vectors. A domain language model search may then be used to find the best matching pattern or to determine that there is no matching pattern (e.g., see FIGS. 11 and 13).

Entity extraction may be performed on a text alternative for voice data received from an automated speech recognition engine as shown, for example, in example sentence patterns (2) to (13) above. As described, classes of entities may include, but are not limited to, general, user defined, user defined fuzzy, regular expressions (regex), and noun phrases. General entities may be detected using a Named Entity Recognition (NER) algorithm based on convolutional neural network and trained on a large dataset which may be periodically updated.

Figure 14:
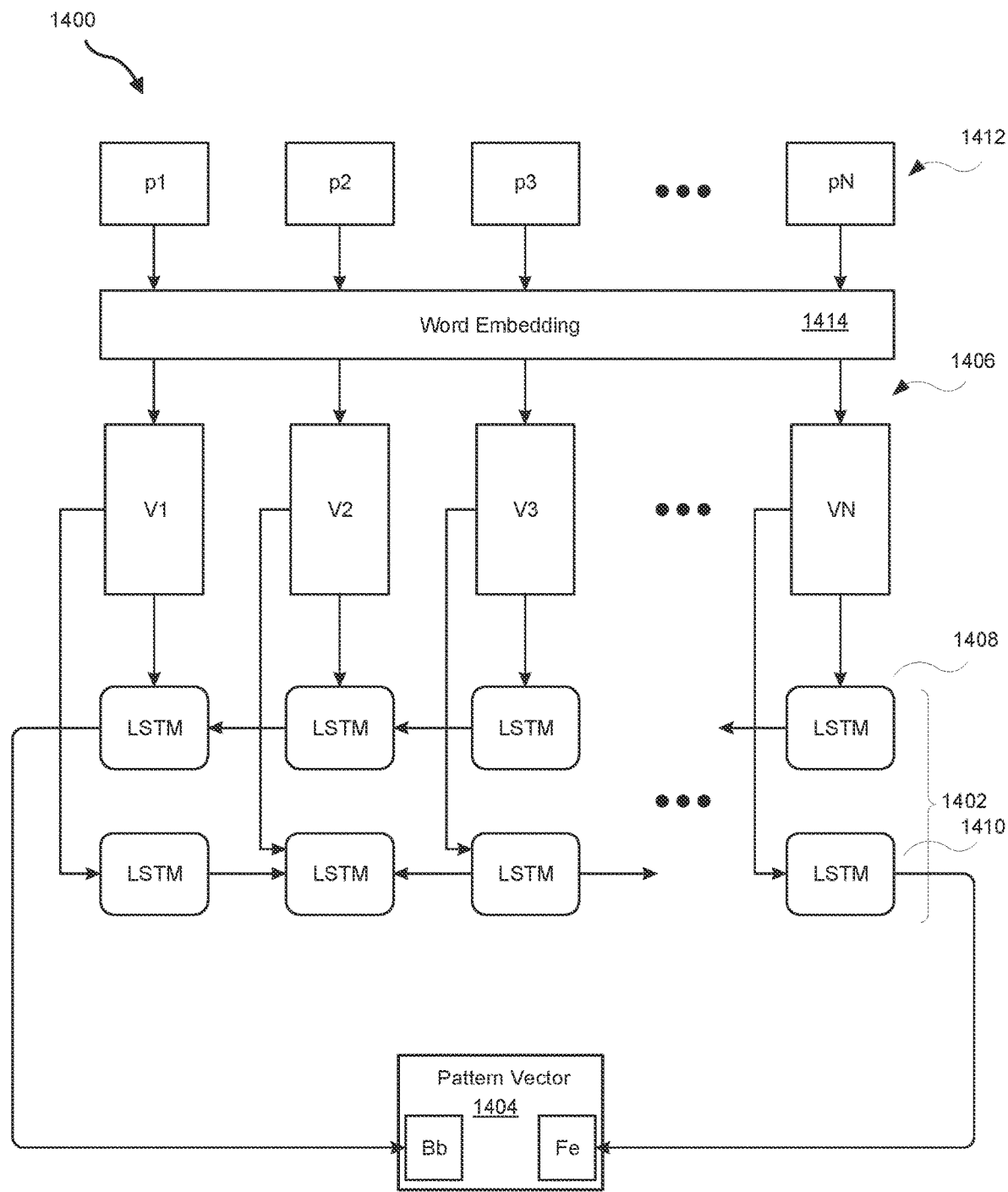
FIG. 14 is a block diagram of an exemplary system for encoding a tokenized text pattern for voice data into a pattern vector for use by an assistive voice control application that includes noun phrases.

FIG. 14 is a block diagram of an exemplary system 1400 for encoding a tokenized text pattern for voice data into a pattern vector 1404 for use by an assistive voice control application that includes noun phrases. For example, noun phrases may be detected using a neural network included in the system 1400 that may use pre-trained word vectors 1406 and two long short term memory (LSTM) networks (e.g., a bi-LSTM 1402 that includes a first LS™ 1408 and a second LSTM 1410) to encode a tokenized text pattern 1412 into the pattern vector 1404. A word embedding model 1414 may map words to vector representations such that words that are semantically related may be close to each other in the vector space. An example word embedding model may be word2vec. In some implementations, the neural network may be referred to as a pattern encoder.

Figure 15:
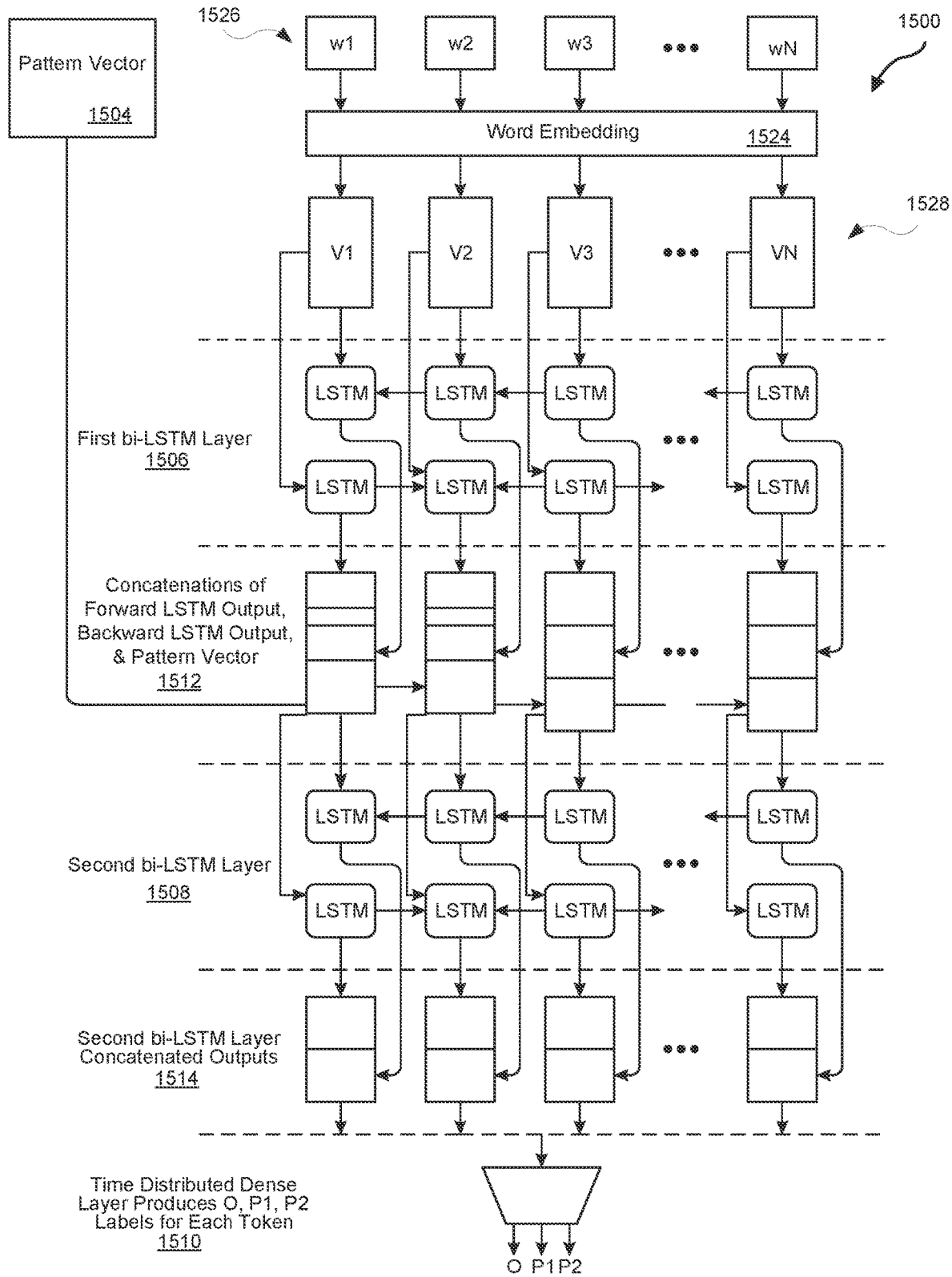
FIG. 15 is a block diagram of an exemplary system for decoding a tokenized string and a pattern vector 1504 for use by an assistive voice control application that includes noun phrases.

FIG. 15 is a block diagram of an exemplary system 1500 for decoding a tokenized string and a pattern vector 1504 for use by an assistive voice control application that includes noun phrases. The system 1500 may include a neural network, which may be referred to as a pattern decoder. The neural network may take a tokenized string 1526 and a pattern vector 1504 as input and assign all tokens in the tokenized string a label that specifies if the token belongs to an entity. An example of this is shown with reference to the example sentences and sentence patterns described herein. For example, referring to FIG. 14, the tokenized string 1526 may be the tokenized text pattern 1412 and the pattern vector 1504 may be the pattern vector 1404.

The system 1500 may include a word embedding model 1524 that maps words to vector representations such that words that are semantically related may be close to each other in the vector space. An example word embedding model may be word2vec. For example, the word embedding model 1524 may receive words 1526 and may output vectors 1528. The neural network may include two bi-LSTM layers (e.g., a first bi-LSTM layer 1506 and a second bi-LSTM layer 1508) and a time distributed dense layer 1510. The first bi-LSTM layer 1506 may receive vectors 1528 as input. The system 1500 may concatenate the pattern vector with the output of the first bi-LSTM layer 1506. The system 1500 may generate concatenations of the forward LSTM output, the backward LSTM output, and the pattern vector 1504 at layer 1512. The system 1500 may provide the output of layer 1512 to the second bi-LSTM layer 1508. The system 1500 may generate concatenated objects 1514 at the second bi-LSTM layer 1508 for input to the time distributed dense layer 1510. The time distributed dense layer 1510 may output one or more labels for each token in the tokenized string.

In some implementations, the neural network of the system 1400 and the neural network of the system 1500 may be trained as an encoder/decoder pair on a large training set of data in an unsupervised manner.

FIG. 16 is a table 1600 showing an example of encoding a sentence pattern to a pattern vector for the sentence. Referring to FIG. 15, the time distributed dense layer 1510 of the system 1500 may produce the labels "O", "P1", and "P2" for each sentence token. For example, the sentence pattern may be: "$(NP) jumps over $(NP)." Referring to FIG. 14, the first LSTM 1408 may encode the sentence pattern to a pattern vector that includes information about a context and position of noun phrases. If the pattern vector and the text "The quick brown fox jumps over the lazy dog" are provided to the system 1500, the output of the system 1500 may be a string 1602 that includes one or more labels 1604a-i for each token in the tokenized string. For example, labels 1604a and 1604e-g may be "O" indicating other. Labels 1604b-d may be "P1" indicating a first noun phrase (e.g., "quick brown fox"). Labels 1604 h-i may be "P2" indicating a second noun phrase (e.g., "lazy dog").

Figure 17:
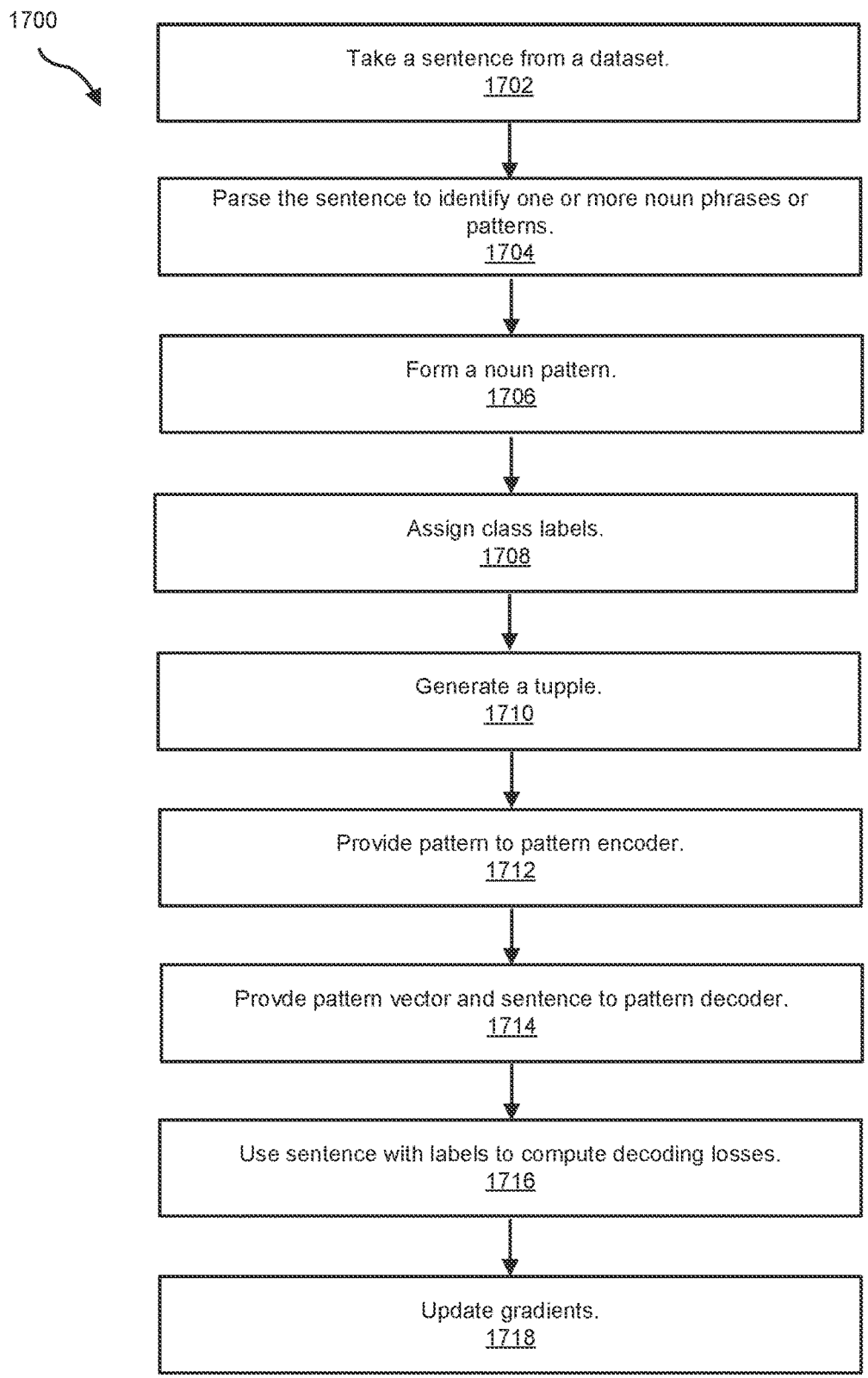
FIG. 17 is a diagram of example steps for a training algorithm for the neural network of the system and the neural network of the system as an encoder/decoder pair.

FIG. 17 is a diagram of example steps 1700 for a training algorithm for the neural network of the system 1400 and the neural network of the system 1500 as an encoder/decoder pair. The steps shown in FIG. 17 may be performed by any suitable computer-executable code and/or computing system, including the systems illustrated in FIGS. 1, 8, 10, and 12. In one example, each of the steps shown in FIG. 17 may represent an algorithm whose structure includes and/or is represented by multiple sub-steps, examples of which will be provided in greater detail below.

At step 1702, a sentence may be taken from a dataset. For example, sentence samples as discussed herein may be taken from a DLM database (e.g., the DLM database 1022 as shown in FIG. 10). At step 1704, a dependency parser may parse the sentence to identify one or more noun phrases or patterns. For example, sentence sample (10.1) may be parsed to determine that "bank account" is a noun pattern.

At step 1706, a noun pattern may be formed by replacing each identified noun phrase in the original sentence with a $(NP) marker (e.g., as shown in example sentence pattern (10)). At step 1708, class labels may be assigned to the tokens of the original sentence according to the noun phrases. At step 1710, a tuple may be generated that includes a pattern, a sentence, and a sentence with labels (e.g., see the example sentence patterns and sentence samples included herein).

At step 1712, a pattern may be provided to the pattern encoder to produce a pattern vector. For example, the system 1400 may receive the pattern for encoding into a pattern vector. At step 1714, the pattern vector and the sentence may be provided to the pattern decoder. For example, the system 1500 may receive the pattern vector and the sentence for decoding.

At step 1716, the sentence with labels may be used to compute any decoding losses. For example, the time distributed dense layer 1510 of the system 1500 may produce labels for each token. Decoding losses may be determined (computed) by comparing the output of the time distributed dense layer 1510 to the to the class labels assigned to the tokens of the original sentence according to the noun phrases. At step 1718, gradients and/or other variables for the pattern encoder and the pattern decoder may be updated based on any computed decoding losses.

In some implementations, the steps 1700 for the training algorithm for the neural network of the system 1400 and the neural network of the system 1500 as an encoder/decoder pair may be repeated to further refine the dataset for detecting noun phrases. Language model builder servers (e.g., the language model builder servers 1018a-d as shown in FIG. 10) may use and reuse the system 1400 and the system 1500 when building and updating domain language models. For example, as described with reference to FIG. 12, when a language model builder server builds or generates a domain language model an application executed by the language model builder server may determine (compute) a pattern vector and may store the pattern vector with the domain language model along with a sentence vector in the DLM database 1022.

As described herein, "sentence embedding" may refer to a process that converts a sentence to a vector representation of the sentence such that sentences with similar meaning have larger cosine similarities. Examples of sentence embedding processes are shown with reference to FIGS. 14 and 15. A sentence embedding process may use a word embedding model (e.g., the word embedding model 1414, the word embedding model 1524).

In some implementations, a universal sentence encoder may process a sentence by using an entity extraction process that replaces identified entities within a sentence with special tokens. Sentence embedding may use subword information for words not identified as entities within a sentence that may be replaced by tokens (e.g., regular words), but may not use subword information for words in the sentence identified as entities within the sentence that may be replaced by tokens. For example, a sentence embedding subword may be part of a word that may be useful for helping to reduce errors in an automatic speech recognition system. For example, the use of sentence embedding may improve natural language understanding of speech. For example, the use of sentence embedding would result in the sentence "lay the way" being semantically closer to the sentence "play the wave," where the use of word level embeddings would result in these two sentences being semantically far apart.

An application developer may create or generate a dialog script as described herein using the Javascript® programming language. In some cases, an application developer may generate a dialog script that matches the needs of a third-party application. For example, a dialog script may define contexts, intents, follows, language models, responses, and/or business logic.

FIG. 18 is an illustration of code for an example dialog script 1800 for use by a third-party application. Referring to FIG. 8, the dialog script 1800 may be a third-party application script included in the third-party application scripts 812. Referring to FIG. 10, the dialog script 1800 may be a dialog script included in the domain language model and dialog scripts 1004*a-b* or the domain language model and dialog scripts 1006*a-b*. Referring back to FIG. 8, the third-party application may be the third-party application 802.

For example, referring to FIG. 8, a flow of an interaction of a user with the third-party application 802 that includes assistive voice control may involve the use of the dialog script 1800 resulting in the execution of the code for interfacing with the third-party application 802. For example, the domain virtual machine 810 may execute the code of the dialog script 1800. The dialog script 1800 may include a general script 1802 and an opportunity script 1820 that each define a context. For example, to begin, a user interacting with the assistive voice control for the third-party application 802 may say "Show me what is the status of Company 1." Responsive to the spoken words, the SDK 804 may provide a visual state synchronized with voice data (e.g., the visual state and voice data 820) of the third-party application 802 to the domain virtual machine 810. The voice data may include a transcript or text representation of the spoken words of the user. The receipt of the visual state and voice data 820 may activate an intent function 1804 included in the general script 1802. The intent function 1804 may call a business logic callback with parameter COMP 1806 set to "Company1". The code 1800 may make a call to an application programming interface (API) (e.g., callRESTApi 1808) of the third-party application using the SDK 804.

A first call 1810 of the function p.play( ) that includes objects 1812 may send a visual signal to the computing device running the third-party application 802 to perform a visual event on the computing device (e.g., update a state of a user interface (e.g., a graphical user interface (GUI)) of the third-party application to include status information for Company1). A second call 1814 of the function p.play( ) that includes text 1816 may send a voice signal (generate voice output for the text 1816) for playing by the computing device synchronous with or immediately following the visual event. The voice signal may include generating voice output for the text 1816. For example, a first voice output may be audio output of the spoken words "Here is the current status of Company1." For example, the domain virtual machine 810 may provide the visual signal and the voice signal (e.g., the visual event and voice data 822) for incorporation into the third-party application 802 to the SDK 804.

To activate a context opportunity, a p.then( ) function 1818 may be called with an opportunity parameter 1822. Calling the p.then function 1818 with the opportunity parameter 1822 may activate a context opportunity 1824. A user interacting with the assistive voice control for the third-party application may speak the words "update revenue to 5 million" in response to the first voice output activating the follow function 1826 included in the opportunity script 1820. Responsive to the spoken words, the SDK 804 may provide a visual state synchronized with voice data (e.g., the visual state and voice data 820) of the third-party application 802 to the domain virtual machine 810. The voice data may include a transcript or text representation of the spoken words of the user. Once activated, the follow function 1826 may be eligible for matching parameters 1828 with the spoken words of the user. For example, based on the spoken words of the user, the follow function 1826 may be activated and callback may be called with the parameter "V" set equal to "update," and the parameter NUMBER set equal to 5,000,000.

The code for the dialog script 1800 may make another call to the API (e.g., callRESTApi 1830). A third call 1832 of the function p.play( ) that includes objects 1834 may send a visual signal to the computing device running the third-party application to perform a visual event on the computing device (e.g., update a state of a user interface (e.g., a graphical user interface (GUI)) of the third-party application to update the status information for Company1 as requested by the user). A fourth call 1836 of the function p.play( ) that includes text 1838 may send a voice signal (generate voice output for the text 1838) for playing by the computing device synchronous with or immediately following the visual event. For example, a second voice output may be audio output of the spoken words "Ok, updated to 5 million." The function api.past( ) 1840 may convert a sentence for use as the second voice output to the past tense. For example, the domain virtual machine 810 may provide the visual signal and the voice signal (e.g., the visual event and voice data 822) for incorporation into the third-party application 802 to the SDK 804.

In some implementations, an application developer may implement complex dialog flows using dialog scripts that define contexts, intents, follows, language models, responses, and/or business logic for dialog state management of a third-party application. For example, intents may be activated by pattern matching at any time along with a context of the activated intent. In addition, or in the alternative, a context may be activated programmatically. For example, active contexts may be organized in a stack with follows activated only for an activated context. In some implementations, if a pattern activates contexts that are not on the stack, the stack may be emptied. In some implementations, if a pattern activates contexts that are not on the top of the stack, then all contexts on the stack that are located below the activated contexts are evicted.

As described herein, user inputs to a third-party application may be visual and/or voice inputs and commands. Therefore, responses to the user inputs may be of two types: a visual event that may update a GUI of the third-party application, and text converted to voice that the third-party application may provide as voice output. Referring to FIG. 8, the SDK 804 may provide a visual state and/or voice data and/or a time-synchronized visual state with voice data (e.g., the visual state and voice data 820) of the third-party application 802 to the domain virtual machine 810. In addition, or in the alternative, the SDK 804 may receive one or more visual events and/or voice data and/or time-synchronized visual events and voice data (e.g., visual event and voice data 822) for incorporation into the third-party application 802 from the domain virtual machine 810.

In some implementations, a text response may use the same or similar language as a pattern (e.g., a pattern of a domain language model) to simplify the generation of a response. For example, the pattern: "I'm (doing |) (fine well)" may generate a response that may be one of: "I'm doing fine," "I'm fine", "I'm doing well," or "I'm well." An application developer creating a dialog script may use variables in generating a response in the same way as the variables are used in a pattern.

In some implementations, values of variables may help in choosing the best alternative of the voice response to play by the third-party application. For example, the pattern p.V="good," p.play("I feed $(V good|well)", "I'm ok") may result in the playing of "I feel good" for p.V=="good", and may result in the playing of "I'm ok" if p.V is not specified.

An assistive voice control application may utilize the systems, processes, methods, and techniques described herein to improve voice understanding. As described with reference to FIG. 11, the assistive voice control application may use a dialog state (e.g., block 1126) and a visual state (e.g., block 1124) of a third-party application to predict a user request and to generate voice recognition hints (e.g., step 1148). As described with reference to FIG. 11, the assistive voice control application may use alternative hypotheses produced by NLP and/or NER processing (e.g., step 1114), and expand a total number of entity hypotheses to include multiple entity hypotheses for each sentence alternative. A subsequent language model search may find a sentence alternative that is semantically the closest to the domain language model.

For example, a dialog script may include:
let SONGS=["Revolution", "The Wave", "Get Get Down", /* . . . */];
intent('(play|put on (song|track|) $(T~ ${SONGS})', p=>{p.play('playing ${p.T}');

For example, a user may say "play the wave." However, because of an accent, a quality of the voice input or background noise, speech to text conversion of the spoken words of the user may return one or more of the following alternatives: "lay the way", "play the way", "lay the wave." A language model search may find that "play the wave" with T="the wave" may the best possible match.

Figure 20:
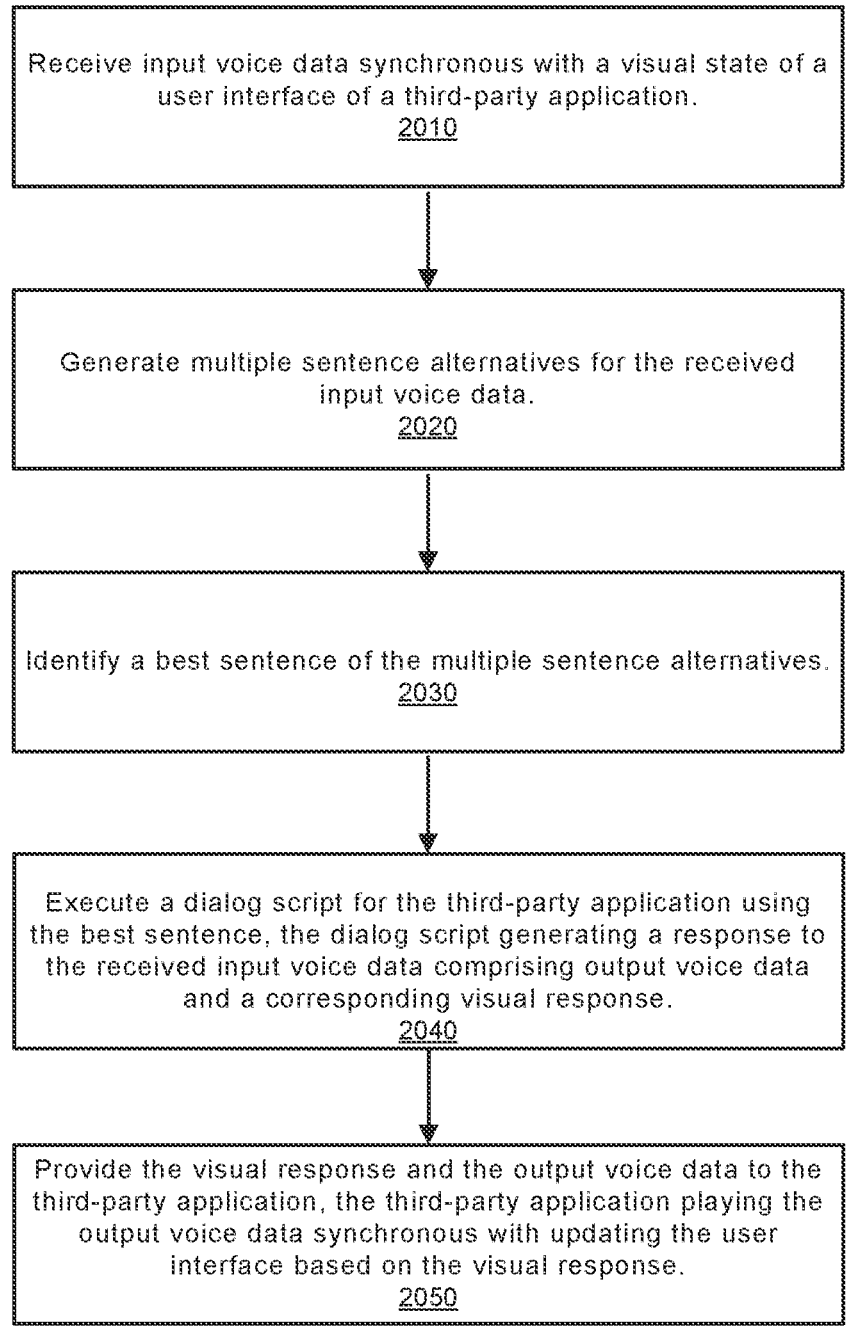
FIG. 20 is a flow diagram of an exemplary method for providing a multimodal interface to a third-party application.

FIG. 20 is a flow diagram of an exemplary computer-implemented method 2000 for providing a multimodal interface to a third-party application. The steps shown in FIG. 20 may be performed by any suitable computer-executable code and/or computing system, including the system(s) illustrated in FIGS. 1, 2, 8, 9, 10, and 13-15. In one example, each of the steps shown in FIG. 20 may represent an algorithm whose structure includes and/or is represented by multiple sub-steps, examples of which will be provided in greater detail below.

As illustrated in FIG. 20, at step 2010 one or more of the systems described herein may receive input voice data synchronous with a visual state of a user interface of a third-party application. For example, the runtime server 806 and specifically the domain virtual machine 810 may receive the visual state and voice data from the SDK 804 interfacing with the third-party application 802.

The systems described herein may perform step 2010 in a variety of ways. In one example, referring to FIG. 8, the runtime server 806 and specifically the domain virtual machine 810 may interface with the SDK 804 by way of a network 818. The SDK 804 may provide a visual state and/or voice data and/or a visual state synchronized with voice data (e.g., visual state and voice data 820) of the third-party application 802 to the domain virtual machine 810. The runtime server 806 and specifically the domain virtual machine 810 may include appropriate protocols to keep the visual state and visual event content for the third-party application 802 in sync with visual content data included on the runtime server 806, allowing for the synchronization of the visual state and voice data (e.g., visual state and voice data 820) and the visual event and voice data (e.g., visual event and voice data 822) with the runtime server 806 for incorporation into the third-party application 802.

As illustrated in FIG. 20, at step 2020 one or more of the systems described herein may generate multiple sentence alternatives for the received input voice data. For example, the VM 1008 may generate the sentence alternatives.

The systems described herein may perform step 2020 in a variety of ways. In one example, the VM 1008 may generate alternative substitute entities for each identified sentence alternative, grouping the sentence alternatives into multiple batches and providing each batch to the language model search server cluster 1012. The language model search servers 1014a-d may process the generating of the alternative substitute entities for each identified sentence alternative in parallel significantly speeding up the process of generating the alternative substitute entities as sentence alternative with substitute entities in block 1116. In some implementations, one or more of the systems described herein may expand a total number of entity hypotheses to include multiple entity hypotheses for each sentence alternative. For example, there may be five hypotheses for each identified sentence alternative. Assuming a list of twenty sentence alternatives, there may be one hundred alternative substitute entities.

As illustrated in FIG. 20, at step 2030 one or more of the systems described herein may identify a best sentence of the multiple sentence alternatives. For example, the language model search server 1014a may identify a best sentence of the multiple sentence alternatives.

The systems described herein may perform step 2030 in a variety of ways. In one example, the language model search server 1014a may receive the sentence vectors with entities information. The language model search server 1014a may run each sentence vector representative of a sentence alternative against the language models included in the DLM database 1022. The language model search server 1014a may determine that there is at least one match of a sentence vector for a sentence alternative to a language model included in the DLM database 1022. The language model search server 1014a may provide the best matching sentence and entities business logic and dialog scripts for the third-party application (e.g., the third-party application scripts 812).

As illustrated in FIG. 20, at step 2040 one or more of the systems described herein may execute a dialog script for the third-party application using the best sentence. The dialog script may generate a response to the received input voice data comprising output voice data and a corresponding visual response. For example, the domain virtual machine 810 may execute a third-party script of the third-party application scripts 812 to generate the visual event and voice data 822 responsive to the received visual state and voice data 820.

The systems described herein may perform step 2040 in a variety of ways. In one example, the VM 1008 may run or execute one or more of the domain language model and dialog scripts 1004a-b to produce the visual event and voice data 822. The VM 1008 may provide the visual event and voice data 822 to the SDK 804 for producing or generating a text response and a corresponding visual response for the third-party application. The SDK 804 may also update a dialog state of the third-party application.

As illustrated in FIG. 20, at step 2050 one or more of the systems described herein may provide the visual response and the output voice data to the third-party application. The third-party application may play the output voice data synchronous with updating the user interface based on the visual response. For example, the domain virtual machine 810 may provide the visual event and voice data 822 to the third-party application 802, which may play the voice data synchronous with the updating of the user interface of the third-party application 802.

The systems described herein may perform step 2050 in a variety of ways. In one example, the domain virtual machine 810 may provide the visual event and voice data 822 to the SDK 804 for producing or generating a text response and a corresponding visual response for the third-party application. The SDK 804 may also update a dialog state of the third-party application. The domain virtual machine 810 may provide data for the visual event and voice data 822 to the SDK 804, using an onCommand( ) handler for each response, for playing and processing by the third-party application 802. The onCommand( ) handler may update user interface elements of the user interface for the third-party application 802. The SDK 804 may implement a Play Queue asynchronous service that plays the voice and calls the appropriate onCommand( ) handler to update the user interface for the third-party application 802 based on the visual event. Because the visual context may be available on the runtime server 806, the application developer 824 may access the visual context data to determine one or more appropriate functions to be formed by the SDK 804 as the SDK 804 processes the commands in the current visual context for the third-party application 802.

Example Embodiments

Example 1: A computer-implemented method for providing a multimodal interface to a third-party application may include receiving input voice data synchronous with a visual state of a user interface of the third-party application, generating multiple sentence alternatives for the received input voice data, identifying a best sentence of the multiple sentence alternatives, executing a dialog script for the third-party application using the best sentence, the dialog script generating a response to the received voice data comprising output voice data and a corresponding visual response, and providing the visual response and the output voice data to the third-party application, the third-party application playing the output voice data synchronous with updating the user interface based on the visual response.

Example 2: The computer-implemented method of Example 1, further including displaying an interface element as a floating overlay on the user interface of the third-party application, where interaction with the interface element may enable the receiving of the input voice data.

One or more of the systems described herein may display an interface element as a floating overlay on the user interface of the third-party application, where interaction with the interface element may enable the receiving of the input voice data. Referring to FIG. 7, a third-party application having an installed voice support module may display on the screen 104 of the client device 706 the user interface (GUI 708) for the third-party application. The GUI 708 may include the button 702 (an interface element) as a floating overlay on the user interface of the third-party application. The interactive interface element may correspond to the voice support module 112. A user of the client device 706 may interact with the interface element, activating the interactive interface element which enables the functionality of the voice support module, enabling the receiving of the input voice data.

Example 3: The computer-implemented method of Example 2, further including at least substantially maintaining an original appearance of the user interface of the third-party application while displaying the interface element as the floating overlay.

One or more of the systems described herein may at least substantially maintain an original appearance of the user interface of the third-party application while displaying the interface element as the floating overlay. Referring to FIG. 7, the button 702 (the interface element) may be positioned in the user interface (GUI 708) on top of or over GUI elements of the third-party application (e.g., floating over the GUI elements of the navigation application). The button 702 being displayed as a floating element may allow a user to select (click on or touch) and drag the button 702 to any position in the GUI 708 without changing the GUI (substantially maintaining an original appearance of the user interface of the third-party application).

Example 4: The computer-implemented method of any of Examples 1-3, where the visual state may provide a context for the input voice data and identifying the best sentence may be based on the context.

As provided by one or more of the systems described herein, the visual state may provide a context for the input voice data and identifying the best sentence may be based on the context. As described with reference to FIG. 11, the system(s) illustrated in FIGS. 1 and 8-10 may provide recognition hints 1148 that may depend on the visual state 1124 and/or the dialog state 1126 of the third-party application. The recognition hints 1148 may be provided to a speech recognition engine 1110. For example, a visual state may be an object that describes a current state and content of user interface elements currently being presented (displayed) in a GUI for a third-party application. A dialog state may be a stack of active dialog contexts for the third-party application. The visual state providing a context for the input voice data that may be used to identify the best sentence may improve the quality of voice recognition for the third-party application. Referring to FIG. 11, the visual state 1124 and/or the dialog state 1126 may be used by the language model search to identify the best matching sentence and entities 1130.

Example 5: The computer-implemented method of Example 4, where the context may provide at least one intent for use in responding to the received input voice data.

As provided by one or more of the systems described herein, the context may provide at least one intent for use in responding to the received input voice data. Referring to FIG. 1, the domain 114 may use a context embedding model 118 to compare the transcribed user utterance (e.g., the received input voice data) with a plurality of intent patterns of the DLM 116. By comparing the transcribed user utterances to the intent patterns of the DLM 116 based upon semantic similarity instead of direct textual similarity, the transcribed user utterance may be more accurately and efficiently matched to an intent for use in responding to the received input voice data.

Example 6: The computer-implemented method of Examples 4 and 5, further including determining a probability of a pattern matching of each sentence alternative to language models stored in a database, the probability based on the context.

One or more of the systems described herein may determine a probability of a pattern matching of each sentence alternative to language models stored in a database, the probability based on the context. Referring to FIG. 11, the language model search server cluster 1012 may run each sentence vector representative of a sentence alternative against the language models included in the DLM database 1022 to determine probabilities of pattern matching of the sentence alternative to language models given a dialog state and visual state of the third-party application at the time of the user utterance of the raw encoded voice data associated with the sentence alternative (the context).

Example 7: The computer-implemented method of Example 6, where the language models may be specific to the third-party application.

As provided by one or more of the systems described herein, a language model may model a probability distribution over strings of text. A domain language model may enrich or add to a language model for a third-party application by including additional attributes such as entities, intents, and handlers. For example, a domain language model may be derived from a global language model of the English language but enriched for use with voice control for a third-party application.

Example 8: The computer-implemented method of any of Examples 6-7, where identifying the best sentence of the multiple sentence alternatives based on the context may include identifying the best sentence of the multiple sentence alternatives based on the probabilities.

As provided by one or more of the systems described herein, identifying the best sentence of the multiple sentence alternatives based on the context may include identifying the best sentence of the multiple sentence alternatives based on the probabilities. Referring to FIG. 11, the language model search server cluster 1012 may run each sentence vector representative of a sentence alternative against the language models included in the DLM database 1022 to determine probabilities of pattern matching of the sentence alternative to language models given a dialog state and visual state of the third-party application at the time of the user utterance of the raw encoded voice data associated with the sentence alternative (the context). A probability of a sentence belonging to the language model, and therefore matching a pattern, may be defined by a proximity of the sentence embedding vector to one or more vectors describing the pattern semantic and by a distance from other patterns.

Example 9: The computer-implemented method of any of Examples 6-8, where determining the probability of a pattern matching of each sentence alternative to language models stored in a database may include using a plurality of language model search servers in parallel, each language model search server accessing the language models stored in the database.

As provided by one or more of the systems described herein, determining the probability of a pattern matching of each sentence alternative to language models stored in a database may include using a plurality of language model search servers in parallel, each language model search server accessing the language models stored in the database. Referring to FIG. 10, one or more language model search servers may run search and/or patterns in one or more language models in parallel. When running the searches and patterns, the language model search servers may interface with the domain language model and dialog scripts included in one or more virtual machines on one or more runtime servers and a domain language model database. For example, a language model search server cluster 1012 may include one or more language model search servers (e.g., language model search servers 1014a-d). The language model search servers 1014a-d may interface with the VM 1008 and the VM 1010 on the runtime server 1002a. The language model search servers 1014a-d may interface with a domain language model (DLM) database 1022. The DLM database 1022 may store language models. For example, the DLM database 1022 may be the DLM database 808 as shown in FIG. 8.

Example 10: The computer-implemented method of any of Examples 6-9, where the third-party application may be run on a client-side computing device, and the visual state may be set by a software development kit (SDK) running on the client-side computing device, the SDK providing the multimodal interface.

As provided by one or more of the systems described herein, the third-party application may be run on a client-side computing device, and the visual state may be set by a software development kit (SDK) running on the client-side computing device, the SDK providing the multimodal interface. Referring to FIG. 8, the SDK 804 running on the client-side computing device that is also running the third-party application 802 may set the visual state of the third-party application 802.

Example 11: The computer-implemented method of any of Examples 6-10, where the received input voice data and the visual state may be streamed from the SDK to a runtime server, and the visual response and the output voice data may be streamed to the SDK from the runtime server.

As provided by one or more of the systems described herein, the received input voice data and the visual state may be streamed from the SDK to a runtime server, and the visual response and the output voice data may be streamed to the SDK from the runtime server. Referring to FIG. 8, the received input voice data and the visual state (e.g., the visual state and voice data 820) may be streamed from the SDK 804 to the domain virtual machine 810 included in the runtime server 806. In addition, or in the alternative, the visual response and the output voice data (e.g., the visual event and voice data 822) may be streamed to the SDK 804 from the domain virtual machine 812 included in the runtime server 806.

Example 12: The computer-implemented method of any of Examples 6-11, where the visual response and the output voice data may be streamed to the SDK from the runtime server in a manner that may appear in the user interface of the third-party application as an instantaneous response to the received input voice data and the visual state.

As provided by one or more of the systems described herein, the visual response and the output voice data may be streamed to the SDK from the runtime server in a manner that may appear in the user interface of the third-party application as an instantaneous response to the received input voice data and the visual state. Referring to FIGS. 8 and 9, the SDK 804 may include a network protocol module 918 that may implement a network protocol for communicating by way of the network with the third-party application 802 and specifically the SDK 804 enabling bidirectional real-time voice and object transfers between the runtime server 806 and the third-party application 802. The system 800 for providing assistive voice control to a third-party application as shown in FIG. 8 may provide a user with a real-time multimodal experience by streaming the visual state and voice data 820 in sync from the third-party application 802 to the runtime server 806, parallelizing language model searches as described with reference to FIGS. 10, 12, and 13 ensuring minimal delays by the runtime server 806 when providing the visual event and voice data 822 to the SDK 804, and streaming the visual event and voice data 822 is sync from the runtime server 806 to the third-party application 802 providing a user of the third-party application 802 with a responsive, real-time experience that appears in the user interface of the third-party application as an instantaneous response to the received input voice data and the visual state.

Example 13: The computer-implemented method of any of Examples 11-12, where streaming the input voice data and the visual state from the SDK may be responsive to activation of an interactive interface element by a user of the client-side computing device.

As provided by one or more of the systems described herein, streaming the input voice data and the visual state from the SDK may be responsive to activation of an interactive interface element by a user of the client-side computing device. For example, referring to FIGS. 1, 7, and 8, the user may activate the interactive interface element (e.g., the button 702) in order to turn on functionality of the voice support module 112. Turning on the functionality of the voice support module 112 may enable the user to make use of the voice support functions provided by the voice support module 112. For example, when the user of the client device 706 activates the interactive interface element (e.g., by touching the interactive interface element on a touchscreen), the voice support module 112 may instruct an audio receiver of the client device 102 to capture input voice data and streaming the input voice data and the visual state from the SDK 804.

Example 14: The computer-implemented method of any of Examples 1-14, where one or more of the receiving, generating, identifying, executing, and providing steps may be executed, at least in part, via platform-agnostic computer-readable instructions.

As provided by one or more of the systems described herein, a plurality of different operating system platforms, frameworks, and/or libraries may run or execute platform-agnostic computer-readable instructions that may include, but are not limited to, a set of functions as described herein.

Example 15: The computer-implemented method of any of Examples 1-14, further including maintaining native input functionality of the third-party application while receiving the input voice data and providing the visual response and the output voice data.

One or more of the systems described herein may maintain native input functionality of the third-party application while receiving the input voice data and providing the visual response and the output voice data. For example, referring to FIG. 7, a user may interact with the GUI 708 of the third-party application (e.g., the navigation application) while receiving input voice data and providing the visual response and output voice data responsive to the activation of the button 702 by a user of the third-party application.

Example 16: A system for providing a multimodal interface to a third-party application may include at least one physical processor, and physical memory including computer-executable instructions that, when executed by the physical processor, cause the physical processor to receive input voice data synchronous with a visual state of a user interface of the third-party application, generate multiple sentence alternatives for the received input voice data, identify a best sentence of the multiple sentence alternatives, execute a dialog script for the third-party application using the best sentence, the dialog script generating a response to the received input voice data comprising output voice data and a corresponding visual response, and provide the visual response and the output voice data to the third-party application, the third-party application playing the output voice data synchronous with updating the user interface based on the visual response.

Example 17: The system of Example 16, where the computer-executable instructions, when executed by the physical processor, may further cause the physical processor to display an interface element as a floating overlay on the user interface of the third-party application, where interaction with the interface element may enable the receiving of the input voice data.

Example 18: The system of Example 17, where the computer-executable instructions, when executed by the physical processor, may further cause the physical processor to maintain an original appearance of the user interface of the third-party application while displaying the interface element as the floating overlay.

Example 19: The system of any of Examples 16-18, where the visual state may provide a context for the input voice data; and identifying the best sentence may be based on the context.

Example 20: A non-transitory computer-readable medium including one or more computer-executable instructions that, when executed by at least one processor of a computing device, may cause the computing device to receive input voice data synchronous with a visual state of a user interface of the third-party application, generate multiple sentence alternatives for the received input voice data, identify a best sentence of the multiple sentence alternatives, execute a dialog script for the third-party application using the best sentence, the dialog script generating a response to the received input voice data comprising output voice data and a corresponding visual response, and provide the visual response and the output voice data to the third-party application, the third-party application playing the output voice data synchronous with updating the user interface based on the visual response.

Figure 21:
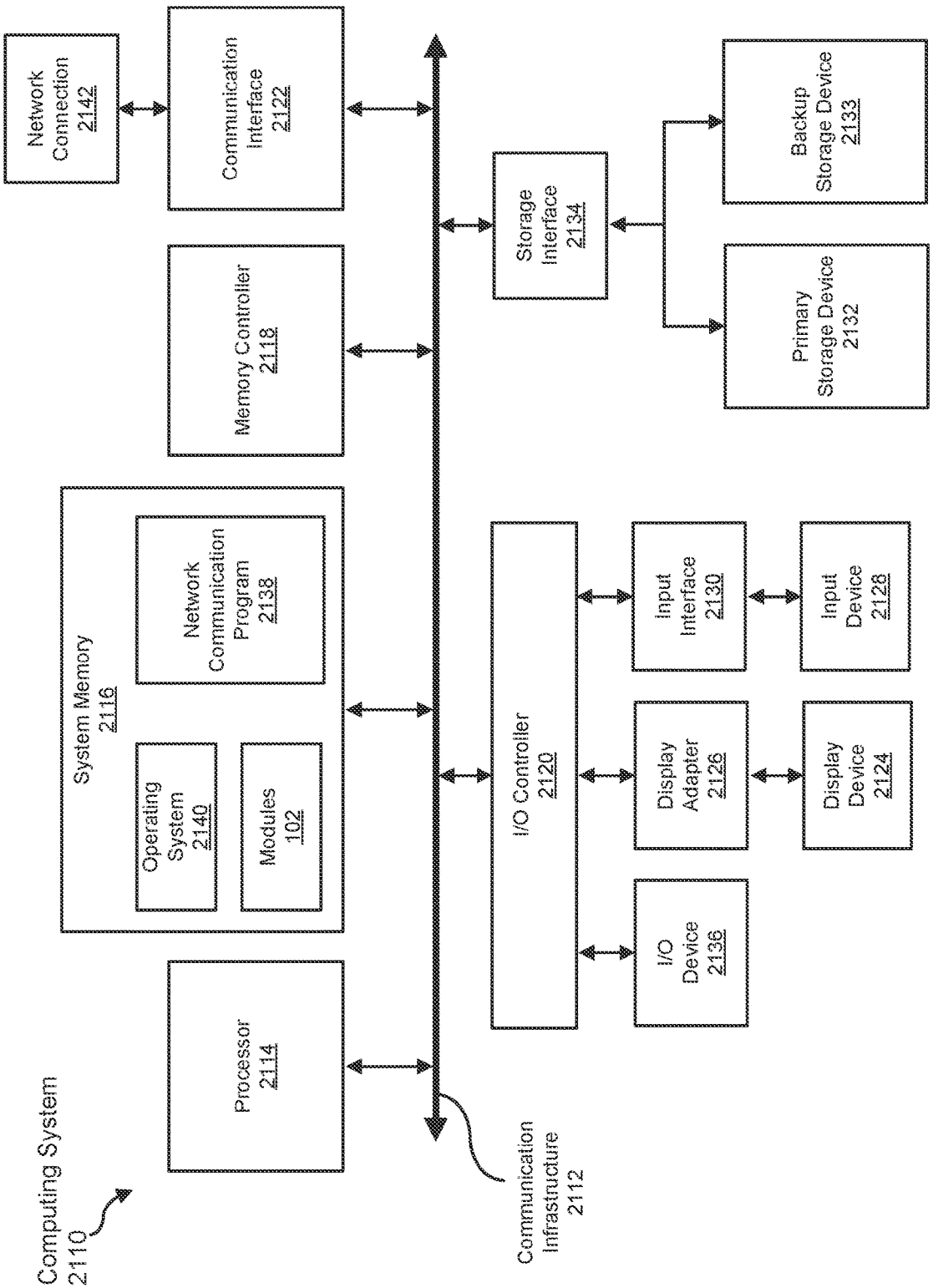
FIG. 21 is a block diagram of an example computing system capable of implementing one or more of the embodiments described and/or illustrated herein.

FIG. 21 is a block diagram of an example computing system 2110 capable of implementing one or more of the embodiments described and/or illustrated herein. For example, all or a portion of computing system 2110 may perform and/or be a means for performing, either alone or in combination with other elements, one or more of the steps described herein (such as one or more of the steps illustrated in FIG. 1). All or a portion of computing system 2110 may also perform and/or be a means for performing any other steps, methods, or processes described and/or illustrated herein.

Computing system 2110 broadly represents any single or multi-processor computing device or system capable of executing computer-readable instructions. Examples of computing system 2110 include, without limitation, workstations, laptops, client-side terminals, servers, distributed computing systems, handheld devices, or any other computing system or device. In its most basic configuration, computing system 2110 may include at least one processor 2114 and a system memory 2116.

Processor 2114 generally represents any type or form of physical processing unit (e.g., a hardware-implemented central processing unit) capable of processing data or interpreting and executing instructions. In certain embodiments, processor 2114 may receive instructions from a software application or module. These instructions may cause processor 2114 to perform the functions of one or more of the example embodiments described and/or illustrated herein.

System memory 2116 generally represents any type or form of volatile or non-volatile storage device or medium capable of storing data and/or other computer-readable instructions. Examples of system memory 2116 include, without limitation, Random Access Memory (RAM), Read Only Memory (ROM), flash memory, or any other suitable memory device. Although not required, in certain embodiments computing system 2110 may include both a volatile memory unit (such as, for example, system memory 2116) and a non-volatile storage device (such as, for example, primary storage device 2132, as described in detail below).

In some examples, system memory 2116 may store and/or load an operating system 2140 for execution by processor 2114. In one example, operating system 2140 may include and/or represent software that manages computer hardware and software resources and/or provides common services to computer programs and/or applications on computing system 2110. Examples of operating system 2140 include, without limitation, LINUX®, JUNOS®, MICROSOFT WINDOWS®, WINDOWS MOBILE®, macOS®, APPLE'S IOS®, UNIX®, GOOGLE CHROME OS™, GOOGLE'S ANDROID®, SOLARIS®, variations of one or more of the same, and/or any other suitable operating system.

In certain embodiments, example computing system 2110 may also include one or more components or elements in addition to processor 2114 and system memory 2116. For example, as illustrated in FIG. 21, computing system 2110 may include a memory controller 2118, an Input/Output (I/O) controller 2120, and a communication interface 2122, each of which may be interconnected via a communication infrastructure 2112. Communication infrastructure 2112 generally represents any type or form of infrastructure capable of facilitating communication between one or more components of a computing device. Examples of communication infrastructure 2112 include, without limitation, a communication bus (such as an Industry Standard Architecture (ISA), Peripheral Component Interconnect (PCI), PCI Express (PCIe®), or similar bus) and a network.

Memory controller 2118 generally represents any type or form of device capable of handling memory or data or controlling communication between one or more components of computing system 2110. For example, in certain embodiments memory controller 2118 may control communication between processor 2114, system memory 2116, and I/O controller 2120 via communication infrastructure 2112.

I/O controller 2120 generally represents any type or form of module capable of coordinating and/or controlling the input and output functions of a computing device. For example, in certain embodiments I/O controller 2120 may control or facilitate transfer of data between one or more elements of computing system 2110, such as processor 2114, system memory 2116, communication interface 2122, display adapter 2126, input interface 2130, and storage interface 2134.

As illustrated in FIG. 21, computing system 2110 may also include at least one display device 2124 coupled to I/O controller 2120 via a display adapter 2126. Display device 2124 generally represents any type or form of device capable of visually displaying information forwarded by display adapter 2126. Similarly, display adapter 2126 generally represents any type or form of device configured to forward graphics, text, and other data from communication infrastructure 2112 (or from a frame buffer, as known in the art) for display on display device 2124.

As illustrated in FIG. 21, example computing system 2110 may also include at least one input device 2128 coupled to I/O controller 2120 via an input interface 2130. Input device 2128 generally represents any type or form of input device capable of providing input, either computer or human generated, to example computing system 2110. Examples of input device 2128 include, without limitation, a keyboard, a pointing device, a speech recognition device, variations or combinations of one or more of the same, and/or any other input device.

Additionally or alternatively, example computing system 2110 may include additional I/O devices. For example, example computing system 2110 may include I/O device 2136. In this example, I/O device 2136 may include and/or represent a user interface that facilitates human interaction with computing system 2110. Examples of I/O device 2136 include, without limitation, a computer mouse, a keyboard, a monitor, a printer, a modem, a camera, a scanner, a microphone, a touchscreen device, variations or combinations of one or more of the same, and/or any other I/O device.

Communication interface 2122 broadly represents any type or form of communication device or adapter capable of facilitating communication between example computing system 2110 and one or more additional devices. For example, in certain embodiments communication interface 2122 may facilitate communication between computing system 2110 and a private or public network including additional computing systems. Examples of communication interface 2122 include, without limitation, a wired network interface (such as a network interface card), a wireless network interface (such as a wireless network interface card), a modem, and any other suitable interface. In at least one embodiment, communication interface 2122 may provide a direct connection to a remote server via a direct link to a network, such as the Internet. Communication interface 2122 may also indirectly provide such a connection through, for example, a local area network (such as an Ethernet network), a personal area network, a telephone or cable network, a cellular telephone connection, a satellite data connection, or any other suitable connection.

In certain embodiments, communication interface 2122 may also represent a host adapter configured to facilitate communication between computing system 2110 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 2122 may also allow computing system 2110 to engage in distributed or remote computing. For example, communication interface 2122 may receive instructions from a remote device or send instructions to a remote device for execution.

In some examples, system memory 2116 may store and/or load a network communication program 2138 for execution by processor 2114. In one example, network communication program 2138 may include and/or represent software that enables computing system 2110 to establish a network connection 2142 with another computing system (not illustrated in FIG. 21) and/or communicate with the other computing system by way of communication interface 2122. In this example, network communication program 2138 may direct the flow of outgoing traffic that is sent to the other computing system via network connection 2142. Additionally or alternatively, network communication program 2138 may direct the processing of incoming traffic that is received from the other computing system via network connection 2142 in connection with processor 2114.

Although not illustrated in this way in FIG. 21, network communication program 2138 may alternatively be stored and/or loaded in communication interface 2122. For example, network communication program 2138 may include and/or represent at least a portion of software and/or firmware that is executed by a processor and/or Application Specific Integrated Circuit (ASIC) incorporated in communication interface 2122.

As illustrated in FIG. 21, example computing system 2110 may also include a primary storage device 2132 and a backup storage device 2133 coupled to communication infrastructure 2112 via a storage interface 2134. Storage devices 2132 and 2133 generally represent any type or form of storage device or medium capable of storing data and/or other computer-readable instructions. For example, storage devices 2132 and 2133 may be a magnetic disk drive (e.g., a so-called hard drive), a solid state drive, a floppy disk drive, a magnetic tape drive, an optical disk drive, a flash drive, or the like. Storage interface 2134 generally represents any type or form of interface or device for transferring data between storage devices 2132 and 2133 and other components of computing system 2110.

In certain embodiments, storage devices 2132 and 2133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 2132 and 2133 may also include other similar structures or devices for allowing computer software, data, or other computer-readable instructions to be loaded into computing system 2110. For example, storage devices 2132 and 2133 may be configured to read and write software, data, or other computer-readable information. Storage devices 2132 and 2133 may also be a part of computing system 2110 or may be a separate device accessed through other interface systems.

Many other devices or subsystems may be connected to computing system 2110. Conversely, all of the components and devices illustrated in FIG. 21 need not be present to practice the embodiments described and/or illustrated herein. The devices and subsystems referenced above may also be interconnected in different ways from that shown in FIG. 21. Computing system 2110 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 2110. All or a portion of the computer program stored on the computer-readable medium may then be stored in system memory 2116 and/or various portions of storage devices 2132 and 2133. When executed by processor 2114, a computer program loaded into computing system 2110 may cause processor 2114 to perform and/or be a means for performing the functions of one or more of the example embodiments described and/or illustrated herein. Additionally, or alternatively, one or more of the example embodiments described and/or illustrated herein may be implemented in firmware and/or hardware. For example, computing system 2110 may be configured as an Application Specific Integrated Circuit (ASIC) adapted to implement one or more of the example embodiments disclosed herein.

Figure 22:
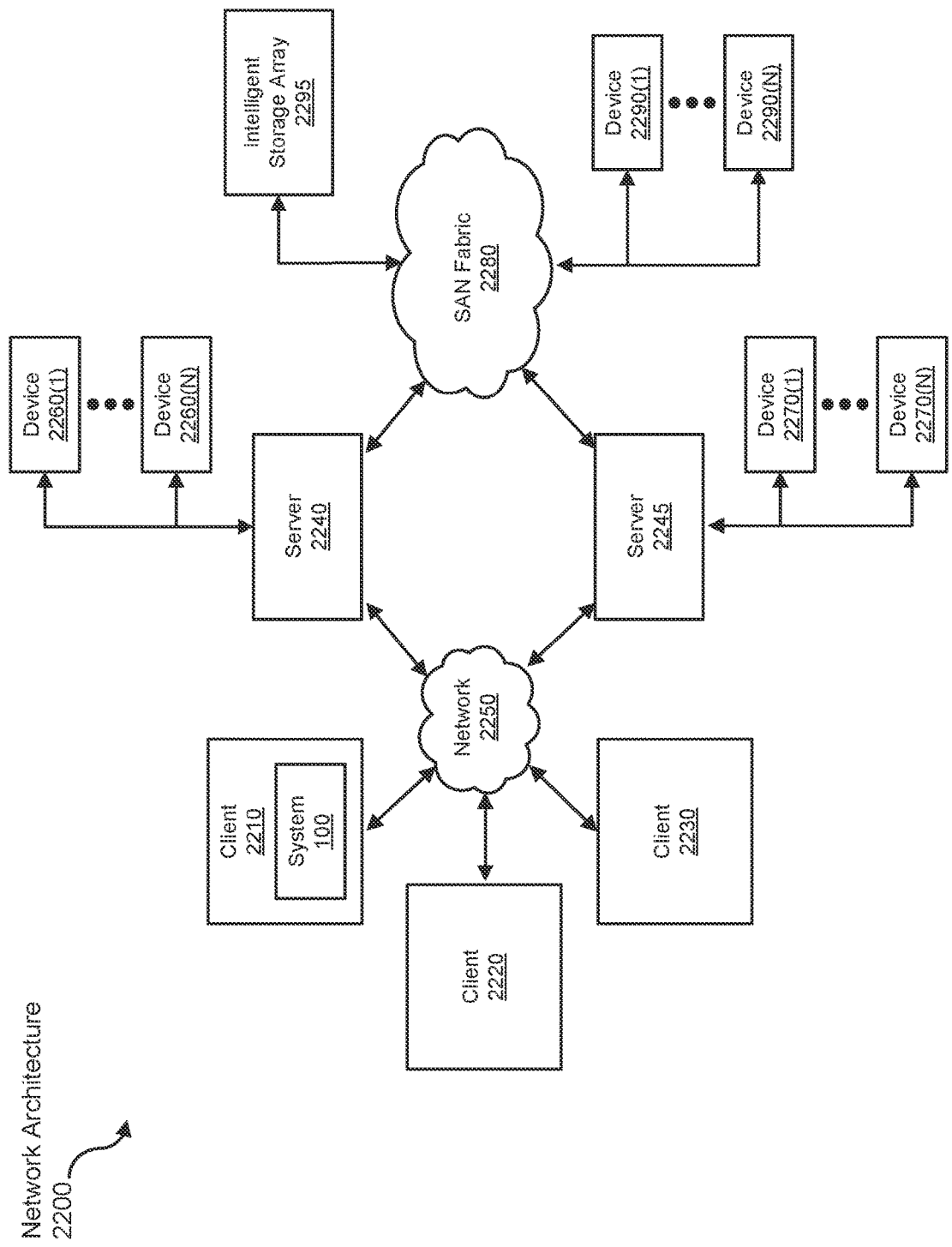
FIG. 22 is a block diagram of an example computing network capable of implementing one or more of the embodiments described and/or illustrated herein.

FIG. 22 is a block diagram of an example network architecture 2200 in which client systems 2210, 2220, and 2230 and servers 2240 and 2245 may be coupled to a network 2250. As detailed above, all or a portion of network architecture 2200 may perform and/or be a means for performing, either alone or in combination with other elements, one or more of the steps disclosed herein (such as one or more of the steps illustrated in FIG. 20). All or a portion of network architecture 2200 may also be used to perform and/or be a means for performing other steps and features set forth in the present disclosure.

Client systems 2210, 2220, and 2230 generally represent any type or form of computing device or system, such as example computing system 2110 in FIG. 21. Similarly, servers 2240 and 2245 generally represent computing devices or systems, such as application servers or database servers, configured to provide various database services and/or run certain software applications. Network 2250 generally represents any telecommunication or computer network including, for example, an intranet, a WAN, a LAN, a PAN, or the Internet. In one example, client systems 2210, 2220, and/or 2230 and/or servers 2240 and/or 2245 may include all or a portion of system from FIG. 1.

As illustrated in FIG. 22, one or more storage devices 2260(1)-(N) may be directly attached to server 2240. Similarly, one or more storage devices 2270(1)-(N) may be directly attached to server 2245. Storage devices 2260(1)-(N) and storage devices 2270(1)-(N) generally represent any type or form of storage device or medium capable of storing data and/or other computer-readable instructions. In certain embodiments, storage devices 2260(1)-(N) and storage devices 2270(1)-(N) may represent Network-Attached Storage (NAS) devices configured to communicate with servers 2240 and 2245 using various protocols, such as Network File System (NFS), Server Message Block (SMB), or Common Internet File System (CIFS).

Servers 2240 and 2245 may also be connected to a Storage Area Network (SAN) fabric 2280. SAN fabric 2280 generally represents any type or form of computer network or architecture capable of facilitating communication between a plurality of storage devices. SAN fabric 2280 may facilitate communication between servers 2240 and 2245 and a plurality of storage devices 2290(1)-(N) and/or an intelligent storage array 2295. SAN fabric 2280 may also facilitate, via network 2250 and servers 2240 and 2245, communication between client systems 2210, 2220, and 2230 and storage devices 2290(1)-(N) and/or intelligent storage array 2295 in such a manner that devices 2290(1)-(N) and array 2295 appear as locally attached devices to client systems 2210, 2220, and 2230. As with storage devices 2260(1)-(N) and storage devices 2270(1)-(N), storage devices 2290(1)-(N) and intelligent storage array 2295 generally represent any type or form of storage device or medium capable of storing data and/or other computer-readable instructions.

In certain embodiments, and with reference to example computing system 2110 of FIG. 21, a communication interface, such as communication interface 2122 in FIG. 21, may be used to provide connectivity between each client system 2210, 2220, and 2230 and network 2250. Client systems 2210, 2220, and 2230 may be able to access information on server 2240 or 2245 using, for example, a web browser or other client software. Such software may allow client systems 2210, 2220, and 2230 to access data hosted by server 2240, server 2245, storage devices 2260(1)-(N), storage devices 2270(1)-(N), storage devices 2290(1)-(N), or intelligent storage array 2295. Although FIG. 22 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 2240, server 2245, storage devices 2260(1)-(N), storage devices 2270(1)-(N), storage devices 2290(1)-(N), intelligent storage array 2295, or any combination thereof. All or a portion of one or more of the example embodiments disclosed herein may also be encoded as a computer program, stored in server 2240, run by server 2245, and distributed to client systems 2210, 2220, and 2230 over network 2250.

As detailed above, computing system 2110 and/or one or more components of network architecture 2200 may perform and/or be a means for performing, either alone or in combination with other elements, one or more steps of an example method for creating a conversational voice experience in an application.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for providing a third-party application with a conversational voice user experience comprising:
   receiving, by a framework integrated with the third-party application, context data associated with a visual state of a first user interface being displayed on a display device of a computing device by the third-party application executing on the computing device;
   receiving, by the framework, input voice data associated with the visual state of the first user interface;
   streaming, by the framework and to a runtime server, the input voice data and the context data, the input voice data being processed in parallel by the runtime server to detect an intent and an entity based at least in part on the context data; and in response to the input voice data, receiving, by the framework and streamed from the runtime server, a second user interface for display on the display device of the computing device by the third-party application and output voice data for playing by the third-party application synchronous with the displaying of the second user interface.

2. The computer-implemented method of claim 1, wherein the third-party application is one of a mobile application, a desktop application, or a web-based application.

3. The computer-implemented method of claim 1, wherein the framework is a software development kit that is configured to run in multiple operating systems.

4. The computer-implemented method of claim 1, wherein the framework receives the context data and the input voice data while preserving a functionality of the first user interface as implemented by the third-party application.

5. The computer-implemented method of claim 1, wherein the input voice data is a command spoken by a user of the third-party application.

6. The computer-implemented method of claim 5, wherein the intent:
corresponds to a particular type of action performed by the third-party application, and
is included in the command spoken by the user of the third-party application.

7. The computer-implemented method of claim 6, wherein the entity:
is an element included in set of related elements, and
is included in the command spoken by the user of the third-party application in relation to the intent.

8. The computer-implemented method of claim 1, further comprising providing, by the framework, an interface element for display as a floating overlay on the first user interface and the second user interface.

9. The computer-implemented method of claim 8, wherein interaction with the interface element enables the receiving of the input voice data.

10. The computer-implemented method of claim 9, further comprising maintaining an original appearance of the first user interface and the second user interface while displaying the interface element as the floating overlay.

11. The computer-implemented method of claim 1, wherein the framework receives the second user interface and the output voice data streamed from the runtime server in a manner that appears in the third-party application as an instantaneous response to the received input voice data and the context data.

12. A system for providing a third-party application with a conversational voice user experience, the system comprising:
at least one physical processor; and
physical memory comprising computer-executable instructions that, when executed by the physical processor, cause the physical processor to:
receive, by a framework integrated with the third-party application, context data associated with a visual state of a first user interface being displayed on a display device of a computing device by the third-party application executing on the computing device;
receive, by the framework, input voice data associated with the visual state of the first user interface;
stream, by the framework and to a runtime server, the input voice data and the context data, the input voice data being processed in parallel by the runtime server to detect an intent and an entity based at least in part on the context data; and
in response to the input voice data, receive, by the framework and streamed from the runtime server, a second user interface for display on the display device of the computing device by the third-party application and output voice data for playing by the third-party application synchronous with the displaying of the second user interface.

13. The system of claim 12, wherein the third-party application is one of a mobile application, a desktop application, or a web-based application.

14. The system of claim 12, wherein the framework is a software development kit that is configured to run in multiple operating systems.

15. The system of claim 12, wherein the framework receives the context data and the input voice data while preserving a functionality of the first user interface as implemented by the third-party application.

16. The system of claim 12, wherein the input voice data is a command spoken by a user of the third-party application.

17. The system of claim 12, wherein the computer-executable instructions, when executed by the physical processor, further cause the physical processor to provide, by the framework, an interface element for display as a floating overlay on the first user interface and the second user interface, wherein interaction with the interface element enables the receiving of the input voice data.

18. The system of claim 17, wherein the computer-executable instructions, when executed by the physical processor, further cause the physical processor to maintain an original appearance of the first user interface and the second user interface while displaying the interface element as the floating overlay.

19. The system of claim 12, wherein the framework receives the second user interface and the output voice data streamed from the runtime server in a manner that appears in the third-party application as an instantaneous response to the received input voice data and the context data.

20. A non-transitory computer-readable medium comprising one or more computer-executable instructions that, when executed by at least one processor of a computing device, cause the computing device to:
receive, by a framework integrated with a third-party application, context data associated with a visual state of a first user interface being displayed on a display device of the computing device by the third-party application executing on the computing device;
receive, by the framework, input voice data associated with the visual state of the first user interface;
stream, by the framework and to a runtime server, the input voice data and the context data, the input voice data being processed in parallel by the runtime server to detect an intent and an entity based at least in part on the context data; and
in response to the input voice data, receive, by the framework and streamed from the runtime server, a second user interface for display on the display device of the computing device by the third-party application and output voice data for playing by the third-party application synchronous with the displaying of the second user interface.

* * * * *